(12) United States Patent
Jin et al.

(10) Patent No.: US 11,863,262 B2
(45) Date of Patent: **\*Jan. 2, 2024**

(54) METHOD FOR INDICATING VECTORS USED TO CONSTRUCT PRECODING VECTOR AND COMMUNICATIONS APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,621

(22) Filed: Dec. 8, 2022

(65) Prior Publication Data

US 2023/0170951 A1 Jun. 1, 2023

Related U.S. Application Data

(63) Continuation of application No. 17/361,708, filed on Jun. 29, 2021, now Pat. No. 11,581,925, which is a
(Continued)

(30) Foreign Application Priority Data

Dec. 29, 2018 (CN) .......................... 201811641071.4
Mar. 6, 2019 (CN) .......................... 201910169583.3
Mar. 22, 2019 (CN) .......................... 201910224252.5

(51) Int. Cl.
*H04B 7/02* (2018.01)
*H04B 7/0456* (2017.01)
*H04B 7/06* (2006.01)

(52) U.S. Cl.
CPC ......... *H04B 7/0456* (2013.01); *H04B 7/0626* (2013.01); *H04B 7/0663* (2013.01)

(58) Field of Classification Search
CPC .. H04B 7/0456; H04B 7/0626; H04B 7/0663; H04B 7/063; H04B 7/0658;
(Continued)

(56) References Cited

U.S. PATENT DOCUMENTS

| 10,110,287 B1 | 10/2018 | Crasmariu et al. |
| 2007/0115799 A1 | 5/2007 | Ting et al. |

(Continued)

FOREIGN PATENT DOCUMENTS

| CN | 1918815 A | 2/2007 |
| CN | 101227217 A | 7/2008 |

(Continued)

OTHER PUBLICATIONS

3GPP TS 38.212 V15.3.0, "3rd Generation Partnership Project, Technical Specification Group Radio Access Network, NR, Multiplexing and channel coding (Release 15)," Sep. 2018, 99 pages.
(Continued)

*Primary Examiner* — Helene E Tayong
(74) *Attorney, Agent, or Firm* — Fish & Richardson P.C.

(57) ABSTRACT

This disclosure provides methods and apparatuses for generating precoding vectors. One method includes: receiving a channel state information (CSI) report, wherein the CSI report indicates a quantity of space-frequency vector pairs to be reported for a quantity of R transport layers, wherein a size of an overhead for indicating the quantity of the space-frequency vector pairs is same when the quantity of R is greater than or equal to 2, wherein each of the space-frequency vector pairs comprises one spatial domain vector and one frequency domain vector, and wherein for each of the R transport layers, one or more frequency domain units
(Continued)

associated with the transport layer correspond to one or more precoding vectors, and determining the quantity of space-frequency vector pairs according to the CSI report.

30 Claims, 15 Drawing Sheets

Related U.S. Application Data continuation of application No. PCT/CN2019/125123, filed on Dec. 13, 2019.

(58) Field of Classification Search
CPC ... H04B 7/0469; H04B 7/0478; H04L 1/0026; H04L 1/0028; H04L 1/06; H04L 1/0606
USPC .......................................................... 375/267
See application file for complete search history.

(56) References Cited

U.S. PATENT DOCUMENTS

| | | |
|---|---|---|
| 2011/0312332 A1 | 12/2011 | Choudhury et al. |
| 2014/0098681 A1 | 4/2014 | Stager et al. |
| 2014/0262938 A1* | 9/2014 | Bray .......................... C10L 1/08 208/17 |
| 2014/0301492 A1 | 10/2014 | Xin |
| 2016/0182133 A1 | 6/2016 | Onggosanusi |
| 2016/0278003 A1 | 9/2016 | Kim |
| 2017/0302353 A1 | 10/2017 | Rahman |
| 2018/0054290 A1 | 2/2018 | Park |
| 2018/0070313 A1 | 3/2018 | Papasakellariou et al. |
| 2018/0227028 A1 | 8/2018 | Lee |
| 2018/0248720 A1 | 8/2018 | Park |

FOREIGN PATENT DOCUMENTS

| | | |
|---|---|---|
| CN | 101297514 A | 10/2008 |
| CN | 102227098 A | 10/2011 |
| CN | 108347321 A | 7/2018 |
| CN | 109004979 A | 12/2018 |
| CN | 112436874 A | 8/2021 |

OTHER PUBLICATIONS

3GPP TS 38.214 V15.3.0, "3rd Generation Partnership Project, Technical Specification Group Radio Access Network, NR, Physical layer procedures for data (Release 15)," Sep. 2018, 96 pages.

Extended European Search Report issued in European Application No. 19906429.6 dated Feb. 22, 2022, 10 pages.

Fujitsu, "Consideration regarding additional information for new aperiodic PUSCH feedback mode," 3GPP TSG RAN WG1 Meeting #73, R1-131928, Fukuoka, Japan, May 20-24, 2013, 6 pages.

Huawei, HiSilicon, "Discussion on CSI enhancement," 3GPP TSG RAN WG1 Meeting #95, R1-1812242, Spokane, USA, Nov. 12-16, 2018, 8 pages.

Luo, "Study on 3D MIMO Precoding and User Scheduling Technology for 5G," Master Thesis, Nanjing University of Posts and Telecommunications, Apr. 2017, 72 pages.

Office Action issued in Chinese Application No. 201910224252.5, dated Nov. 2, 2020, 11 pages (with English Translation).

Office Action issued in Chinese Application No. 201980087160.5 dated Aug. 19, 2022, 6 pages (with English translation).

Qualcomm Incorporated, "Draft CR on UE assumptions for LBT when P-CSI and A-CSI collide," 3GPP TSG-RAN Meeting #87, R1-1611586, Reno, USA, Nov. 10-14, 2016, 8 pages.

* cited by examiner

| Indication of a spatial domain vector reported for the first transport layer | ... | Indication of a spatial domain vector reported for an $R^{th}$ transport layer | Indication of a frequency domain vector reported for the first transport layer | ... | Indication of a frequency domain vector reported for the $R^{th}$ transport layer | Indication of a weighting coefficient reported for the first transport layer | ... | Indication of a weighting coefficient reported for the $R^{th}$ transport layer |

⎵First field　　　⎵Second field　　　⎵Third field

FIG. 3

| Indication of a frequency domain vector reported for the first transport layer | ... | Indication of a frequency domain vector reported for an $R^{th}$ transport layer | Indication of a spatial domain vector reported for the first transport layer | ... | Indication of a spatial domain vector reported for an $R^{th}$ transport layer | Indication of a weighting coefficient reported for the first transport layer | ... | Indication of a weighting coefficient reported for the $R^{th}$ transport layer |
|---|---|---|---|---|---|---|---|---|
| First field | | | Second field | | | Third field | | |

FIG. 4

| Indication of spatial domain vectors reported for R transport layers | Indication of frequency domain vectors reported for the R transport layers | Indication of a weighting coefficient that has a first priority and that is reported for the first transport layer | ... | Indication of a weighting coefficient that has the first priority and that is reported for an $R^{th}$ transport layer | Indication of a weighting coefficient that has a second priority and that is reported for the first transport layer | ... | Indication of a weighting coefficient that has the second priority and that is reported for the $R^{th}$ transport layer |
|---|---|---|---|---|---|---|---|
| First field | Second field | Third field | | | | | |

FIG. 7

| Indication of frequency domain vectors reported for R transport layers | Indication of spatial domain vectors reported for the R transport layers | Indication of a weighting coefficient that has a first priority and that is reported for the first transport layer | ... | Indication of a weighting coefficient that has the first priority and that is reported for an $R^{th}$ transport layer | Indication of a weighting coefficient that has a second priority and that is reported for the first transport layer | ... | Indication of a weighting coefficient that has the second priority and that is reported for the $R^{th}$ transport layer | |
|---|---|---|---|---|---|---|---|---|
| First field | Second field | Third field | | | | | | |

FIG. 8

| Indication of a spatial domain vector reported for the first transport layer | ... | Indication of a spatial domain vector reported for an $R^{th}$ transport layer | Indication of a frequency domain vector reported for the first transport layer | ... | Indication of a frequency domain vector reported for the $R^{th}$ transport layer | Position indication of a space-frequency vector pair reported for the first transport layer | ... | Position indication of a space-frequency vector pair reported for the $R^{th}$ transport layer | Indication of a weighting coefficient reported for the first transport layer | ... | Indication of a weighting coefficient reported for the $R^{th}$ transport layer |
|---|---|---|---|---|---|---|---|---|---|---|---|
| First field | | | Second field | | | Fourth field | | | Third field | | |

FIG. 10

| Indication of a frequency domain vector reported for the first transport layer | ... | Indication of a frequency domain vector reported for an $R^{th}$ transport layer | Indication of a spatial domain vector reported for the first transport layer | ... | Indication of a spatial domain vector reported for the $R^{th}$ transport layer | Position indication of a space-frequency vector pair reported for the first transport layer | ... | Position indication of a space-frequency vector pair reported for the $R^{th}$ transport layer | Indication of a weighting coefficient reported for the first transport layer | ... | Indication of a weighting coefficient reported for the $R^{th}$ transport layer |
|---|---|---|---|---|---|---|---|---|---|---|---|
| First field | | | Second field | | | Fourth field | | | Third field | | |

FIG. 11

| Indication of spatial domain vectors reported for R transport layers | Indication of frequency domain vectors reported for the R transport layers | Position indication of a space-frequency vector pair reported for the first transport layer | ... | Position indication of a space-frequency vector pair reported for an $R^{th}$ transport layer | Indication of a weighting coefficient reported for the first transport layer | ... | Indication of a weighting coefficient reported for the $R^{th}$ transport layer |
|---|---|---|---|---|---|---|---|
| First field | Second field | Fourth field | | | Third field | | |

FIG. 12

| Indication of frequency domain vectors reported for R transport layers | Indication of spatial domain vectors reported for the R transport layers | Position indication of a space-frequency vector pair reported for the first transport layer | ... | Position indication of a space-frequency vector pair reported for an $R^{th}$ transport layer | Indication of a weighting coefficient reported for the first transport layer | ... | Indication of a weighting coefficient reported for the $R^{th}$ transport layer |
|---|---|---|---|---|---|---|---|
| First field | Second field | Fourth field | | | Third field | | |

FIG. 13

| Indication of spatial domain vectors reported for R transport layers | Indication of frequency domain vectors reported for the R transport layers | Position indication of a space-frequency vector pair reported for the first transport layer | ... | Position indication of a space-frequency vector pair reported for an $R^{th}$ transport layer | Indication of a weighting coefficient that has a first priority and that is reported for the $R^{th}$ transport layer | Indication of a weighting coefficient that has a second priority and that is reported for the first transport layer | ... | Indication of a weighting coefficient that has the second priority and that is reported for the $R^{th}$ transport layer |
|---|---|---|---|---|---|---|---|---|
| First field | Second field | Fourth field | | | | Third field | | |

FIG. 14

| Indication of frequency domain vectors reported for R transport layers | Indication of spatial domain vectors reported for the R transport layers | Position indication of a space-frequency vector pair reported for the first transport layer | ... | Position indication of a space-frequency vector pair reported for an $R^{th}$ transport layer | Indication of a weighting coefficient that has a first priority and that is reported for the $R^{th}$ transport layer | Indication of a weighting coefficient that has a second priority and that is reported for the first transport layer | ... | Indication of a weighting coefficient that has the second priority and that is reported for the $R^{th}$ transport layer |
|---|---|---|---|---|---|---|---|---|
| First field | Second field | Fourth field | | | Third field | | | |

FIG. 15

METHOD FOR INDICATING VECTORS USED TO CONSTRUCT PRECODING VECTOR AND COMMUNICATIONS APPARATUS

CROSS-REFERENCE TO RELATED APPLICATIONS

This application is a continuation of U.S. patent application Ser. No. 17/361,708, filed on Jun. 29, 2021, which is a continuation of International Application No. PCT/CN2019/125123, filed on Dec. 13, 2019, which claims priority to Chinese Patent Application No. 201811641071.4, filed on Dec. 29, 2018, Chinese Patent Application No. 201910169583.3, filed on Mar. 6, 2019, and Chinese Patent Application No. 201910224252.5, filed on Mar. 22, 2019. All of the aforementioned patent applications are hereby incorporated by reference in their entireties.

TECHNICAL FIELD

This application relates to the communications field, and more specifically, to a method for indicating vectors used to construct a precoding vector and a communications apparatus.

BACKGROUND

In a massive multiple-input multiple-output (Massive MIMO) technology, a network device can reduce interference between a plurality of users and interference between a plurality of signal flows of a same user by using a precoding technology. This helps improve signal quality, implement spatial multiplexing, and improve spectrum utilization.

For example, a terminal device may determine a precoding vector through channel measurement or in another manner, and expects to enable the network device to obtain, based on a feedback of the terminal device, a precoding vector that is the same as or similar to the precoding vector determined by the terminal device. To reduce feedback overheads and improve feedback precision, in an implementation, the terminal device may indicate the precoding vector to the network device in a feedback manner in which spatial domain compression and frequency domain compression are combined. Specifically, the terminal device may select one or more spatial domain vectors and one or more frequency domain vectors based on a precoding vector of each frequency domain unit at each transport layer, to fit the precoding vectors corresponding to the frequency domain units at the transport layers by using weighted sums of matrices constructed by using the spatial domain vectors and the frequency domain vectors.

As a quantity of transport layers changes, a quantity of spatial domain vectors fed back by the terminal device and/or a quantity of frequency domain vectors fed back by the terminal device may change, and indication overheads thereof may also change. This may cause unpredictable feedback overheads of a channel state information (CSI) report. Consequently, decoding of the CSI report fails, and subsequent data transmission performance is affected.

SUMMARY

This application provides a method for indicating vectors used to construct a precoding vector and a communications apparatus, to ensure successful decoding of a CSI report.

According to a first aspect, a method for indicating vectors used to construct a precoding vector is provided. The method may be performed by a terminal device, or may be performed by a chip disposed in a terminal device.

Specifically, the method includes: generating a CSI report, where the CSI report is used to indicate a quantity of space-frequency vector pairs reported for R transport layers, and indication overheads of the quantity of space-frequency vector pairs are irrelevant to a quantity R of the transport layers, where each space-frequency vector pair includes one spatial domain vector and one frequency domain vector, one or more space-frequency vector pairs reported for an $r^{th}$ transport layer in the R transport layers are used to construct a precoding vector corresponding to each frequency domain unit at the $r^{th}$ transport layer, $1 \le r \le R$, $R \ge 1$, and both r and R are integers; and transmitting the CSI report.

According to a second aspect, a method for indicating vectors used to construct a precoding vector is provided. The method may be performed by a network device, or may be performed by a chip disposed in a network device.

Specifically, the method includes: receiving a CSI report, where the CSI report is used to indicate a quantity of space-frequency vector pairs reported for R transport layers, and indication overheads of the quantity of space-frequency vector pairs are irrelevant to a quantity R of the transport layers, where each space-frequency vector pair includes one spatial domain vector and one frequency domain vector, one or more space-frequency vector pairs reported for an $r^{th}$ transport layer in the R transport layers are used to construct a precoding vector corresponding to each frequency domain unit at the $r^{th}$ transport layer, $1 \le r \le R$, $R \ge 1$, and both r and R are integers; and determining, based on the CSI report, a spatial domain vector and a frequency domain vector that are used to construct the precoding vector.

Based on the foregoing designs, the terminal device may generate an indication field having a fixed length in the CSI report, so that the network device determines indication overheads of other indication information based on the indication field having the fixed length. The network device may parse, based on the CSI report, the other indication information than the quantity of space-frequency vector pairs, to obtain other information that is reported by the terminal device and that may be used to construct the precoding vector, for example, a space-frequency vector pair and a weighting coefficient corresponding to the space-frequency vector pair. Therefore, this can ensure that the network device successfully decodes the CSI report. The network device may construct a precoding matrix of each frequency domain unit based on information obtained through decoding. This helps ensure subsequent data transmission performance. In addition, the precoding vector constructed based on the space-frequency vector pair and the weighting coefficient that are reported by the terminal device is determined based on downlink channels in a plurality of frequency domain units, and can well adapt to the downlink channels due to frequency domain correlation, thereby ensuring relatively high feedback precision. In addition, compared with a feedback manner of a type II codebook in the current technology, in the method for indicating vectors used to construct a precoding vector, feedback overheads do not increase as a quantity of frequency domain units increases. This helps reduce the feedback overheads.

It should be understood that, according to the current technology, the space-frequency vector pair and the weighting coefficient that can be used to construct the precoding vector may be reported by using the CSI report. A specific method for indicating the space-frequency vector pair and the weighting coefficient corresponding to the space-frequency vector pair by the terminal device is not limited in this application.

With reference to the first aspect or the second aspect, in some implementations, the CSI report is further used to indicate positions of the space-frequency vector pairs reported for each of the R transport layers.

Optionally, the positions of the space-frequency vector pairs reported for each of the R transport layers are indicated by a bitmap, a plurality of indicator bits in the bitmap correspond to a plurality of space-frequency vector pairs, and each indicator bit is used to indicate whether a corresponding space-frequency vector pair is selected.

The bitmap is used to indicate a selected space-frequency vector pair in the plurality of space-frequency vector pairs. A total quantity of selected space-frequency vector pairs is the quantity of space-frequency vector pairs reported for the R transport layers. Therefore, the quantity of space-frequency vector pairs reported for the R transport layers may be indirectly indicated by using the bitmap. In addition, because the selected space-frequency vector pair is selected from the plurality of the space-frequency vector pairs, through indication of the selected space-frequency vector pair by using the bitmap, a relative position of the selected space-frequency vector pair in the plurality of space-frequency vector pairs is indirectly indicated.

Optionally, the positions of the space-frequency vector pairs reported for each of the R transport layers are indicated by R indexes, and an $r^{th}$ index in the R indexes is an index of a combination of the space-frequency vector pairs reported for the $r^{th}$ transport layer in a plurality of space-frequency vector pairs.

With reference to the first aspect or the second aspect, in some implementations, the indication overheads of the quantity of space-frequency vector pairs are a maximum value that is of $$\sum_{r=1}^{R}\lceil\log_2 K_r\rceil$$

and that is determined by traversing R from 1 to $R_m$, where $K_r$ represents a quantity of to-be-reported space-frequency vector pairs that is pre-configured for the $r^{th}$ transport layer when the quantity of the transport layers is R, $R_m$ is a predefined maximum quantity of transport layers, $K_r \geq 1$, $R_m \geq 1$, and both $K_r$ and $R_m$ are integers.

Therefore, the network device may determine a quantity of space-frequency vectors reported for each of the R transport layers. With reference to the first aspect or the second aspect, in some implementations, the indication overheads of the quantity of space-frequency vector pairs are a maximum value that is of $$\left\lceil\log_2\left(\sum_{r=1}^{R}K_r\right)\right\rceil$$

and that is determined by traversing R from 1 to $R_m$, where $K_r$ represents a quantity of to-be-reported space-frequency vector pairs that is pre-configured for the $r^{th}$ transport layer when the quantity of the transport layers is R, $R_m$ is a predefined maximum quantity of transport layers, $K_r \geq 1$, $R_m \geq 1$, and both $K_r$ and $R_m$ are integers.

Therefore, the terminal device may determine a total quantity of space-frequency vectors reported for the R transport layers.

It may be learned from the foregoing two types of indication overheads that the indication overheads of the quantity of space-frequency vector pairs are irrelevant to the quantity R of the transport layers. The indication overheads of the quantity of space-frequency vector pairs may be a fixed value.

With reference to the first aspect or the second aspect, in some implementations, the indication of the quantity of space-frequency vector pairs reported for the R transport layers is located in a first part of the CSI report.

Because the indication overheads of the quantity of space-frequency vector pairs reported for the R transport layers may be a fixed value, the indication may be designed in the first part of the CSI report, so that the network device performs decoding based on predefined overheads of the first part. In addition, based on the indication of the quantity of space-frequency vector pairs, the network device may further determine indication overheads of weighting coefficients reported for the R transport layers and other related overheads, to determine a length of a second part, to decode the second part.

With reference to the first aspect or the second aspect, in some implementations, the CSI report is further used to indicate one or more spatial domain vectors and one or more frequency domain vectors that are reported for each of the R transport layers, where the space-frequency vector pairs reported for the $r^{th}$ transport layer are selected from $L_r \times M_r$ space-frequency vector pairs determined by $L_r$ spatial domain vectors and $M_r$ frequency domain vectors, $L_r$ is a quantity of the spatial domain vectors reported for the $r^{th}$ transport layer, $M_r$ is a quantity of the frequency domain vectors reported for the $r^{th}$ transport layer, $L_r \geq 1$, $M_r \geq 1$, and both $L_r$ and $M_r$ are integers.

The space-frequency vector pairs reported for each of the transport layers may be selected from a plurality of space-frequency vector pairs. The plurality of space-frequency vector pairs may be determined by the terminal device based on a predefined spatial domain vector set and a predefined frequency domain vector set. To be specific, some vectors are first selected from the spatial domain vector set and the frequency domain vector set, and then a space-frequency vector pair used to construct a precoding vector is further selected from space-frequency vector pairs constructed by the some vectors. In other words, a quantity of space-frequency vector pairs for constructing the precoding vector is reduced, and the space-frequency vector pair used to construct the precoding vector is indicated through indication of a relative position of the space-frequency vector pair used to construct the precoding vector in the plurality of space-frequency vector pairs. This can reduce the indication overheads.

Optionally, spatial domain vectors reported for any two transport layers are the same.

In other words, one or more spatial domain vectors may be shared at a plurality of transport layers. When indicating a spatial domain vector reported for each transport layer, the terminal device may indicate, by using same indication information, the spatial domain vectors reported for the R transport layers. In other words, the spatial domain vectors reported for the R transport layers may be indicated only once.

Optionally, frequency domain vectors reported for any two transport layers are at least partially the same.

In other words, some frequency domain vectors may be shared at a plurality of transport layers. For example, M frequency domain vectors are reported for the first transport layer, and M/2 frequency domain vectors are reported for the second transport layer. In this case, the terminal device may indicate the M frequency domain vectors and relative positions of the M/2 frequency domain vectors in the M frequency domain vectors. Compared with a method in which a frequency domain vector is reported for each transport layer, the indication overheads in this method can be reduced.

With reference to the first aspect or the second aspect, in some implementations, the CSI report is further used to indicate a weighting coefficient reported for each transport layer.

The network device may determine, based on the space-frequency vector pair and the weighting coefficient that are reported for each transport layer, the precoding vector corresponding to each frequency domain unit, and further determine the precoding matrix corresponding to the frequency domain unit.

With reference to the first aspect or the second aspect, in some implementations, the CSI report includes the second part, and the second part includes a first field, a second field, and a third field. The first field includes the indication of the spatial domain vector reported for each transport layer, the second field includes the indication of the frequency domain vector reported for the transport layer, the third field includes the indication of the weighting coefficient reported for the transport layer, and a fourth field includes the indication of the position of the space-frequency vector pair reported for the transport layer. Alternatively, the first field includes the indication of the frequency domain vector reported for each transport layer, the second field includes the indication of the spatial domain vector reported for the transport layer, the third field includes the indication of the weighting coefficient reported for the transport layer, and a fourth field includes the indication of the position of the space-frequency vector pair reported for the transport layer. The spatial domain vectors reported for the $r^{th}$ transport layer and the frequency domain vectors reported for the $r^{th}$ transport layer are used to determine the $L_r \times M_r$ space-frequency vector pairs. Fields in the second part are named the first field, the second field, and the third field only for ease of distinguishing between different functions herein. Actually, the fields may further include sub-fields corresponding to the transport layers. This is not limited in this application.

With reference to the first aspect, in some implementations of the first aspect, an encoding sequence of the fields in the second part is: The first field is located before the second field, the second field is located before the fourth field, and the fourth field is located before the third field. In addition, information in each field is sequentially encoded in a sequence from the first transport layer to the $R^{th}$ transport layer.

It should be understood that the encoding sequence described herein may be understood as a sequence of bit sequences corresponding to the fields in a bit sequence generated based on the CSI report. For example, the bit sequences corresponding to the fields in the second part may be input, according to the sequence, into an encoder for encoding. Therefore, an encoding sequence of a plurality of fields does not mean that the plurality of fields are independently encoded for a plurality of times. The plurality of fields in the second part may be encoded as a whole. For example, the plurality of fields belong to a code block.

Correspondingly, with reference to the second aspect, in some implementations of the second aspect, a decoding sequence of the fields in the second part is: The first field is located before the second field, the second field is located before the fourth field, and the fourth field is located before the third field. In addition, information in each field is sequentially decoded in a sequence from the first transport layer to the $R^{th}$ transport layer.

It should be understood that the decoding sequence described herein may be understood as a sequence of parsing the CSI report. For example, bit sequences corresponding to the fields in the second part may be input, according to the sequence, into a decoder for decoding. Therefore, a decoding sequence of a plurality of fields does not mean that the plurality of fields are independently decoded for a plurality of times. The plurality of fields in the second part may be decoded as a whole. For example, the plurality of fields belong to a decoding block.

With reference to the first aspect or the second aspect, in some implementations, when a scheduled transmission resource is smaller than a transmission resource required for the CSI report, the method further includes:

determining to-be-discarded information in the second part in ascending order of priorities, where a priority of the third field is lower than a priority of the second field, the priority of the second field is lower than a priority of the first field, and priorities of information in each field are in descending order from the first transport layer to the $R^{th}$ transport layer.

Information in the second part is discarded in ascending order of the priorities, so that more important indication information, for example, a stronger weighting coefficient of a space-frequency vector pair, can be retained to a maximum extent, so that a precoding vector recovered by the network device based on the CSI report in which some information is discarded can still well adapt to a channel.

According to a third aspect, a method for indicating vectors used to construct a precoding vector is provided. The method may be performed by a terminal device, or may be performed by a chip disposed in a terminal device.

Specifically, the method includes: generating a channel state information CSI report, where the CSI report includes a bitmap, a length of the bitmap is irrelevant to a quantity R of transport layers, a plurality of indicator bits in the bitmap correspond to a plurality of space-frequency vector pairs, and each indicator bit is used to indicate whether a corresponding space-frequency vector pair is selected, where one or more space-frequency vector pairs reported for an $r^{th}$ transport layer in the R transport layers are used to construct a precoding vector corresponding to each frequency domain unit at the $r^{th}$ transport layer, $1 \le r \le R$, $R \ge 1$, and both r and R are integers; and transmitting the CSI report.

According to a fourth aspect, a method for indicating vectors used to construct a precoding vector is provided. The method may be performed by a network device, or may be performed by a chip disposed in a network device.

Specifically, the method includes: receiving a CSI report, where the CSI report includes a bitmap, a length of the bitmap is irrelevant to a quantity R of transport layers, a plurality of indicator bits in the bitmap correspond to a plurality of space-frequency vector pairs, and each indicator bit is used to indicate whether a corresponding space-frequency vector pair is selected, where each space-frequency vector pair includes one spatial domain vector and one frequency domain vector, one or more space-frequency vector pairs reported for an $r^{th}$ transport layer in the R transport layers are used to construct a precoding vector corresponding to each frequency domain unit at the $r^{th}$ transport layer, 1≤r≤R, R≥1, and both r and R are integers; and determining, based on the CSI report, a space-frequency vector pair reported for each transport layer.

Based on the foregoing designs, the terminal device may generate a bitmap having a fixed length in the CSI report, so that the network device determines indication overheads of other indication information based on the bitmap having the fixed length. The network device may parse, based on the CSI report, the other indication information than the space-frequency vector pairs, to obtain other information that is reported by the terminal device and that may be used to construct the precoding vector, for example, a weighting coefficient corresponding to a space-frequency vector pair. Therefore, this can ensure that the network device successfully decodes the CSI report. The network device may construct a precoding matrix of each frequency domain unit based on information obtained through decoding. This helps ensure subsequent data transmission performance. In addition, the precoding vector constructed based on the space-frequency vector pair and the weighting coefficient that are reported by the terminal device is determined based on downlink channels in a plurality of frequency domain units, and can well adapt to the downlink channels due to frequency domain correlation, thereby ensuring relatively high feedback precision. In addition, compared with a feedback manner of a type II codebook in the current technology, in the method for indicating vectors used to construct a precoding vector, feedback overheads do not increase as a quantity of frequency domain units increases. This helps reduce the feedback overheads.

It should be understood that, according to the current technology, the weighting coefficient used to construct the precoding vector may be reported by using the CSI report. A specific method for indicating the weighting coefficient by the terminal device is not limited in this application.

With reference to the third aspect or the fourth aspect, in some implementations, a quantity of polarization directions of a transmit antenna is 2, and the length of the bitmap is $2L \times M \times R_m$ bits, where $R_m$ is a predefined maximum value of the quantity R of transport layers, L is a maximum value that is of $L_r$ and that is determined by traversing r from 1 to R and traversing R from 1 to $R_m$, and M is a maximum value that is of $M_r$ and that is determined by traversing r from 1 to R and traversing R from 1 to $R_m$.

In this design, for the quantity R of transport layers, the first $2L \times M \times R$ bits in the bitmap are valid, and remaining bits may be padded with any values, to ensure that the length of the bitmap is a fixed value.

With reference to the third aspect or the fourth aspect, in some implementations, a quantity of polarization directions of a transmit antenna is 2, and the length of the bitmap is $2L \times M \times 2$ bits, where L is a maximum value that is of $L_r$ and that is determined by traversing r from 1 to R and traversing R from 1 to $R_m$, M is a maximum value that is of $M_r$ and that is determined by traversing r from 1 to R and traversing R from 1 to $R_m$, and $R_m$ is a predefined maximum value of the quantity R of transport layers.

In this design, when the quantity R of transport layers is 1, the first $2L \times M$ bits in the bitmap are valid, and remaining bits may be padded with any values. When the quantity R of transport layers is greater than 1, all bits in the bitmap are valid. Therefore, the length of the bitmap may be a fixed value.

With reference to the third aspect or the fourth aspect, in some implementations, a quantity of polarization directions of a transmit antenna is 2, and the length of the bitmap is $2L \times M$ bits, where L is a maximum value that is of $L_r$ and that is determined by traversing r from 1 to R and traversing R from 1 to $R_m$, M is a maximum value that is of $M_r$ and that is determined by traversing r from 1 to R and traversing R from 1 to $R_m$, and $R_m$ is a predefined maximum value of the quantity R of transport layers.

In this design, when the quantity R of transport layers is an arbitrary value, all bits in the bitmap are valid. In addition, the length of the bitmap may be a fixed value.

With reference to the first aspect or the third aspect, in some implementations, the method further includes: receiving first indication information, where the first indication information is used to indicate a quantity of to-be-reported space-frequency vector pairs that is configured for each transport layer.

Correspondingly, with reference to the second aspect or the fourth aspect, in some implementations, the method further includes: transmitting first indication information, where the first indication information is used to indicate a quantity of to-be-reported space-frequency vector pairs that is configured for each transport layer.

The terminal device may determine, based on the configuration of the network device, a quantity of space-frequency vector pairs that need to be reported for each transport layer. In addition, if the indication of the quantity of space-frequency vector pairs reported for the R transport layers in the first aspect or the second aspect is placed in a first part of the CSI report, the network device and the terminal device may determine, based on the same reporting quantity, indication overheads of a quantity of space-frequency vector pairs reported for each transport layer.

It should be understood that the quantity of to-be-reported space-frequency vector pairs that is configured for each transport layer may be greater than a quantity of actually reported space-frequency vector pairs. For example, when amplitude quantization values of weighting coefficients of some space-frequency vector pairs are zero, the space-frequency vector pairs may not be reported.

With reference to the first aspect or the third aspect, in some implementations, the method further includes: receiving second indication information, where the second indication information is used to indicate a quantity of to-be-reported spatial domain vectors that is configured for each transport layer.

Correspondingly, with reference to the second aspect or the fourth aspect, in some implementations, the method further includes: transmitting second indication information, where the second indication information is used to indicate a quantity of to-be-reported spatial domain vectors that is configured for each transport layer.

The terminal device may determine, based on the configuration of the network device, a quantity of spatial domain vectors that need to be reported for each transport layer. In addition, the network device and the terminal device may determine the length of the bitmap based on a same quantity of reported spatial domain vectors.

With reference to the first aspect or the third aspect, in some implementations, the method further includes: receiving third indication information, where the third indication information is used to indicate a quantity of to-be-reported frequency domain vectors that is configured for each transport layer.

Correspondingly, with reference to the second aspect or the fourth aspect, in some implementations, the method further includes: transmitting third indication information, where the third indication information is used to indicate a quantity of to-be-reported frequency domain vectors that is configured for each transport layer.

The terminal device may determine, based on the configuration of the network device, a quantity of frequency domain vectors that need to be reported for each transport layer. In addition, the network device and the terminal device may determine the length of the bitmap based on a same quantity of reported frequency domain vectors.

With reference to any one of the first aspect to the fourth aspect, in some implementations, when a plurality of weighting coefficients are determined for each transport layer, the plurality of weighting coefficients correspond to at least two priorities, and the at least two priorities include a first priority and a second priority, where an amplitude of a weighting coefficient corresponding to the first priority is greater than or equal to an amplitude of a weighting coefficient corresponding to the second priority, priorities of weighting coefficients that are of the transport layers and that correspond to the first priority are higher than priorities of weighting coefficients that are of the transport layers and that correspond to the second priority, and in weighting coefficients that are of a plurality of transport layers and that correspond to a same priority, priorities of the weighting coefficients of the R transport layers are in descending order from the first transport layer to the $R^{th}$ transport layer.

When a transmission resource scheduled by the network device is insufficient to carry the CSI report, to retain stronger weighting coefficients of space-frequency vector pairs as many as possible, the weighting coefficients may have a plurality of priorities through division. The terminal device may first discard a low-priority weighting coefficient, and then discard a high-priority weighting coefficient. In this way, it is advantageous to retain more stronger weighting coefficients of space-frequency vector pairs.

With reference to any one of the first aspect to the fourth aspect, in some implementations, when a plurality of weighting coefficients are determined for each transport layer, quantities of quantization bits of the plurality of weighting coefficients are determined based on at least two quantization levels; and the at least two quantization levels include a first quantization level and a second quantization level, and a quantity of quantization bits of a weighting coefficient corresponding to the first quantization level is greater than a quantity of quantization bits of a weighting coefficient corresponding to the second quantization level.

To use more bit overheads for stronger space-frequency vector pairs, the weighting coefficients may have a plurality of quantization levels. A stronger weighting coefficient of a space-frequency vector pair is quantized by using more quantization bits, and a weaker weighting coefficient of a space-frequency vector pair is quantized by using fewer quantization bits. Therefore, limited indicator bits may be more properly used for feedback, so that a precoding matrix recovered by the network device better adapts to a channel.

Further, in the third field, a priority of a weighting coefficient that is of each transport layer and that corresponds to the first quantization level is higher than a priority of a weighting coefficient that is of each transport layer and that corresponds to the second quantization level. In addition, in a plurality of weighting coefficients that are of the transport layers and that correspond to a same quantization level, priorities of the weighting coefficients of the R transport layers are in descending order from the first transport layer to the $R^{th}$ transport layer.

A weighting coefficient corresponding to more quantization bits may have a higher priority, and a weighting coefficient corresponding to fewer quantization bits may have a lower priority. Different priorities may be distinguished based on different quantization levels, so that the terminal device may first discard a low-priority weighting coefficient, and then discard a high-priority weighting coefficient. In this way, it is advantageous to retain more stronger weighting coefficients of space-frequency vector pairs.

With reference to any one of the first aspect to the fourth aspect, in some implementations, an amplitude quantization value of the weighting coefficient corresponding to the first quantization level is greater than or equal to an amplitude quantization value of the weighting coefficient corresponding to the second quantization level.

That is, the quantization levels may be obtained through division based on the amplitude quantization values of the weighting coefficients. With reference to any one of the first aspect to the fourth aspect, in some implementations, a quantity of quantization bits of a phase in the weighting coefficient corresponding to the first quantization level is greater than a quantity of quantization bits of a phase in the weighting coefficient corresponding to the second quantization level.

That is, a weighting coefficient having a higher quantization level may use more quantization bits, and a weighting coefficient having a lower quantization level may use fewer quantization bits. A stronger weighting coefficient of a space-frequency vector pair is quantized by using more quantization bits, and a weaker weighting coefficient of a space-frequency vector pair is quantized by using fewer quantization bits. Therefore, limited indicator bits may be more properly used for feedback, so that a precoding matrix recovered by the network device better adapts to a channel.

According to a fifth aspect, a communications apparatus is provided. The communications apparatus includes modules or units configured to perform the method according to any one of the first aspect, the third aspect, or the possible implementations of the first aspect or third aspect.

According to a sixth aspect, a communications apparatus is provided. The communications apparatus includes a processor. The processor is coupled to a memory, and may be configured to execute an instruction in the memory, to implement the method according to any one of the first aspect, the third aspect, or the possible implementations of the first aspect or third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver, or an input/output interface.

In another implementation, the communications apparatus is a chip disposed in a terminal device. When the communications apparatus is a chip disposed in a terminal device, the communications interface may be an input/output interface.

Optionally, the transceiver may be a transceiver circuit. Optionally, the input/output interface may be an input/output circuit.

According to a seventh aspect, a communications apparatus is provided. The communications apparatus includes modules or units configured to perform the method according to any one of the second aspect, the fourth aspect, or the possible implementations of the second aspect or fourth aspect.

According to an eighth aspect, a communications apparatus is provided. The communications apparatus includes a processor. The processor is coupled to a memory, and may be configured to execute an instruction in the memory, to implement the method according to any one of the second aspect, the fourth aspect, or the possible implementations of the second aspect or fourth aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver, or an input/output interface.

In another implementation, the communications apparatus is a chip disposed in a network device. When the communications apparatus is a chip disposed in a network device, the communications interface may be an input/output interface.

Optionally, the transceiver may be a transceiver circuit. Optionally, the input/output interface may be an input/output circuit.

According to a ninth aspect, a processor is provided. The processor includes an input circuit, an output circuit, and a processing circuit. The processing circuit is configured to: receive a signal via the input circuit, and transmit a signal via the output circuit, so that the processor performs the method according to any one of the first aspect to the fourth aspect or the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to a tenth aspect, a processing apparatus is provided. The processing apparatus includes a processor and a memory. The processor is configured to: read an instruction stored in the memory, receive a signal via a receiver, and transmit a signal via a transmitter, to perform the method according to any one of the first aspect to the fourth aspect or the possible implementations of the first aspect to the fourth aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that for a related data exchange process, for example, transmitting of indication information may be a process of outputting indication information from the processor, and receiving of capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus in the tenth aspect may be one or more chips. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, may be located outside the processor, or may exist independently.

According to an eleventh aspect, a computer program product is provided. The computer program product includes a computer program (also referred to as code or an instruction). When the computer program is run, a computer is enabled to perform the method according to any one of the first aspect to the fourth aspect or the possible implementations of the first aspect to the fourth aspect.

According to a twelfth aspect, a computer-readable medium is provided. The computer-readable medium stores a computer program (also referred to as code or an instruction). When the computer program is run on a computer, the computer is enabled to perform the method according to any one of the first aspect to the fourth aspect or the possible implementations of the first aspect to the fourth aspect.

According to a thirteenth aspect, a communications system is provided. The communications system includes the foregoing network device and terminal device.

BRIEF DESCRIPTION OF DRAWINGS

FIG. 3 to FIG. 8 each are a schematic diagram of a second part of a CSI report according to an embodiment of this application;

FIG. 10 to FIG. 15 each are a schematic diagram of a second part of a CSI report according to another embodiment of this application;

DESCRIPTION OF EMBODIMENTS

The following describes technical solutions of this application with reference to the accompanying drawings.

The technical solutions of embodiments of this application may be applied to various communications systems, such as a global system for mobile communications (GSM)

system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communications system, or a 5th generation (5G) system or new radio (NR) system.

Figure 1:
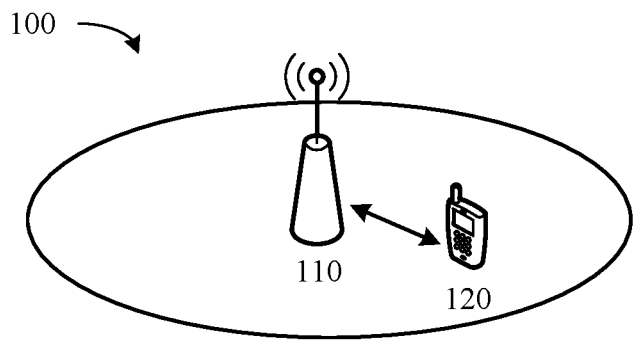
FIG. 1 is a schematic diagram of a communications system to which a method for indicating vectors used to construct a precoding vector according to an embodiment of this application is applicable.

To facilitate understanding of the embodiments of this application, a communications system shown in FIG. 1 is first used as an example to describe in detail a communications system applicable to the embodiments of this application. FIG. 1 is a schematic diagram of a communications system 100 to which a method for indicating vectors used to construct a precoding vector according to an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. Each communications device, such as the network device 110 or the terminal device 120, may be configured with a plurality of antennas. For each communications device in the communications system 100, the plurality of configured antennas may include at least one transmit antenna configured to transmit a signal and at least one received antenna configured to receive a signal. Therefore, all communications devices, such as the network device 110 and the terminal device 120, in the communications system 100 may communicate with each other by using a multiple-antenna technology.

It should be understood that the network device in the communications system may be any device having a wireless transceiver function. The network device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in wireless fidelity (WiFi) system, a wireless relay node, a wireless backhaul node, a transmission point (TP), a transmission reception point (TRP), or the like; or may be a gNB or a transmission point (TRP or TP) in a 5G system such as an NR system, or one antenna panel or one group of antenna panels (including a plurality of antenna panels) of a base station in a 5G system; or may be a network node that constitutes a gNB or a transmission point, for example, a baseband unit (BBU) or a distributed unit (DU).

In some deployment, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC), a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the RU. It may be understood that the network device may be a CU node, a DU node, or a device including a CU node and a DU node. In addition, the CU may be a network device in an access network (radio access network, RAN), or may be a network device in a core network (CN). This is not limited in this application.

It should be further understood that the terminal device in the wireless communications system may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

To facilitate understanding of the embodiments of this application, the following briefly describes a processing process of a downlink signal at a physical layer before the downlink signal is sent. It should be understood that the processing process of the downlink signal described below may be performed by a network device, or may be performed by a chip disposed in a network device. For ease of description, the network device and the chip disposed in the network device are collectively referred to as a network device below.

The network device may process a codeword on a physical channel. The codeword may be a coded bit on which coding (for example, including channel coding) is performed. Scrambling is performed on the codeword, to generate a scrambled bit. Modulation mapping is performed on the scrambled bit, to obtain a modulation symbol. The modulation symbol is mapped to a plurality of layers (layer), which are referred to as transport layers, through layer mapping. Precoding is performed on the modulation symbol obtained through the layer mapping, to obtain a precoded signal. The precoded signal is mapped to a plurality of resource elements (RE) through RE mapping. These REs are then transmitted through an antenna port after orthogonal frequency division multiplexing (OFDM) modulation.

It should be understood that the processing process of the downlink signal described above is merely an example for description, and should not constitute any limitation on this application. For a specific processing process of the downlink signal, refer to the current technology. For brevity, detailed descriptions of the specific process are omitted herein.

To facilitate understanding of the embodiments of this application, the following first briefly describes terms in the embodiments of this application.

1. Precoding technology: When knowing a channel state, a transmitting device (for example, a network device) processes a to-be-sent signal by using a precoding matrix that matches a channel resource, so that a precoded to-be-sent signal adapts to a channel, and complexity of eliminating inter-channel impact by a receiving device (for example, a terminal device) is reduced. Therefore, after precoding processing is performed on the to-be-sent signal, received signal quality (for example, a signal to interference plus noise ratio (SINR)) is improved. Therefore, the transmitting device and a plurality of receiving devices can perform transmission on a same time-frequency resource by using the precoding technology. In other words, multi-user multiple-input multiple-output (MU-MIMO) is implemented.

It should be understood that the related descriptions about the precoding technology are merely an example for ease of understanding, and are not intended to limit the protection scope of the embodiments of this application. In a specific implementation process, the transmitting device may alternatively perform precoding in another manner. For example, when channel information (for example, but not limited to a channel matrix) cannot be learned of, precoding is performed by using a preset precoding matrix or in a preset weighted processing manner. For brevity, specific content of the precoding technology is not described in detail in this specification.

2. Channel state information (CSI) report: The CSI report is information that is used to describe a channel attribute of a communications link and reported by a receiving device (for example, a terminal device) to a transmitting device (for example, a network device) in a wireless communications system. The CSI report may also be referred to as CSI for short.

For example, the CSI report may include, but is not limited to, a precoding matrix indicator (PMI), a rank indication (RI), a channel quality indicator (CQI), a channel state information reference signal (CSI-RS) resource indicator (CSI-RS resource indicator, CRI), a layer indicator (LI), and the like. It should be understood that the specific content listed above and included in the CSI report is merely an example for description, and should not constitute any limitation on this application. The CSI report may include one or more of the items listed above, or may include other information than those listed above, where the other information is used to represent the CSI. This is not limited in this application.

For example, the terminal device reports the CSI to the network device.

The terminal device may report one or more CSI reports in one time unit (for example, a slot), and each CSI report may correspond to one CSI reporting configuration condition. For example, the CSI reporting configuration condition may be determined based on a CSI reporting setting. The CSI reporting setting may be used to indicate a time domain behavior, bandwidth, a format corresponding to a report quantity, and the like that are of CSI reporting. The time domain behavior includes, for example, periodic, semi-persistent, and aperiodic. The terminal device may generate one CSI report based on one CSI reporting setting.

That the terminal device reports one or more CSI reports in one time unit such as one slot may be referred as one-time reporting of the CSI reports.

In the embodiments of this application, when the terminal device generates the CSI report, information used to indicate a precoding vector may be divided into two parts. For example, the CSI report may include a first part and a second part. The first part and the second part may be independently encoded. A payload size of the first part may be predefined, and a payload size of the second part may be determined based on information carried in the first part.

The network device may decode the first part based on the predefined payload size of the first part, to obtain the information carried in the first part. The network device may determine the payload size of the second part based on the information obtained from the first part, and then decode the second part to obtain information carried in the second part.

It should be understood that functions of the first part and the second part may be similar to functions of a part 1 and a part 2 of CSI that are defined in Release 15 (R15) of the NR protocol TS38.214.

It should be further understood that, because the embodiments of this application mainly relate to reporting of the PMI, content that is of the first part and the second part of the CSI report and listed in the following embodiments relates only to related information of the PMI, and does not relate to other information. However, it should be understood that, this should not constitute any limitation on this application. In addition to the information that is included or indicated in the first part and the second part of the CSI report and that is listed in the following embodiments, the first part of the CSI report may further include one or more of the RI, the CQI, and the LI, or may further include other information used to predefine feedback overheads, and the second part of the CSI report may further include other information. This is not limited in this application.

3. Precoding matrix and precoding matrix indicator (PMI): The PMI may be carried in a CSI report to indicate a precoding matrix. The precoding matrix may be, for example, a precoding matrix that corresponds to each frequency domain unit and that is determined by the terminal device based on a channel matrix of the frequency domain unit (for example, a subband).

The channel matrix may be determined by the terminal device based on channel reciprocity or through channel estimation or in another manner. However, it should be understood that a specific method for determining the channel matrix by the terminal device is not limited to the foregoing descriptions. For a specific implementation, refer to the current technology. For brevity, details are not listed herein.

The precoding matrix may be obtained by performing singular value decomposition (SVD) on the channel matrix or on a covariance matrix of the channel matrix, or may be obtained by performing eigenvalue decomposition (EVD) on a covariance matrix of the channel matrix. It should be understood that the foregoing listed methods for determining the precoding matrix are merely examples, and should not constitute any limitation on this application. For a method for determining the precoding matrix, refer to the current technology. For brevity, details are not listed herein.

It should be noted that, according to the method for indicating vectors used to construct a precoding vector provided in the embodiments of this application, the network device may determine, based on a feedback of the terminal device, a space-frequency vector pair used to construct a precoding vector, and further determine the precoding matrix corresponding to each frequency domain unit. The precoding matrix may be directly used for downlink data transmission. Some beamforming methods, including, for example, zero forcing (ZF), regularized zero-forcing (RZF), minimum mean-squared error (MMSE), and maximizing a signal-to-leakage-and-noise ratio (SLNR), may also be used, to obtain a precoding matrix finally used for downlink data transmission. This is not limited in this application. Unless otherwise specified, all precoding matrices mentioned below may be determined according to the method provided in this application.

4. Precoding vector: A precoding matrix may include one or more vectors, for example, column vectors. One precoding matrix may be used to determine one or more precoding vectors.

When a quantity of transport layers is 1 and a quantity of polarization directions of a transmit antenna is also 1, a precoding vector may be a precoding matrix. When a quantity of transport layers is greater than 1 and a quantity of polarization directions of a transmit antenna is 1, a precoding vector may be a component of a precoding matrix at a transport layer. When a quantity of transport layers is 1 and a quantity of polarization directions of a transmit antenna is greater than 1, a precoding vector may be a component of a precoding matrix in a polarization direction. When a quantity of transport layers is greater than 1 and a quantity of polarization directions of a transmit antenna is also greater than 1, a precoding vector may be a component of a precoding matrix at a transport layer in a polarization direction.

It should be understood that the precoding vector may alternatively be determined based on a vector in the precoding matrix, for example, obtained by performing mathematical transformation on the vector in the precoding matrix. A mathematical transformation relationship between the precoding matrix and the precoding vector is not limited in this application.

5. Antenna port: The antenna port is referred to as a port for short. The antenna port may be understood as a virtual antenna identified by a receiving device, or a transmit antenna that can be distinguished in space. One antenna port may be configured for each virtual antenna, each virtual antenna may be a weighted combination of a plurality of physical antennas, and each antenna port may correspond to one reference signal port. Therefore, each antenna port may be referred to as a port of one reference signal. In the embodiments of this application, the antenna port may refer to an actually independent transmitting unit (transceiver unit, TxRU).

6. Spatial domain vector: The spatial domain vector is also referred to as a beam vector. Each element in the spatial domain vector may represent a weight of each antenna port. Based on the weights that are of the antenna ports and that are represented by the elements in the spatial domain vector, linear superposition is performed on signals of the antenna ports, so that an area in which a signal is relatively strong may be formed in a direction of space.

For ease of description below, it is assumed that the spatial domain vector is denoted as $u_s$. A length of the spatial domain vector $u_s$ may be a quantity $N_s$ of transmit antenna ports in a polarization direction, where $N_s \geq 1$, and $N_s$ is an integer. The spatial domain vector may be, for example, a column vector or a row vector whose length is $N_s$. This is not limited in this application.

Optionally, the spatial domain vector is obtained from a discrete Fourier transform (DFT) matrix. Each column vector in the DFT matrix may be referred to as a DFT vector. In other words, the spatial domain vector may be a DFT vector. The spatial domain vector may be, for example, a DFT vector defined in a type II codebook in Release 15 (R15) of the NR protocol TS 38.214.

7. Spatial domain vector set: The spatial domain vector set may include a plurality of spatial domain vectors having different lengths, to correspond to different quantities of transmit antenna ports. In the embodiments of this application, a length of a spatial domain vector is $N_s$. Therefore, a length of each spatial domain vector in a spatial domain vector set to which a spatial domain vector reported by the terminal device belongs is $N_s$.

In a possible design, the spatial domain vector set may include $N_s$ spatial domain vectors, and the $N_s$ spatial domain vectors may be orthogonal to each other. Each spatial domain vector in the spatial domain vector set may be obtained from a two-dimensional (2 dimension, 2D)-DFT matrix. 2D may represent two different directions, for example, a horizontal direction and a vertical direction.

The $N_s$ spatial domain vectors may be denoted as, for example, $b_s^1, b_s^2, \ldots,$ and $b_s^{N_s}$. The $N_s$ spatial domain vectors may be used to construct a matrix $U_s$, where $U_s \square [b_s^1, b_s^2 \ldots b_s^{N_s}]$.

In another possible design, the spatial domain vector set may be extended to $O_s \times N_s$ spatial domain vectors by using an oversampling factor $O_s$. In this case, the spatial domain vector set may include $O_s$ subsets, and each subset may include $N_s$ spatial domain vectors. The $N_s$ spatial domain vectors in each subset may be orthogonal to each other. Each spatial domain vector in the spatial domain vector set may be obtained from an oversampled 2D-DFT matrix. The oversampling factor $O_s$ is a positive integer. Specifically, $O_s = O_1 \times O_2$, $O_1$ may be an oversampling factor in the horizontal direction, and $O_2$ may be an oversampling factor in the vertical direction. $O_1 \geq 1$, $O_2 \geq 1$, and $O_1$ and $O_2$ are not both 1 at the same time and are both integers.

$N_s$ spatial domain vectors in an $o_s^{th}$ (where $0 \leq o_s \leq O_s - 1$ and $o_s$ is an integer) subset in the spatial domain vector set may be denoted as, for example, $b_{s,o_s}^1, b_{s,o_s}^2, \ldots,$ and $b_{s,o_s}^{N_s}$. In this case, a matrix $U_s^{o_s}$ may be constructed based on the $N_s$ spatial domain vectors in the $o_s^{th}$ subset, where $U_{s,o_s} \square [b_{s,o_s}^1, b_{s,o_s}^2, \ldots, b_{s,o_s}^{N_s}]$.

8. Frequency domain unit: The frequency domain unit is a unit of a frequency domain resource, and may represent different frequency domain resource granularities. For example, the frequency domain unit may include, but is not limited to, a subband, a resource block (RB), a subcarrier, a resource block group (RBG), or a precoding resource block group (PRG).

In the embodiments of this application, a precoding matrix corresponding to the frequency domain unit may be a precoding matrix determined by performing channel measurement and feedback based on a reference signal on the frequency domain unit. The precoding matrix corresponding to the frequency domain unit may be used to precode data subsequently transmitted on the frequency domain unit. In the following descriptions, a precoding matrix or a precoding vector corresponding to a frequency domain unit may also be referred to as a precoding matrix or a precoding vector of the frequency domain unit for short.

9. Frequency domain vector: The frequency domain vector is a vector proposed in the embodiments of this application and used to represent a change rule of a channel in frequency domain. Each frequency domain vector may represent one change rule. When a signal is transmitted through a radio channel, the signal may arrive at a receive antenna through a plurality of paths from a transmit antenna. A multipath delay leads to frequency selective fading, namely, a change of a frequency domain channel. Therefore, different frequency domain vectors may be used to represent change rules that are of the channel in frequency domain and caused by delays on different transmission paths.

Optionally, a length of the frequency domain vector is a quantity of some or all of frequency domain units included in bandwidth occupied by CSI measurement in frequency domain.

The bandwidth occupied by the CSI measurement resource in frequency domain may be bandwidth used to transmit a reference signal. The reference signal herein may be a reference signal used for channel measurement, for example, a CSI-RS used for downlink channel measurement. In the embodiments of this application, the length of the frequency domain vector may be a quantity of all frequency domain units included in the bandwidth occupied by the CSI measurement in frequency domain, or may be a quantity of some frequency domain units included in the bandwidth occupied by the CSI measurement in frequency domain. This is not limited in this application. For example, a rule of determining the length of the frequency domain vector based on the bandwidth occupied by the CSI measurement in frequency domain may be defined in the protocol.

In NR, signaling used to indicate the bandwidth occupied by the CSI measurement resource in frequency domain may be, for example, a bandwidth range (CSI-Frequency Occupation) occupied by the CSI.

It should be understood that the bandwidth occupied by the CSI measurement resource in frequency domain is named only for ease of description, and should not constitute any limitation on this application. This application does not exclude a possibility of expressing a same meaning by using another name. It should be further understood that, as an example of the signaling used to indicate the bandwidth occupied by the CSI measurement resource in frequency domain, the CSI-Frequency Occupation should not constitute any limitation on this application. This application does not exclude a possibility of defining other signaling in a future protocol to implement a same or similar function.

Optionally, the length of the frequency domain vector is a length of signaling used to indicate positions and a quantity of to-be-reported frequency domain units.

In NR, the signaling used to indicate positions and a quantity of to-be-reported frequency domain units may be reporting bandwidth (reporting band). For example, the signaling may indicate the positions and the quantity of the to-be-reported frequency domain units by using a bitmap. Therefore, a dimension of the frequency domain vector may be a quantity of bits of the bitmap. It should be understood that the reporting band is merely an example of the signaling used to indicate the positions and the quantity of the to-be-reported frequency domain units, and should not constitute any limitation on this application. This application does not exclude a possibility of defining other signaling in a future protocol to implement a same or similar function.

Optionally, the length of the frequency domain vector is a quantity of to-be-reported frequency domain units.

The quantity of to-be-reported frequency domain units may be indicated by using, for example, the foregoing signaling, the reporting bandwidth. The quantity of to-be-reported frequency domain units may be a quantity of all frequency domain units in the bandwidth occupied by the CSI measurement resource in frequency domain, or may be a quantity of some frequency domain units in the bandwidth occupied by the CSI measurement resource in frequency domain. Alternatively, the quantity of to-be-reported frequency domain units may be the same as a signaling length of the reporting bandwidth, or may be less than a signaling length of the reporting bandwidth. This is not limited in this application.

A length of the frequency domain vector may be specifically predefined in a protocol. The length of the frequency domain unit may be one of the items listed above, or may be defined by using another possible parameter. This is not limited in this application.

When it is defined in the protocol that the length of the frequency domain vector is one of the items listed above, it may be considered that one of the signaling used to indicate the bandwidth occupied by the CSI measurement resource in frequency domain or the signaling used to indicate the positions and the quantity of the to-be-reported frequency domain units implicitly indicates the length of the frequency domain vector.

For ease of description below, it is assumed that the frequency domain vector is denoted as $u_f$, and the length of the frequency domain vector of is $N_f$, where $N_f \geq 1$ and $N_f$ is an integer. The frequency domain vector may be a column vector or row vector whose length is $N_f$. This is not limited in this application.

10. Frequency domain vector set: The frequency domain vector set may include a plurality of frequency domain vectors having different lengths. In the embodiments of this application, a length of a frequency domain vector is $N_f$. Therefore, a length of each frequency domain vector in a frequency domain vector set to which a frequency domain vector reported by the terminal device belongs is $N_f$.

In a possible design, the frequency domain vector set may include $N_f$ frequency domain vectors. The $N_f$ frequency domain vectors may be orthogonal to each other. Each frequency domain vector in the frequency domain vector set may be obtained from a DFT matrix.

The $N_f$ frequency domain vectors may be denoted as, for example, $b_f^1, b_f^2, \ldots$, and $b_f^{N_f}$. The $N_f$ frequency domain vectors may be used to construct a matrix $U_f$, where $U_f \square [b_f^1\ b_f^2 \ldots b_f^{N_f}]$.

In another possible design, the frequency domain vector set may be extended to $O_f \times N_f$ frequency domain vectors by using an oversampling factor $O_f$. In this case, the frequency domain vector set may include $O_f$ subsets, and each subset may include $N_f$ frequency domain vectors. The $N_f$ frequency domain vectors in each subset may be orthogonal to each other. Each frequency domain vector in the frequency domain vector set may be obtained from an oversampled DFT matrix. The oversampling factor $O_f$ is a positive integer.

$N_f$ frequency domain vectors in an $o_f^{th}$ (where $0 \leq o_f \leq O_f-1$ and $o_f$ is an integer) subset in the frequency domain vector set may be denoted as, for example, $b_{f,o_f}^1, b_{f,o_f}^2, \ldots, b_{f,o_f}^{N_f}$. In this case, a matrix $U_f^{o_f}$ may be constructed based on the $N_f$ frequency domain vectors in the $o_f^{th}$ subset, where $U_f^{o_f} \square [b_{f,o_f}^1, b_{f,o_f}^2 \ldots b_{f,o_f}^{N_f}]$.

11. Space-frequency component matrix: A space-frequency component matrix may be determined by using a spatial domain vector and a frequency domain vector. A space-frequency component matrix may be determined by using, for example, a spatial domain vector and a conjugate transpose of a frequency domain vector, for example, $u_s \times u_f^H$ where a dimension of $u_s \times u_f^H$ may be $N_s \times N_f$.

It should be understood that the space-frequency component matrix may be a representation form of a space-frequency base unit determined by using a spatial domain vector and a frequency domain vector. The space-frequency base unit may alternatively be represented as, for example, a space-frequency component vector, and the space-frequency component vector may be determined by using, for example, a Kronecker product of a spatial domain vector and a frequency domain vector. The space-frequency base unit may alternatively be represented as, for example, a space-frequency vector pair. A specific representation form of the space-frequency base unit is not limited in this application.

Various possible forms that are determined by a person skilled in the art by using a spatial domain vector and a frequency domain vector based on a same concept should fall within the protection scope of this application. In addition, if a defined form of the spatial domain vector or the frequency domain vector is different from that listed above, an operation relationship among the space-frequency component matrix, the spatial domain vector, and the frequency domain vector may also be different. The operation relationship among the space-frequency component matrix, the spatial domain vector, and the frequency domain vector is not limited in this application.

12. Space-frequency matrix: In the embodiments of this application, the space-frequency matrix is an intermediate variable used to determine a precoding matrix. For the terminal device, the space-frequency matrix may be determined by using a precoding matrix or a channel matrix. For the network device, the space-frequency matrix may be obtained by weighting a plurality of space-frequency component matrices, and is used to determine a downlink channel or a precoding matrix.

The space-frequency component matrix may be represented as a matrix whose dimension is $N_s \times N_f$, or the space-frequency component matrix may be represented as a matrix whose dimension is $N_f \times N_s$. The matrix whose dimension is $N_s \times N_f$ may include $N_f$ column vectors whose length is $N_s$. The $N_f$ column vectors may correspond to $N_f$ frequency domain units, and each column vector may be used to determine a precoding vector of a corresponding frequency domain unit.

For example, the space-frequency matrix may be denoted as H, where $H=[w_1\ w_2\ \ldots\ w_{N_f}]$. $w_1$ to $w_{N_f}$ are the $N_f$ column vectors corresponding to the $N_f$ frequency domain units, and the length of each column vector may be $N_s$. The $N_f$ column vectors may be used to determine the precoding vectors of the $N_f$ frequency domain units.

It should be understood that the space-frequency matrix is merely a representation form of the intermediate variable used to determine the precoding matrix, and should not constitute any limitation on this application. For example, the column vectors in the space-frequency matrix are connected from left to right in sequence, where a tail of a vector is followed by a head of a vector that is on the right of and adjacent to the vector, or arranged according to another predefined rule, to obtain a vector whose length is $N_s \times N_f$. The vector may be referred to as a space-frequency vector.

It should be further understood that a dimension of the space-frequency matrix and a dimension of the space-frequency vector that are shown above are merely examples, and should not constitute any limitation on this application. For example, the space-frequency matrix may alternatively be a matrix whose dimension is $N_f \times N_s$. Each row vector may correspond to one frequency domain unit, and is used to determine a precoding vector of a corresponding frequency domain unit.

In addition, when the transmit antenna is configured with a plurality of polarization directions, the dimension of the space-frequency matrix may further be extended. For example, for a dual-polarized antenna, the dimension of the space-frequency matrix may be $2N_s \times N_f$ or $N_f \times 2N_s$. It should be understood that a quantity of polarization directions of the transmit antenna is not limited in this application.

13. Dual-domain compression: The dual-domain compression includes spatial domain compression and frequency domain compression. The spatial domain compression may mean that one or more spatial domain vectors are selected from a spatial domain vector set to construct a precoding vector. The frequency domain compression may mean that one or more frequency domain vectors are selected from a frequency domain vector set to construct a precoding vector. A matrix constructed by one spatial domain vector and one frequency domain vector may be, for example, the foregoing space-frequency component matrix. The selected one or more spatial domain vectors and the selected one or more frequency domain vectors may be used to construct one or more space-frequency component matrices. A weighted sum of the one or more space-frequency component matrices may be used to construct a space-frequency matrix corresponding to a transport layer. In other words, the space-frequency matrix may be approximately the weighted sum of the space-frequency component matrices that are constructed by the selected one or more spatial domain vectors and the selected one or more frequency domain vectors. Then, a precoding vector corresponding to each frequency domain unit may be determined.

In the dual-domain compression, compression is performed in space domain and frequency domain separately. When providing a feedback, the terminal device may feed back the selected one or more spatial domain vectors and the selected one or more frequency domain vectors to the network device, and does not need to feed back a weighting coefficient (for example, including an amplitude and a phase) of a subband based on each frequency domain unit (such as the subband). Therefore, feedback overheads can be greatly reduced. In addition, because a frequency domain vector can represent a change rule of a channel in frequency domain, a change of the channel in frequency domain is simulated through linear superposition of one or more frequency domain vectors. Therefore, relatively high feedback precision can still be maintained, so that a precoding matrix recovered by the network device based on the feedback of the terminal device can still well adapt to the channel.

For specific content of the dual-domain compression, refer to the Patent Application No. 201811263110.1 entitled "METHOD FOR INDICATING AND DETERMINING PRECODING VECTOR AND COMMUNICATIONS APPARATUS". For brevity, detailed descriptions of the specific content are omitted herein.

14. Weighting coefficient, amplitude, and phase: The weighting coefficient is used to represent a weight of each space-frequency component matrix when the space-frequency component matrices are used to calculate a weighted sum to determine a space-frequency matrix. For example, the foregoing space-frequency matrix may be approximately a weighted sum of a plurality of space-frequency component matrices, and the weighting coefficient may represent a weight of each of the plurality of space-frequency component matrices.

Each weighting coefficient may include an amplitude and a phase. For example, in a weighting coefficient $\alpha e^{j\theta}$, $\alpha$ is an amplitude, and $\theta$ is a phase.

In the weighting coefficients corresponding to the plurality of space-frequency component matrices, amplitudes (or amplitude values) of some weighting coefficients may be zero or close to zero, and quantization values corresponding to the weighting coefficients may be zero. A weighting coefficient whose amplitude is quantized by using a quantization value being zero may be referred to as a zero-amplitude weighting coefficient. Correspondingly, amplitudes of some weighting coefficients are relatively large, and quantization values corresponding to the weighting coefficients are not zero. A weighting coefficient whose amplitude is quantized by using a non-zero quantization value may be referred to as a non-zero-amplitude weighting coefficient. In other words, the plurality of weighting coefficients includes one or more non-zero-amplitude weighting coefficients and one or more zero-amplitude weighting coefficients.

It should be understood that a weighting coefficient may be indicated by using a quantization value, may be indicated by using an index of a quantization value, or may be indicated by using a non-quantization value. An indication manner of the weighting coefficient is not limited in this application, provided that a peer end is enabled to learn of the weighting coefficient. For ease of description below, information used to indicate the weighting coefficient is referred to as quantization information of the weighting coefficient. The quantization information may be, for example, a quantization value, an index, or any other information that may be used to indicate the weighting coefficient.

15. Transport layer: A quantity of transport layers is a rank of a channel matrix. The terminal device may determine a quantity of transport layers based on a channel matrix obtained through channel estimation. A precoding matrix may be determined by using the channel matrix. For example, the precoding matrix may be determined by performing SVD on the channel matrix or a covariance matrix of the channel matrix. In the SVD process, different transport layers may be distinguished based on eigenvalues. For example, a precoding vector determined by using an eigenvector vector corresponding to a maximum eigenvalue may correspond to the first transport layer, and a precoding vector determined by using an eigenvector vector corresponding to a minimum eigenvalue may correspond to an $R^{th}$ transport layer. That is, eigenvalues corresponding to the first transport layer to the $R^{th}$ transport layer decrease in sequence.

It should be understood that distinguishing the different transport layers based on the eigenvalues is merely a possible implementation, and should not constitute any limitation on this application. For example, another criterion for distinguishing the transport layers may also be predefined in a protocol. This is not limited in this application.

In addition, to facilitate understanding of the embodiments of this application, the following descriptions are provided.

1: To facilitate understanding and description, main parameters in this application are described as follows:

R represents a quantity of transport layers. In the embodiments of this application, R≥1, and R is an integer. The R transport layers may include, for example, the first transport layer to an $R^{th}$ transport layer. For ease of description below, an $r^{th}$ transport layer is used as an example to describe the method for indicating vectors used to construct a precoding vector provided in the embodiments of this application. A value of r may be an integer value ranging from 1 to R.

$R_m$ represents a predefined maximum value of the quantity of transport layers, that is, 1≤R≤$R_m$. For example, a value of $R_m$ may be defined in a protocol. Optionally, $R_m$ is 4.

P represents a quantity of polarization directions of a transmit antenna, where P≥1 and P is an integer.

L represents a maximum quantity in quantities of spatial domain vectors corresponding to the R transport layers, and is pre-configurable, where L≥1, and L is an integer.

M represents a maximum quantity in quantities of frequency domain vectors corresponding to the R transport layers, and is pre-configurable, where M≥1, and M is an integer.

$M_r$ represents a quantity of spatial domain vectors that is configured for the $r^{th}$ transport layer when the quantity of transport layers is R, where L≥$L_r$≥1, and $L_r$ is an integer.

$M_r$ represents a quantity of frequency domain vectors that is configured for the $r^{th}$ transport layer when the quantity of transport layers is R, where M≥$M_r$≥1, and $M_r$ is an integer.

$K_r$ represents a quantity of to-be-reported space-frequency vector pairs that is configured for the $r^{th}$ transport layer when the quantity of transport layers is R, where $K_r$≥1, and $K_r$ is an integer. Because a space-frequency vector pair reported for each transport layer corresponds to a weighting coefficient, the quantity of to-be-reported space-frequency vector pairs that is configured for the $r^{th}$ transport layer may also be a quantity of to-be-reported weighting coefficients that is configured for the $r^{th}$ transport layer.

The parameter $K_r$ may be a quantity of all to-be-reported weighting coefficients (or space-frequency vector pairs) that is configured for the $r^{th}$ transport layer, or may be a quantity of some to-be-reported weighting coefficients (or space-frequency vector pairs) that is configured for the $r^{th}$ transport layer.

The quantity of some weighting coefficients may be indicated because a minimum quantity of to-be-reported weighting coefficients (or space-frequency vector pairs) may be predefined for each transport layer in a protocol or a quantity of weighting coefficients (or space-frequency vector pairs) that need to be reported for every r transport layers may be predefined in a protocol. In this case, the parameter $K_r$ may be a difference between a total quantity of weighting coefficients that is originally configured for the $r^{th}$ transport layer and a minimum quantity of to-be-reported weighting coefficients that is predefined for the $r^{th}$ transport layer. For example, if the total quantity of weighting coefficients that is configured for the $r^{th}$ transport layer is Q, and the minimum quantity of to-be-reported weighting coefficients that is predefined for the $r^{th}$ transport layer is $a_r$, the parameter $K_r$ may be Q–$a_r$. Both Q and $a_r$ are positive integers.

The minimum quantity of to-be-reported weighting coefficients that is predefined for the $r^{th}$ transport layer may include, for example, a quantity of normalized coefficients. The normalized coefficient may include, for example, a plurality of normalized coefficients corresponding to a plurality of polarization directions or a normalized coefficient in a plurality of polarization directions. Specific weighting coefficients corresponding to the minimum quantity of reported space-frequency vectors are not limited in this application.

In addition, when the quantity of transport layers is greater than 1, the minimum quantities of to-be-reported weighting coefficients that are predefined for the transport layers may be the same, or may be partially different, or may be different from each other. This is not limited in this application.

K represents a maximum value that is determined by traversing R from 1 to $R_m$ and that is in quantities of to-be-reported space-frequency vector pairs that are pre-configured for R transport layers, or a maximum value that is determined by traversing R from 1 to $R_m$ and that is in quantities of to-be-reported weighting coefficients that are pre-configured for R transport layers. In other words, K is a maximum value that is of $L_r$ and that is determined by traversing r from 1 to R and traversing R from 1 to 4. K≥1, and K is an integer.

$T_r$ is a quantity of space-frequency vector pairs reported for the $r^{th}$ transport layer, where $T_r \leq K_r$, and $T_r$ is an integer.

2: In the embodiments, for ease of description, when numbering is used, consecutive numbering may start from 1. For example, the R transport layers may include the first transport layer to the $R^{th}$ transport layer, the L beam vectors may include the first beam vector to an Lth beam vector, and so on. Examples are not described one by one herein. Certainly, specific implementation is not limited thereto. For example, consecutive numbering may alternatively start from 0. It should be understood that the foregoing settings are intended to facilitate description of the technical solutions provided in the embodiments of this application, but are not intended to limit the scope of this application.

3: In the embodiments of this application, transformations between matrices and vectors are involved in many places. For ease of understanding, unified descriptions are provided herein. A superscript T represents transposition. For example, $A^T$ represents transposition of a matrix (or a vector) A. A superscript H represents a conjugate transpose. For example, $A^H$ represents a conjugate transpose of the matrix (or the vector) A. For brevity, descriptions of a same or similar case are omitted below.

4: In the embodiments shown below, an example in which both a beam vector and a frequency domain vector are column vectors is used to describe the embodiments provided in this application, but this should not constitute any limitation on this application. Based on a same idea, a person skilled in the art may further think of more possible representation manners.

5: In the embodiments of this application, "used to indicate" may include direct indication and indirect indication. For example, when a piece of indication information is described to be used to indicate information I, this may include that the indication information directly indicates I or indirectly indicates I, but it does not necessarily represent that the indication information carries I.

Information indicated by indication information is referred to as to-be-indicated information. In a specific implementation process, the to-be-indicated information may be indicated in a plurality of manners, for example, but not limited to, indicated directly. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may be indicated by using an arrangement sequence of various pieces of information that is agreed on in advance (for example, stipulated in a protocol), to reduce indication overheads to some extent. In addition, a common part of each piece of information may be further identified, and all the information is indicated, to reduce indication overheads caused by separate indication of the same information. For example, a person skilled in the art should understand that the precoding matrix includes precoding vectors, and the precoding vectors in the precoding matrix may have a same part in composition or another attribute.

In addition, a specific indication manner may alternatively include various existing indication manners, for example, but not limited to, the foregoing indication manners and various combinations thereof. For specific details of the various indication manners, refer to the current technology. Details are not described in this specification. It may be learned from the foregoing descriptions that, for example, when a plurality of pieces of information of a same type needs to be indicated, different information may be indicated in different manners. In a specific implementation process, a required indication manner may be selected based on a specific requirement. A selected indication manner is not limited in the embodiments of this application. In this case, the indication manner in the embodiments of this application should be understood as covering various methods that can enable a to-be-indicated party to learn of to-be-indicated information.

In addition, the to-be-indicated information may have another equivalent form. For example, a row vector may be represented as a column vector, a matrix may be represented by using a transposed matrix of the matrix, or a matrix may be represented in a form of a vector or an array. The vector or the array may be obtained by connecting row vectors or column vectors of the matrix. A Kronecker product of two vectors may be represented in a form such as a product of a vector and a transposed vector of the other vector. The technical solutions provided in the embodiments of this application should be understood as covering various forms. For example, some or all features in the embodiments of this application should be understood as covering various representation forms of the features.

The to-be-indicated information may be sent as a whole, or may be sent separately by dividing the to-be-indicated information into a plurality of pieces of sub-information, and transmitting periodicities and/or transmitting occasions of these pieces of sub-information may be the same or different. A specific transmitting method is not limited in this application. The transmitting periodicities and/or the transmitting occasions of these pieces of sub-information may be predefined, for example, predefined according to a protocol, or may be configured based on configuration information sent by a transmit end device to a receive end device. For example, the configuration information may include, but is not limited to, one of or a combination of at least two of: radio resource control signaling such as RRC signaling, MAC layer signaling such as MAC-CE signaling, and physical layer signaling such as downlink control information (downlink control information, DCI).

6: Definitions of many features (for example, a Kronecker product, a PMI, a frequency domain unit, a spatial domain vector, a frequency domain vector, and a weighting coefficient of a space-frequency vector pair) that are listed in this application are merely used to explain functions of the features by using examples. For detailed content of the features, refer to the current technology.

7: In the embodiments shown below, first, second, third, fourth, and various numbers are merely used for differentiation for convenient description, and are not intended to limit the scope of the embodiments of this application. For example, different fields and different indication information are distinguished.

8: In the embodiments shown below, "pre-configuration" may be indicated in advance by using signaling, or may be determined according to a preset rule. A specific implementation thereof is not limited in this application. Corresponding to "pre-configuration", "actual reporting" may refer to information that is actually reported by the terminal device to the network device based on channel measurement. For example, a quantity of to-be-reported spatial domain vectors that is pre-configured for a transport layer may be a quantity of spatial domain vectors that need to be reported for the transport layer. Therefore, the quantity of to-be-reported spatial domain vectors that is configured for the transport layer may be greater than or equal to a quantity of actually reported spatial domain vectors. For another example, a quantity of to-be-reported frequency domain vectors that is pre-configured for a transport layer may be a quantity of frequency domain vectors that need to be reported for the transport layer. Therefore, the quantity of to-be-reported frequency domain vectors that is configured for the transport layer may be greater than or equal to a quantity of actually reported frequency domain vectors. For still another example, a quantity of to-be-reported weighting coefficients that is pre-configured for a transport layer may be a quantity of space-frequency vector pairs that need to be reported for the transport layer. Therefore, the quantity of to-be-reported space-frequency vector pairs that is configured for the transport layer may be greater than or equal to a quantity of actually reported weighting coefficients.

9: "Predefinition" may be implemented in a manner in which corresponding code, a table, or other related indication information may be prestored in a device (for example, including the terminal device and the network device). A specific implementation thereof is not limited in this application. "Store" may mean that the corresponding code, the table, or the other related indication information is stored in one or more memories. The one or more memories may be separately disposed, or may be integrated into an encoder, a decoder, a processor, or a communications apparatus. Alternatively, some of the one or more memories may be separately disposed, and some of the one or more memories are integrated into a decoder, a processor, or a communications apparatus. A type of the memory may be any form of storage medium. This is not limited in this application.

10: "Protocol" in the embodiments of this application may be a standard protocol in the communications field, for example, may include an LTE protocol, an NR protocol, and a related protocol applied to a future communications system. This is not limited in this application.

11: "At least one" means one or more, and "a plurality of" means two or more than two. The term "and/or" describes an association relationship between associated objects and may indicate three relationships. For example, A and/or B may indicate the following cases: Only A exists, both A and B exist, and only B exists. A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one of a, b, and c may indicate: a, b, c, a and b, a and c, b and c, or a, b, and c. a, b, and c may be single or plural.

With reference to the accompanying drawings, the following describes in detail the method for indicating vectors used to construct a precoding vector provided in the embodiments of this application.

It should be understood that the method provided in the embodiments of this application may be applied to a system performing communication by using a multiple-antenna technology, for example, the communications system 100 shown in FIG. 1. The communications system may include at least one network device and at least one terminal device. The network device and the terminal device may communicate with each other by using the multiple-antenna technology.

It should be further understood that, a specific structure of an execution body of the method provided in the embodiments of this application is not specifically limited in the embodiments that are shown below, provided that a program that records code for the method provided in the embodiments of this application can be run to perform communication according to the method provided in the embodiments of this application. For example, the execution body of the method provided in the embodiments of this application may be the terminal device, the network device, or a function module that can invoke and execute the program in the terminal device or the network device.

Without loss of generality, the following describes in detail, by using interaction between a network device and a terminal device as an example, the method for indicating vectors used to construct a precoding vector provided in the embodiments of this application.

Figure 2:
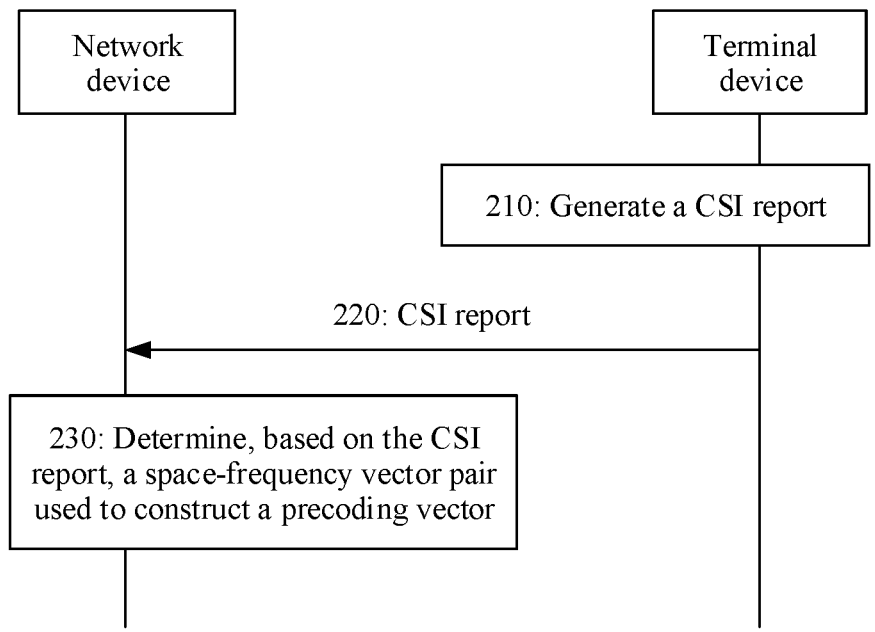
FIG. 2 is a schematic flowchart of a method for indicating vectors used to construct a precoding vector according to an embodiment of this application.

FIG. 2 is a schematic flowchart of a method 200 for indicating vectors used to construct a precoding vector from a perspective of device interaction according to an embodiment of this application. As shown in the figure, the method 200 may include step 210 to step 230. The following describes the steps in the method 200 in detail.

In step 210, a terminal device generates a CSI report. The CSI report includes a bitmap, and a length of the bitmap is irrelevant to a quantity R of transport layers.

A plurality of indicator bits in the bitmap may correspond to a plurality of space-frequency vector pairs. Each indicator bit may be used to indicate whether a corresponding space-frequency vector pair is selected. When each indicator bit in the bitmap is used to indicate whether a corresponding space-frequency vector pair is selected, a space-frequency vector pair selected for each transport layer or a space-frequency vector pair reported for each transport layer is indicated.

For example, when an indicator bit is set to "0", it indicates that a corresponding space-frequency vector pair is not selected. When an indicator bit is set to "1", it indicates that a corresponding space-frequency vector pair is selected. Therefore, a total quantity of indicator bits "1" in the bitmap may represent a quantity of space-frequency vector pairs reported for the R transport layers. A total quantity of indicator bits "1" that are in indicator bits corresponding to an $r^{th}$ transport layer in the bitmap may represent a quantity of space-frequency vector pairs reported for the $r^{th}$ transport layer. A correspondence between each indicator bit in the bitmap and each transport layer is described in detail below with reference to a specific embodiment. Detailed descriptions of the correspondence are temporarily omitted herein.

It should be understood that listed meanings expressed by the values of the indicator bit herein are merely examples, and should not constitute any limitation on this application.

The selected space-frequency vector pair is a space-frequency vector pair used to construct a precoding vector. Each space-frequency vector pair may include one spatial domain vector and one frequency domain vector. In other words, the space-frequency vector pair is determined by using the spatial domain vector and the frequency domain vector. One or more space-frequency vector pairs may be reported for a same transport layer. When a plurality of space-frequency vector pairs are reported for a same transport layer, in any two space-frequency vector pairs, a spatial domain vector and/or a frequency domain vector included in one space-frequency vector pair are/is different from a spatial domain vector and/or a frequency domain vector included in the other space-frequency vector pair, or at least one of a spatial domain vector and a frequency domain vector included in one space-frequency vector pair is different from that included in the other space-frequency vector pair.

In this embodiment of this application, the space-frequency vector pair reported for each transport layer may be selected from a plurality of space-frequency vector pairs. For example, the plurality of space-frequency vector pairs may be predefined, for example, pre-agreed on by a network device and the terminal device, or defined in a protocol. The plurality of space-frequency vector pairs may alternatively be determined by the terminal device and reported to the network device. For example, for each transport layer, the terminal device determines and reports one or more spatial domain vectors and one or more frequency domain vectors. The one or more spatial domain vectors and the one or more frequency domain vectors may be used to determine one or more space-frequency vector pairs. Therefore, the bitmap may include sub-bitmaps corresponding to a plurality of transport layers. A plurality of indicator bits in each sub-bitmap may correspond to a plurality of space-frequency vector pairs at a transport layer. When each indicator bit is used to indicate whether a corresponding space-frequency vector pair is selected, this is equivalent to indicating a selected space-frequency vector pair in a plurality of space-frequency vector pairs corresponding to a plurality of indicator bits. In other words, this indicates relative positions of the space-frequency vector pairs reported for the R transport layers in the plurality of space-frequency vector pairs.

The network device may predetermine the plurality of space-frequency vector pairs that correspond to the plurality of indicator bits in the bitmap. For example, the space-frequency vector pairs are predefined or reported by the terminal device (for example, indicated by using a field in a second part below). Therefore, after the relative positions of the space-frequency vector pairs reported for the transport layers in the plurality of space-frequency vector pairs are indicated, the network device may determine the space-frequency vector pair used to construct the precoding vector.

For ease of description below, it is assumed that the terminal device may report one or more spatial domain vectors and one or more frequency domain vectors for each transport layer. A space-frequency vector pair reported by the terminal device for each transport layer may be selected from a plurality of space-frequency vector pairs determined by the spatial domain vectors and the frequency domain vectors.

The $r^{th}$ transport layer in the R transport layers is used as an example, and it is assumed that the quantity of space-frequency vector pairs reported by the terminal device for the $r^{th}$ transport layer is $T_r$ (where $T_r \geq 1$ and $T_r$ is an integer). The $T_r$ space-frequency vector pairs may be one or more space-frequency vector pairs selected from $L_r \times M_r$ space-frequency vector pairs determined by $L_r$ (where $L_r \geq 1$ and $L_r$ is an integer) spatial domain vectors and $M_r$ (where $M_r \geq 1$ and $M_r$ is an integer) frequency domain vectors. For example, the $L_r$ spatial domain vectors and the $M_r$ frequency domain vectors may be determined by the terminal device and reported to the network device.

In this embodiment of this application, quantities of spatial domain vector pairs reported for at least two of the R transport layers may be different or the same. This is not limited in this application.

A quantity of space-frequency vector pairs that need to be reported for each transport layer, for example, a quantity $K_r$ of space-frequency vector pairs that need to be reported for the $r^{th}$ transport layer, may be predefined, or may be directly or indirectly indicated by the network device by using signaling. This is not limited in this application.

Optionally, the method further includes: receiving first indication information. The first indication information is used to indicate a quantity of to-be-reported space-frequency vector pairs that is configured for each transport layer. Correspondingly, the network device transmits the first indication information.

The network device may include the first indication information in higher layer signaling such as an RRC message or a MAC CE or in physical layer signaling such as DCI, to indicate, to the terminal device, the quantity of to-be-reported space-frequency vector pairs that is configured for each transport layer. Specific signaling carrying the first indication information is not limited in this application.

In a possible design, the first indication information may indicate a maximum value K in quantities of to-be-reported space-frequency vector pairs that are configured for the R transport layers. The maximum value K may be replaced with a minimum value, an average value, or the like. The terminal device may determine, according to a predefined rule and based on the quantity of transport layers and a value indicated by the first indication information, the reporting quantity corresponding to each transport layer. In this case, the first indication information indirectly indicates the quantity of to-be-reported space-frequency vector pairs that is configured for each transport layer.

For example, the first indication information indicates the maximum value K. The predefined rule may be, for example, that when R is 1, a quantity $K_1$ of to-be-reported space-frequency vector pairs that is configured for the transport layer is the maximum value K; when R is 2, quantities $K_1$ and $K_2$ of to-be-reported space-frequency vector pairs that are configured for the two transport layers are both the maximum value K; when R is 3, a quantity of to-be-reported space-frequency vector pairs that is configured for the first transport layer is the maximum value K, and quantities of to-be-reported space-frequency vector pairs that are configured for the second transport layer and the third transport layer are both a half of the maximum value, K/2; and when R is 4, a quantity of to-be-reported space-frequency vector pairs that is configured for each transport layer is a half of the maximum value, K/2.

As described above, a minimum quantity of weighting coefficients reported for each transport layer may alternatively be predefined in a protocol. Therefore, when the first indication information is used to indicate the maximum value K in the quantities of reported space-frequency vector pairs that are configured for the R transport layers, the maximum value K may be a maximum value in total quantities of reported space-frequency vector pairs that are configured for the R transport layers (namely, a maximum value in the R total reporting quantities configured for the R transport layers), or may be a value obtained by subtracting a minimum reporting quantity from a maximum value in the quantities of reported space-frequency vector pairs that are configured for the R transport layers. The maximum value K may be the maximum value in the R total reporting quantities configured for the R transport layers, and a total reporting quantity configured for the $r^{th}$ transport layer indicates a total quantity of to-be-reported space-frequency vector pairs (or weighting coefficients) that is configured for the $r^{th}$ transport layer.

It should be noted that the minimum reporting quantity and the maximum value correspond to a same transport layer. For example, a total quantity of to-be-reported weighting coefficients that is configured for the first transport layer in the R transport layers is a maximum value in total quantities of to-be-reported weighting coefficients that are configured for the R transport layers, for example, K. In this case, the first indication information may indicate the total quantity of to-be-reported weighting coefficients that is configured for the first transport layer, or may indicate a value obtained by subtracting a minimum quantity of to-be-reported weighting coefficients that is predefined for the first transport layer from the total quantity of to-be-reported weighting coefficients that is configured for the first transport layer, for example, K−$a_1$, where $a_1$ indicates the minimum quantity of to-be-reported weighting coefficients that is predefined for the first transport layer, and $a_1$ is a positive integer.

For example, it is assumed that the maximum value in the total quantities of to-be-reported space-frequency vector pairs that are configured for the R transport layers is 8. The maximum value is the total quantity of to-be-reported spatial domain vector pairs that is configured for the first transport layer. If the minimum quantity of to-be-reported space-frequency vector pairs that is predefined for the first transport layer is 2, the first indication information may indicate 8 or 6 (which is obtained from 8−2).

A specific rule for indicating the maximum value K by the first indication information may be predefined in a protocol, or may be pre-negotiated by the network device and the terminal device. The network device and the terminal device may indicate and determine, according to a same rule, the maximum value K in the total quantities of to-be-reported space-frequency vector pairs that are configured for the R transport layers.

It should be understood that the rules listed above are merely examples, and should not constitute any limitation on this application. The following describes in detail, with reference to a specific embodiment, a relationship between the maximum value and the quantity of to-be-reported space-frequency vector pairs that is configured for each transport layer. It may be understood that, when a meaning represented by the value indicated by the first indication information changes, the predefined rule for determining the quantity of reported space-frequency vector pairs corresponding to each transport layer also changes.

It should be further understood that the maximum value, the minimum value, and the average value listed above are merely several possible implementations, and should not constitute any limitation on this application.

In another possible design, the first indication information may directly indicate, when a value of R changes, the quantity of to-be-reported space-frequency vector pairs that is configured for each transport layer. The terminal device may directly determine, based on the first indication information and the quantity of transport layers, the quantity of space-frequency vector pairs that need to be reported for each transport layer.

When the first indication information is used to indicate the quantity of to-be-reported space-frequency vector pairs that is configured for each transport layer, the first indication information may directly indicate the total quantity of to-be-reported space-frequency vector pairs, or may indicate a difference between the total quantity of to-be-reported space-frequency vector pairs and a minimum quantity of to-be-reported space-frequency vector pairs corresponding to the transport layer.

In other words, when the first indication information is used to indicate a quantity of to-be-reported weighting coefficients that is configured for each transport layer, the first indication information may directly indicate a total quantity of to-be-reported weighting coefficients, or may indicate a difference between the total quantity of to-be-reported weighting coefficients and a minimum quantity of to-be-reported weighting coefficients corresponding to the transport layer.

For example, the first indication information indicates that the quantity of to-be-reported space-frequency vector pairs that is configured for the $r^{th}$ transport layer is $K_r$, where $K_r$ is a positive integer. In this case, $K_r$ may be the total quantity of to-be-reported space-frequency vector pairs that is configured for the $r^{th}$ transport layer, or may be a value obtained by subtracting a predefined minimum quantity of space-frequency vector pairs reported for the $r^{th}$ transport layer from the total quantity of to-be-reported space-frequency vector pairs configured for the $r^{th}$ transport layer.

A specific rule for indicating the quantity of to-be-reported space-frequency vector pairs that is configured for each transport layer may be predefined in a protocol, or may be pre-negotiated by the network device and the terminal device. The network device and the terminal device may indicate and determine, according to a same rule, the total quantity of to-be-reported space-frequency vector pairs that is configured for each of the R transport layers.

In still another possible design, the first indication information and second indication information or third indication information listed below may be same indication information. For example, a relationship between a quantity of to-be-reported space-frequency vector pairs that is configured for each transport layer and a quantity of to-be-reported spatial domain vectors that is configured for each transport layer may be predefined, a relationship between a quantity of to-be-reported space-frequency vector pairs that is configured for each transport layer and a quantity of to-be-reported frequency domain vectors that is configured for each transport layer may be predefined, or a relationship among a quantity of to-be-reported space-frequency vector pairs that is configured for each transport layer, a quantity of to-be-reported spatial domain vectors that is configured for each transport layer, and a quantity of to-be-reported frequency domain vectors that is configured for each transport layer may be predefined. In other words, there may be a correspondence between the quantity of to-be-reported space-frequency vector pairs and the quantity of to-be-reported spatial domain vectors, there may be a correspondence between the quantity of to-be-reported space-frequency vector pairs and the quantity of to-be-reported frequency domain vectors, or there may be a correspondence between the quantity of to-be-reported space-frequency vector pairs and the quantity of to-be-reported spatial domain vectors and the quantity of to-be-reported frequency domain vectors. Therefore, when the network device indicates the quantities/quantity of to-be-reported spatial domain vectors and/or frequency domain vectors that are/is configured for each transport layer, the terminal device may determine the quantity of to-be-reported space-frequency vector pairs that is configured for each transport layer, based on a quantity of space-frequency vector pairs and the quantities/quantity of to-be-reported spatial domain vectors and/or frequency domain vectors. It may be understood that, when a meaning represented by the value indicated by the first indication information changes, the predefined rule for determining the reporting quantity corresponding to each transport layer also changes.

In addition, the quantity of to-be-reported space-frequency vector pairs that is configured for each transport layer may alternatively be predefined, for example, defined in a protocol. For example, the quantity of to-be-reported space-frequency vector pairs that is configured for each transport layer or the maximum value K when the value of R changes may be predefined in the protocol, or the quantities/quantity of to-be-reported spatial domain vectors and/or frequency domain vectors that are/is configured for each transport layer when the value of R changes may be predefined in the protocol. This is not limited in this application.

It should be noted that for some weighting coefficients whose amplitude quantization values are zero, amplitudes and phases corresponding to the weighting coefficients may not be reported. In other words, the terminal device may not report the weighting coefficients whose amplitude quantization values are zero. Therefore, a quantity of space-frequency vector pairs actually reported by the terminal device to the network device for the R transport layers may be less than or equal to a pre-configured reporting quantity, and may also be less than or equal to a maximum value of the pre-configured reporting quantity. For example, for the $r^{th}$ transport layer, $T_r \leq K_r \leq K$.

As described above, when the terminal device indicates, by using each indicator bit in the bitmap, whether the corresponding space-frequency vector pair is selected, this is equivalent to implicitly indicating a quantity and positions of space-frequency vector pairs reported for each transport layer. The terminal device may calculate a weighted sum of one or more space-frequency vector pairs reported for each transport layer, to construct a precoding vector corresponding to each frequency domain unit at the transport layer. Therefore, each space-frequency vector pair may correspond to one weighting coefficient. Therefore, that the terminal device indicates, by using the bitmap, the quantity and the positions of space-frequency vector pairs reported for the R transport layers may also be understood as that the terminal device indicates, by using the bitmap, a quantity and positions of weighting coefficients reported for the R transport layers.

The following describes in detail a specific process of indicating, by using the bitmap, the quantity and the positions of space-frequency vector pairs reported for the R transport layers. In this embodiment of this application, in addition to indicating the quantity of space-frequency vector pairs reported for the R transport layers, the terminal device may further indicate, by using the CSI report, weighting coefficients corresponding to the space-frequency vector pairs, and the like. Therefore, when different implementations are described below, information carried in each part of the CSI report is further described with reference to a first part and the second part of the CSI report. It should be understood that various embodiments listed below are shown only for better understanding of the method provided in this application, and should not constitute any limitation on this application.

It is assumed that a quantity of polarization directions of a transmit antenna is 1. For the $r^{th}$ transport layer in the R transport layers, a quantity of corresponding indicator bits in the sub-bitmap may be, for example, $L_r \times M_r$, so that the $L_r \times M_r$ indicator bits correspond to $L_r \times M_r$ space-frequency vector pairs determined by $L_r$ spatial domain vectors and $M_r$ frequency domain vectors. A length of the sub-bitmap corresponding to the $r^{th}$ transport layer may be related to values of $L_r$ and $M_r$ configured for the $r^{th}$ transport layer. In other words, the length of the bitmap may be related to quantities of to-be-reported spatial domain vectors and frequency domain vectors that are configured for each transport layer. For example, the length of the bitmap may be a maximum value that is of $$\sum_{r=1}^{R} L_r \times M_r$$

and that is determined by traversing R from 1 to $R_m$.

If $L_r=L$ and $M_r=M$, a correspondence between $L \times M$ indicator bits in the sub-bitmap corresponding to the $r^{th}$ transport layer and $L \times M$ space-frequency vector pairs may be related to a combination manner of spatial domain vectors and frequency domain vectors in the $L \times M$ space-frequency vector pairs. For example, the $L \times M$ space-frequency vector pairs corresponding to the $L \times M$ indicator bits may be arranged by first traversing the M frequency domain vectors and then traversing the L spatial domain vectors, or may be arranged by first traversing the L spatial domain vectors and then traversing the M frequency domain vectors.

It is assumed that L spatial domain vectors selected from a spatial domain vector set are denoted as $v_s^1, \ldots,$ and $v_s^L$. M frequency domain vectors selected from a frequency domain vector set are denoted as $v_f^1, \ldots,$ and $v_f^M$.

If the M frequency domain vectors are first traversed and then the L spatial domain vectors are traversed, an arrangement sequence of the $L \times M$ space-frequency vector pairs may be $(v_s^1, v_f^1), (v_s^1, v_f^2), \ldots, (v_s^1, v_f^M), (v_s^2, v_f^1), (v_s^2, v_f^2) \ldots,$ and $(v_s^L, v_f^M)$. There are a total of $L \times M$ space-frequency vector pairs. For brevity, examples are not listed herein one by one. The $L \times M$ bits in the bitmap are in a one-to-one correspondence with the $L \times M$ space-frequency vector pairs.

If the L spatial domain vectors are first traversed and then the M frequency domain vectors are traversed, an arrangement sequence of the $L \times M$ space-frequency vector pairs may be $(v_s^1, v_f^1), (v_s^2, v_f^1), \ldots, (v_s^L, v_f^1), (v_s^1, v_f^2), (v_s^2, v_f^2) \ldots,$ and $(v_L^s, v_f^M)$. There are a total of $L \times M$ space-frequency vector pairs. For brevity, examples are not listed herein one by one. The $L \times M$ bits in the bitmap are in a one-to-one correspondence with the $L \times M$ space-frequency vector pairs.

In the foregoing descriptions, the $r^{th}$ transport layer is used as an example to briefly describe a specific method for indicating the positions of the reported space-frequency vector pairs by using the sub-bitmap. For any one of the plurality of transport layers, the terminal device may indicate a position of a reported space-frequency vector pair in a same manner. The sub-bitmaps corresponding to the R transport layers may be concatenated together to form the bitmap used to indicate the space-frequency vector pairs reported for the R transport layers.

For ease of differentiation and description, a bitmap used to indicate a position of a space-frequency vector pair reported for each of the R transport layers is referred to as a sub-bitmap below. The bitmap corresponding to the R transport layers may include R sub-bitmaps.

In this embodiment of this application, the length of the bitmap may be a fixed value. In other words, the length of the bitmap may be irrelevant to the quantity R of transport layers. In a possible design, the quantity of polarization directions of the transmit antenna is 1, and the length of the bitmap may be $L \times M \times R_m$.

In other words, the length of the bitmap may be designed according to a predefined maximum quantity $R_m$ of transport layers. For the R transport layers, the first $L \times M \times R$ bits in the bitmap are valid. Herein, "valid" may mean that the bits may be used to indicate positions of space-frequency vector pairs.

Specifically, the bitmap having the length of $L \times M \times R_m$ may include $R_m$ sub-bitmaps, and each sub-bitmap may correspond to a plurality of space-frequency vector pairs at one transport layer. For example, when the quantity R of transport layers is actually 1, the first L×M bits in the bitmap are valid, and may be referred to as indicator bits; and the last L×M×3 bits have no effect. Compared with the first L×M indicator bits, the last L×M×3 bits may be referred to as invalid bits, and the invalid bits may be padded with any values, for example, may be padded with zeros. When the quantity R of transport layers is actually 2, the first L×M×2 bits in the bitmap are valid, and the last L×M×2 bits may be any bits. When the quantity R of transport layers is actually 3, the first L×M×3 bits in the bitmap are valid, and the last L×M bits may be any bits; and so on. For brevity, examples are not described one by one herein.

The invalid bits are still considered as a part of the bitmap. In other words, the bitmap may include actually valid indicator bits and invalid bits. The indicator bits and the invalid bits may be used as a whole. For example, the indicator bits and the invalid bits may belong to a code block, and may be encoded as a whole. It should be understood that, that the indicator bits and the invalid bits belong to a code block does not represent that the code block includes only the indicator bits and the invalid bits, and the code block may further include more information bits. This is not limited in this application. For brevity, descriptions of a same or similar case are omitted below.

It should be understood that a relative position of the indicator bits and the invalid bits in the foregoing example is merely an example, and should not constitute any limitation on this application. For example, the invalid bits may alternatively be located before the indicator bits.

It should be noted that, in this embodiment of this application, the invalid bits are considered as a part of the bitmap. The bitmap may be used as an indication field to indicate the positions of the space-frequency vector pairs reported for the R transport layers. When the quantity R of transport layers changes, the length of the bitmap is a fixed value. In other words, a length of the indication field is a fixed value. However, this should not constitute any limitation on this application. The indication field may be understood differently. For example, the indication field may alternatively include only actually valid indicator bits in the bitmap. Other bits than the actual valid indicator bits in the bitmap may be padded with any values, for example, padded with a string of invalid bits whose values are "0", to ensure that a total length of the indicator bits and the invalid bits remains unchanged when the value of R changes. In this case, the string of padded invalid bits whose values are "0" is a part external to the indication field. The bits that can be padded with any values in this part are invalid. The network device does not need to interpret this part. The bits that may be padded with any values in this part are referred to as padding (padding) bits or supplementary bits. If the padding bits are considered as a part external to the indication field, the bitmap whose length is L×M×$R_m$ defined above may include the indication field and the padding bits. In this case, only the actual valid indicator bits in the bitmap are considered as the indication field. The length of the indication field may be related to the quantity of transport layers. For example, in the foregoing design, the length of the indication field may be L×M×R.

In an embodiment, when $R_m$=4, the length of the bitmap is L×M×4.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 1:

TABLE 1

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L | M | K | | | | | | | | | | K |
| R = 2 | L | M | K | L | M | K | | | | | | | 2K |
| R = 3 | L | M | K | L | M | K/2 | L | M | K/2 | | | | 2K |
| R = 4 | L | M | K/2 | L | M | K/2 | L | M | K/2 | L | M | K/2 | 2K |

As shown in Table 1, when R=1, the quantity of reported space-frequency vector pairs is K. In other words, a total quantity of space-frequency vector pairs reported by the terminal device is K. The K space-frequency vector pairs are selected from L×M space-frequency vector pairs determined by L spatial domain vectors and M frequency domain vectors.

When R=2, a total quantity of space-frequency vector pairs reported by the terminal device for the two transport layers is 2K. A quantity of space-frequency vector pairs reported for each transport layer is K, and the K space-frequency vector pairs reported for each transport layer are selected from L×M space-frequency vector pairs determined by L spatial domain vectors and M frequency domain vectors.

It should be understood that the L spatial domain vectors corresponding to the first transport layer may be the same as or different from the L spatial domain vectors corresponding to the second transport layer. The M frequency domain vectors corresponding to the first transport layer may be the same as or different from the M frequency domain vectors corresponding to the second transport layer. This is not limited in this application.

When R=3, a total quantity of space-frequency vector pairs reported by the terminal device for the three transport layers is 2K. A quantity of space-frequency vector pairs reported for the first transport layer is K, and the K space-frequency vector pairs may be selected from L×M space-frequency vector pairs determined by L spatial domain vectors and M frequency domain vectors. A quantity of space-frequency vector pairs reported for the second transport layer is K/2, and the K/2 space-frequency vector pairs may be selected from L×M space-frequency vector pairs determined by L spatial domain vectors and M frequency domain vectors. A quantity of space-frequency vector pairs reported for the third transport layer is K/2, and the K/2 space-frequency vector pairs may be selected from L×M space-frequency vector pairs determined by L spatial domain vectors and M frequency domain vectors.

It should be understood that the three transport layers may have L same or different corresponding spatial domain vectors, and the three transport layers may have M same or different corresponding frequency domain vectors. This is not limited in this application.

Herein, that the three transport layers have the L same corresponding spatial domain vectors may mean that any two of the three transport layers have same corresponding spatial domain vectors. That is, the L spatial domain vectors may be shared at the three transport layers. That the three transport layers have the L different corresponding spatial domain vectors may mean that at least two of the three transport layers have different corresponding spatial domain vectors. That is, the L spatial domain vectors may not be shared at the three transport layers. The spatial domain vectors corresponding to the three transport layers may be independent of each other.

Similarly, that the three transport layers have the M same corresponding frequency domain vectors may mean that any two of the three transport layers have same frequency domain vectors. That is, the M frequency domain vectors may be shared at the three transport layers. That the three transport layers have the M different corresponding frequency domain vectors may mean that at least two of the three transport layers have different corresponding frequency domain vectors. That is, the M frequency domain vectors may not be shared at the three transport layers. The frequency domain vectors corresponding to the three transport layers may be independent of each other.

For brevity, descriptions of a same or similar case are omitted below.

When R=4, a total quantity of space-frequency vector pairs reported by the terminal device for the four transport layers is 2K. A quantity of space-frequency vector pairs reported for each transport layer is K/2, and the K/2 space-frequency vector pairs reported for each transport layer may be selected from L×M space-frequency vector pairs determined by L spatial domain vectors and M frequency domain vectors.

It should be understood that the four transport layers may have L same or different corresponding spatial domain vectors, and the four transport layers may have M same or different corresponding frequency domain vectors. This is not limited in this application.

That the three transport layers have the L same or different corresponding spatial domain vectors and that the three transport layers have the M same or different corresponding frequency domain vectors are described above by using the three transport layers as an example. For brevity, details are not described herein again.

In another possible design, the quantity of polarization directions of the transmit antenna is 1, and the length of the bitmap may be L×M×2.

When $R_m$>2, the length of the bitmap is smaller than the length of the bitmap in the previous design. When R<2, for example, R=1, the first L×M bits in the bitmap are valid, and the last L×M bits may be padded with any values. The padding bits may be considered as a part of the bitmap. In other words, the bitmap may include indicator bits and padding bits. The indicator bits and the padding bits may be used as a whole, for example, may belong to a code block.

It should be understood that a relative position of the indicator bits and the padding bits in the foregoing example is merely an example, and should not constitute any limitation on this application. For example, the padding bits may alternatively be located before the indicator bits.

It should be noted that, in this embodiment of this application, the padding bits are considered as a part of the bitmap. The bitmap may be used as an indication field to indicate the positions of the space-frequency vector pairs reported for the R transport layers. When the quantity R of transport layers changes, the length of the bitmap is a fixed value. In other words, a length of the indication field is a fixed value. However, this should not constitute any limitation on this application. For example, the indication field may alternatively include only the valid bits in the bitmap, and the padding bits are considered as a part external to the indication field. If the padding bits are considered as a part external to the indication field, when R=1, the bitmap whose length is L×M×2 defined above may include the indication field and the padding bits. In this case, the length of the indication field may be related to the quantity of transport layers. For example, in the foregoing design, when R=1, the length of the indication field may be L×M.

When R≥2, all bits in the bitmap are valid.

Specifically, when R=2, every L×M bits in the bitmap may correspond to one transport layer. For example, the first L×M bits in the bitmap correspond to the first transport layer, and may be a sub-bitmap corresponding to the first transport layer; and the last L×M bits may correspond to the second transport layer, and may be a sub-bitmap corresponding to the second transport layer.

When R=3, the first L×M bits in the bitmap may correspond to the first transport layer, and may be a sub-bitmap corresponding to the first transport layer; the intermediate L×M/2 bits may correspond to the second transport layer, and may be a sub-bitmap corresponding to the second transport layer; and the last L×M/2 bits may correspond to the third transport layer, and may be a sub-bitmap corresponding to the third transport layer.

When R=4, every L×M/2 bits in the bitmap correspond to one transport layer. For example, the first L×M/2 bits in the bitmap may correspond to the first transport layer, and may be a sub-bitmap corresponding to the first transport layer; L×M/2 bits after the first L×M/2 bits may correspond to the second transport layer, and may be a sub-bitmap corresponding to the second transport layer; L×M/2 bits after the first L×M bits may correspond to the third transport layer, and may be a sub-bitmap corresponding to the third transport layer; and the last L×M/2 bits may correspond to the fourth transport layer, and may be a sub-bitmap corresponding to the fourth transport layer.

It should be understood that the correspondences that are between the bits and the transport layers and listed above are merely examples, and should not constitute any limitation on this application. For example, the bits in the bitmap may alternatively correspond to the first to the $R^{th}$ transport layers from back to front.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 2:

TABLE 2

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L | M | K | | | | | | | | | | K |
| R = 2 | L | M | K | L | M | K | | | | | | | 2K |
| R = 3 | L | M | K | L | M/2 | K/2 | L | M/2 | K/2 | | | | 2K |
| R = 4 | L | M/2 | K/2 | L | M/2 | K/2 | L | M/2 | K/2 | L | M/2 | K/2 | 2K |

As shown in Table 2, when R=1, the quantity of reported space-frequency vector pairs is K. In other words, a total quantity of space-frequency vector pairs reported by the terminal device for the transport layer is K. The K space-frequency vector pairs may be selected from L×M space-frequency vector pairs determined by L spatial domain vectors and M frequency domain vectors.

When R=2, a total quantity of space-frequency vector pairs reported by the terminal device for the two transport layers is 2K. A quantity of space-frequency vector pairs reported for each transport layer is K, and the K space-frequency vector pairs reported for each transport layer may be selected from L×M space-frequency vector pairs determined by L spatial domain vectors and M frequency domain vectors.

It should be understood that the L spatial domain vectors corresponding to the first transport layer may be the same as or different from the L spatial domain vectors corresponding to the second transport layer. The M frequency domain vectors corresponding to the first transport layer may be the same as or different from the M frequency domain vectors corresponding to the second transport layer. This is not limited in this application.

When R=3, a total quantity of space-frequency vector pairs reported by the terminal device for the three transport layers is 2K. A quantity of space-frequency vector pairs reported for the first transport layer is K, and the K space-frequency vector pairs may be selected from L×M space-frequency vector pairs determined by L spatial domain vectors and M frequency domain vectors. A quantity of space-frequency vector pairs reported for the second transport layer is K/2, and the K/2 space-frequency vector pairs may be selected from L×M/2 space-frequency vector pairs determined by L spatial domain vectors and M/2 frequency domain vectors. A quantity of space-frequency vector pairs reported for the third transport layer is K/2, and the K/2 space-frequency vector pairs may be selected from L×M/2 space-frequency vector pairs determined by L spatial domain vectors and M/2 frequency domain vectors.

It should be understood that the three transport layers may have L same or different corresponding spatial domain vectors; and the M/2 frequency domain vectors corresponding to each of the second transport layer and the third transport layer may be a subset of the M frequency domain vectors corresponding to the first transport layer, or may not belong to the M frequency domain vectors, and the second transport layer and the third transport layer may have M/2 same or different corresponding frequency domain vectors. This is not limited in this application.

When R=4, a total quantity of space-frequency vector pairs reported by the terminal device for the four transport layers is 2K. A quantity of space-frequency vector pairs reported for each transport layer is K/2, and the K/2 space-frequency vector pairs reported for each transport layer may be selected from L×M/2 space-frequency vector pairs determined by L spatial domain vectors and M/2 frequency domain vectors.

It should be understood that the four transport layers may have L same or different corresponding spatial domain vectors, and the four transport layers may have M/2 same or different corresponding frequency domain vectors. This is not limited in this application.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 3:

TABLE 3

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L | M | K | | | | | | | | | | K |
| R = 2 | L | M | K/2 | L | M | K/2 | | | | | | | K |
| R = 3 | L | M | K/2 | L | M/2 | K/4 | L | M/2 | K/4 | | | | K |
| R = 4 | L | M/2 | K/4 | L | M/2 | K/4 | L | M/2 | K/4 | L | M/2 | K/4 | K |

As shown in Table 3, when R=1, the quantity of reported space-frequency vector pairs is K. In other words, a total quantity of space-frequency vector pairs reported by the terminal device for the transport layer is K. The K space-frequency vector pairs may be selected from L×M space-frequency vector pairs determined by L spatial domain vectors and M frequency domain vectors.

When R=2, a total quantity of space-frequency vector pairs reported by the terminal device for the two transport layers is K. A quantity of space-frequency vector pairs reported for each transport layer is K/2, and the K/2 space-frequency vector pairs reported for each transport layer may be selected from L×M space-frequency vector pairs determined by L spatial domain vectors and M frequency domain vectors.

It should be understood that the L spatial domain vectors corresponding to the first transport layer may be the same as or different from the L spatial domain vectors corresponding to the second transport layer. The M frequency domain vectors corresponding to the first transport layer may be the same as or different from the M frequency domain vectors corresponding to the second transport layer. This is not limited in this application.

When R=3, a total quantity of space-frequency vector pairs reported by the terminal device for the three transport layers is K. A quantity of space-frequency vector pairs reported for the first transport layer is K/2, and the K/2 space-frequency vector pairs may be selected from Lx M space-frequency vector pairs determined by L spatial domain vectors and M frequency domain vectors. A quantity of space-frequency vector pairs reported for the second transport layer is K/4, and the K/4 space-frequency vector pairs may be selected from L×M/2 space-frequency vector pairs determined by L spatial domain vectors and M/2 frequency domain vectors. A quantity of space-frequency vector pairs reported for the third transport layer is K/4, and the K/4 space-frequency vector pairs may be selected from L×M/2 space-frequency vector pairs determined by L spatial domain vectors and M/2 frequency domain vectors.

It should be understood that the three transport layers may have L same or different corresponding spatial domain vectors; and the M/2 frequency domain vectors corresponding to each of the second transport layer and the third transport layer may be a subset of the M frequency domain vectors corresponding to the first transport layer, or may not belong to the M frequency domain vectors, and the second transport layer and the third transport layer may have M/2 same or different corresponding frequency domain vectors. This is not limited in this application.

When R=4, a total quantity of space-frequency vector pairs reported by the terminal device for the four transport layers is K. The quantity of space-frequency vector pairs reported for each transport layer is K/4, and the K/4 space-frequency vector pairs may be selected from L×M/2 space-frequency vector pairs determined by L spatial domain vectors and M/2 frequency domain vectors.

It should be understood that the four transport layers may have L same or different corresponding spatial domain vectors, and the four transport layers may have M/2 same or different corresponding frequency domain vectors. This is not limited in this application.

In still another possible design, the quantity of polarization directions of the transmit antenna is 1, and the length of the bitmap may be L×M.

The length of the bitmap is smaller than the lengths of the bitmaps in the previous two designs. When R is any value, all bits in the bitmap are valid, and no padding bit is required to ensure a same length. Therefore, no matter how an indication field is defined, in this design, a length of the indication field is also a fixed value.

When R=1, all the bits in the bitmap may correspond to one transport layer.

When R=2, the first L×M/2 bits in the bitmap may correspond to the first transport layer, and may be a sub-bitmap corresponding to the first transport layer; and the last L×M/2 bits may correspond to the second transport layer, and may be a sub-bitmap corresponding to the second transport layer.

When R=3, the first L×M/2 bits in the bitmap may correspond to the first transport layer, and may be a sub-bitmap corresponding to the first transport layer; L×M/4 bits after the first L×M/2 bits may correspond to the second transport layer, and may be a sub-bitmap corresponding to the second transport layer; and the last L×M/4 bits may correspond to the third transport layer, and may be a sub-bitmap corresponding to the third transport layer.

When R=4, every L×M/4 bits in the bitmap correspond to one transport layer. For example, the first L×M/4 bits in the bitmap may correspond to the first transport layer, and may be a sub-bitmap corresponding to the first transport layer; L×M/4 bits after the first L×M/4 bits may correspond to the second transport layer, and may be a sub-bitmap corresponding to the second transport layer; L×M/4 bits after the first L×M/2 bits may correspond to the third transport layer, and may be a sub-bitmap corresponding to the third transport layer; and the last L×M/4 bits may correspond to the fourth transport layer, and may be a sub-bitmap corresponding to the fourth transport layer.

It should be understood that the correspondences that are between the bits and the transport layers and listed above are merely examples, and should not constitute any limitation on this application. For example, the bits in the bitmap may alternatively correspond to the first to the $R^{th}$ transport layers from back to front.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 4:

TABLE 4

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L | M | K | | | | | | | | | | K |
| R = 2 | L | M/2 | K/2 | L | M/2 | K/2 | | | | | | | K |
| R = 3 | L | M/2 | K/2 | L | M/4 | K/4 | L | M/4 | K/4 | | | | K |
| R = 4 | L | M/4 | K/4 | L | M/4 | K/4 | L | M/4 | K/4 | L | M/4 | K/4 | K |

As shown in Table 4, when R=1, the quantity of reported space-frequency vector pairs is K. In other words, a total quantity of space-frequency vector pairs reported by the terminal device is K. The K space-frequency vector pairs are selected from L×M space-frequency vector pairs determined by L spatial domain vectors and M frequency domain vectors.

When R=2, a total quantity of space-frequency vector pairs reported by the terminal device for the two transport layers is K. A quantity of space-frequency vector pairs reported for each transport layer is K/2, and the K/2 space-frequency vector pairs reported for each transport layer may be selected from L×M/2 space-frequency vector pairs determined by L spatial domain vectors and M/2 frequency domain vectors.

When R=3, a total quantity of space-frequency vector pairs reported by the terminal device for the three transport layers is K. A quantity of space-frequency vector pairs reported for the first transport layer is K/2, and the K/2 space-frequency vector pairs may be selected from Lx M/2 space-frequency vector pairs determined by L spatial domain vectors and M/2 frequency domain vectors. A quantity of space-frequency vector pairs reported for the second transport layer is K/4, and the K/4 space-frequency vector pairs may be selected from L×M/4 space-frequency vector pairs determined by L spatial domain vectors and M/4 frequency domain vectors. A quantity of space-frequency vector pairs reported for the third transport layer is K/4, and the K/4 space-frequency vector pairs may be selected from L×M/4 space-frequency vector pairs determined by L spatial domain vectors and M/4 frequency domain vectors.

It should be understood that the three transport layers may have L same or different corresponding spatial domain vectors; and the M/4 frequency domain vectors corresponding to each of the second transport layer and the third transport layer may be a subset of the M/2 frequency domain vectors corresponding to the first transport layer, or may not belong to the M/2 frequency domain vectors, and the second transport layer and the third transport layer may have M/4 same or different corresponding frequency domain vectors. This is not limited in this application.

When R=4, a total quantity of space-frequency vector pairs reported by the terminal device for the four transport layers is K. A quantity of space-frequency vector pairs reported for each transport layer is K/4, and the K/4 space-frequency vector pairs reported for each transport layer may be selected from L×M/4 space-frequency vector pairs determined by L spatial domain vectors and M/4 frequency domain vectors.

It should be understood that the four transport layers may have L same or different corresponding spatial domain vectors, and the four transport layers may have M/4 same or different corresponding frequency domain vectors. This is not limited in this application.

For ease of understanding, the foregoing describes the bitmaps in the three different designs in detail by using an example in which the quantity of polarization directions of the transmit antenna is 1. However, this should not constitute any limitation on this application. The bitmap may also be applicable to a case in which there are a plurality of polarization directions.

In a possible design, the quantity of polarization directions of the transmit antenna is 2, and the length of the bitmap may be $2L \times M \times R_m$.

Similar to the case in which the quantity of polarization directions is 1, the length of the bitmap may be designed according to a predefined maximum quantity $R_m$ of transport layers. A difference lies in that for different polarization directions, positions of selected space-frequency vector pairs may be separately indicated. Therefore, when the quantity of polarization directions is 2, for the R transport layers, the first $2L \times M \times R$ bits in the bitmap are valid.

For the $r^{th}$ transport layer, a $(2L \times M \times (r-1)+1)$th bit to a $(2L \times M \times r)^{th}$ bit in the bitmap are valid. These valid bits are $2L \times M$ bits in total. In these valid bits, the first L×M bits may correspond to a first polarization direction, and the last L×M bits may correspond to a second polarization direction. Alternatively, in these valid bits, the first L×M bits may correspond to a second polarization direction, and the last L×M bits may correspond to a first polarization direction. This is not limited in this application.

In an embodiment, when $R_m=4$, the length of the bitmap is $2L \times M \times 4$.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 5:

TABLE 5

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L/2L | M | K | | | | | | | | | | K |
| R = 2 | L/2L | M | K | L/2L | M | K | | | | | | | 2K |
| R = 3 | L/2L | M | K | L/2L | M | K/2 | L/2L | M | K/2 | | | | 2K |
| R = 4 | L/2L | M | K/2 | L/2L | M | K/2 | L/2L | M | K/2 | L/2L | M | K/2 | 2K |

It should be noted that "L/2L" in Table 5 indicates L or 2L. Spatial domain vectors in two polarization directions are considered for the value that is of $L_r$ for each transport layer and that is shown in Table 5. Therefore, the value may be L or 2L. If L same spatial domain vectors are shared in the two polarization directions, the value of $L_r$ may be L. If L spatial domain vectors are used in each of the two polarization directions, the value of $L_r$ may be 2L. As described above, the L spatial domain vectors in a polarization direction may be the same as or different from those in the other polarization direction. This is not limited in this application. That is, when the quantity of polarization directions is 2, the value of $L_r$ may be L or 2L. This is not limited in this application.

As shown in Table 5, when R=1, the quantity of reported space-frequency vector pairs is K. In other words, a total quantity of space-frequency vector pairs reported by the terminal device is K. A space-frequency vector pair reported for the first polarization direction may be selected from L×M space-frequency vector pairs determined by L spatial domain vectors corresponding to the first polarization direction and M frequency domain vectors corresponding to the first polarization direction, and a space-frequency vector pair reported for the second polarization direction may be selected from L×M space-frequency vector pairs determined by L spatial domain vectors corresponding to the second polarization direction and M frequency domain vectors corresponding to the second polarization direction.

When R=2, a total quantity of space-frequency vector pairs reported by the terminal device for the two transport layers is 2K. A quantity of space-frequency vector pairs reported for each transport layer is K, and the K space-frequency vector pairs reported for each transport layer are selected from 2L×M space-frequency vector pairs determined by 2L spatial domain vectors and M frequency domain vectors.

A space-frequency vector pair reported for the $r^{th}$ transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the $r^{th}$ transport layer in the second polarization direction may be selected from L×M space-frequency vector pairs determined by L spatial domain vectors corresponding to the second polarization direction and M frequency domain vectors corresponding to the second polarization direction. When R=2, r is 1 or 2.

It should be understood that the 2L spatial domain vectors corresponding to the first transport layer may be the same as or different from the 2L spatial domain vectors corresponding to the second transport layer. The M frequency domain vectors corresponding to the first transport layer may be the same as or different from the M frequency domain vectors corresponding to the second transport layer. This is not limited in this application.

When R=3, a total quantity of space-frequency vector pairs reported by the terminal device for the three transport layers is 2K.

A quantity of space-frequency vector pairs reported for the first transport layer is K, and the K space-frequency vector pairs may be selected from 2L×M space-frequency vector pairs determined by 2L spatial domain vectors and M frequency domain vectors. A quantity of space-frequency vector pairs reported for the second transport layer is K/2, and the K/2 space-frequency vector pairs may be selected from 2L×M space-frequency vector pairs determined by 2L spatial domain vectors and M frequency domain vectors. A quantity of space-frequency vector pairs reported for the third transport layer is K/2, and the K/2 space-frequency vector pairs may be selected from 2L×M space-frequency vector pairs determined by 2L spatial domain vectors and M frequency domain vectors.

A space-frequency vector pair reported for the $r^{th}$ transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the $r^{th}$ transport layer in the second polarization direction may be selected from L×M space-frequency vector pairs determined by L spatial domain vectors corresponding to the second polarization direction and M frequency domain vectors corresponding to the second polarization direction. When R=3, r is 1, 2, or 3.

It should be understood that the three transport layers may have L same or different corresponding spatial domain vectors, and the three transport layers may have M same or different corresponding frequency domain vectors. This is not limited in this application.

When R=4, a total quantity of space-frequency vector pairs reported by the terminal device for the four transport layers is 2K.

A quantity of space-frequency vector pairs reported for each transport layer is K/2, and the K/2 space-frequency vector pairs reported for each transport layer may be selected from 2L×M space-frequency vector pairs determined by 2L spatial domain vectors and M frequency domain vectors.

A space-frequency vector pair reported for the $r^{th}$ transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the $r^{th}$ transport layer in the second polarization direction may be selected from L×M space-frequency vector pairs determined by L spatial domain vectors corresponding to the second polarization direction and M frequency domain vectors corresponding to the second polarization direction. When R=4, r is 1, 2, 3, or 4.

It should be understood that the four transport layers may have L same or different corresponding spatial domain vectors, and the four transport layers may have M same or different corresponding frequency domain vectors. This is not limited in this application.

It should be further understood that, when R is 1, 2, 3, or 4 as described above, L spatial domain vectors corresponding to a transport layer in the first polarization direction may be the same or different from L spatial domain vectors corresponding to the same transport layer in the second polarization direction. This is not limited in this application.

To adapt to more possible polarization directions, the length of the bitmap may be more commonly represented as P×L×M×$R_m$. P represents a quantity of polarization directions, P≥1, and P is an integer.

In another possible design, the quantity of polarization directions of the transmit antenna is 2, and the length of the bitmap may be 2L×M×2.

Similar to the case in which the quantity of polarization directions is 1, the length of the bitmap in this design is less than the length of the bitmap in the previous design. A difference lies in that for different polarization directions, positions of selected space-frequency vector pairs may be separately indicated. Therefore, when R<2, for example, R=1, the first 2L×M bits in the bitmap are valid, and the last 2L×M bits may be padded with any values. The padding bits may be considered as a part of the bitmap. In other words, the bitmap may include indicator bits and padding bits. The indicator bits and the padding bits may be used as a whole, for example, belong to a code block.

It should be understood that a relative position of the indicator bits and the padding bits in the foregoing example is merely an example, and should not constitute any limitation on this application. For example, the padding bits may alternatively be located before the indicator bits.

It should be noted that, in this embodiment of this application, the padding bits are considered as a part of the bitmap. The bitmap may be used as an indication field to indicate the positions of the space-frequency vector pairs reported for the R transport layers. When the quantity R of transport layers changes, the length of the bitmap is a fixed value. In other words, a length of the indication field is a fixed value. However, this should not constitute any limitation on this application. For example, the indication field may alternatively include only the valid bits in the bitmap, and the padding bits are considered as a part external to the indication field. If the padding bits are considered as a part external to the indication field, when R=1, the bitmap whose length is 2L×M×2 defined above may include the indication field and the padding bits. In this case, the length of the indication field may be related to the quantity of transport layers. For example, in the foregoing design, when R=1, the length of the indication field may be 2L×M.

When R≥2, all bits in the bitmap are valid.

Specifically, when R=2, every 2L×M bits in the bitmap may correspond to one transport layer. For example, the first 2L×M bits in the bitmap correspond to the first transport layer, and may be a sub-bitmap corresponding to the first transport layer; and the last 2L×M bits may correspond to the second transport layer, and may be a sub-bitmap corresponding to the second transport layer.

When R=3, the first 2L×M bits in the bitmap may correspond to the first transport layer, and may be a sub-bitmap corresponding to the first transport layer; the intermediate 2L×M/2 (namely, L×M) bits may correspond to the second transport layer, and may be a sub-bitmap corresponding to the second transport layer; and the last 2L×M/2 (namely, L×M) bits may correspond to the third transport layer, and may be a sub-bitmap corresponding to the third transport layer.

When R=4, every 2L×M/2 (namely, L×M) bits in the bitmap correspond to one transport layer. For example, the first L×M bits in the bitmap may correspond to the first transport layer, and may be a sub-bitmap corresponding to the first transport layer; L×M bits after the first L×M bits may correspond to the second transport layer, and may be a sub-bitmap corresponding to the second transport layer; L×M bits after the first 2L×M bits may correspond to the third transport layer, and may be a sub-bitmap corresponding to the third transport layer; and the last L×M bits may correspond to the fourth transport layer, and may be a sub-bitmap corresponding to the fourth transport layer.

In addition, in the sub-bitmap corresponding to the $r^{th}$ transport layer, a first half of bits (for example, ½ of a bit length of the sub-bitmap) may correspond to the first polarization direction, and a second half of bits may correspond to the second polarization direction. Alternatively, a first half of bits may correspond to the second polarization direction, and a second half of bits may correspond to the first polarization direction. This is not limited in this application.

It should be understood that the foregoing correspondences between the bits and the transport layers and the foregoing correspondences between the bits and the polarization directions are merely examples, and should not constitute any limitation on this application. For example, the bits in the bitmap may alternatively correspond to the first to the $R^{th}$ transport layers from back to front.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 6:

It should be noted that "L/2L" in Table 6 indicates L or 2L. Spatial domain vectors in two polarization directions are considered for the value that is of $L_r$ for each transport layer and that is shown in Table 6. Therefore, the value may be L or 2L. If L same spatial domain vectors are shared in the two polarization directions, the value of $L_r$ may be L. If L spatial domain vectors are used in each of the two polarization directions, the value of $L_r$ may be 2L. As described above, the L spatial domain vectors in a polarization direction may be the same as or different from those in the other polarization direction. This is not limited in this application. That is, when the quantity of polarization directions is 2, the value of $L_r$ may be L or 2L. This is not limited in this application.

As shown in Table 6, when R=1, the quantity of reported space-frequency vector pairs is K. In other words, a total quantity of space-frequency vector pairs reported by the terminal device for the transport layer is K. The K space-frequency vector pairs may be selected from 2L×M space-frequency vector pairs determined by 2L spatial domain vectors and M frequency domain vectors. A space-frequency vector pair reported for the first polarization direction may be selected from L×M space-frequency vector pairs determined by L spatial domain vectors corresponding to the first polarization direction and M frequency domain vectors corresponding to the first polarization direction.

When R=2, a total quantity of space-frequency vector pairs reported by the terminal device for the two transport layers is 2K. A quantity of space-frequency vector pairs reported for each transport layer is K, and the K space-frequency vector pairs reported for each transport layer may be selected from 2L×M space-frequency vector pairs determined by 2L spatial domain vectors and M frequency domain vectors.

A space-frequency vector pair reported for the $r^{th}$ transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the $r^{th}$ transport layer in the second polarization direction may be selected from L×M space-frequency vector pairs determined by L spatial domain vectors corresponding to the second polarization direction and M frequency domain vectors corresponding to the second polarization direction. When R=2, r is 1 or 2.

It should be understood that the 2L spatial domain vectors corresponding to the first transport layer may be the same as or different from the 2L spatial domain vectors corresponding to the second transport layer. The M frequency domain vectors corresponding to the first transport layer may be the same as or different from the M frequency domain vectors corresponding to the second transport layer. This is not limited in this application.

TABLE 6

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L/2L | M | K | | | | | | | | | | K |
| R = 2 | L/2L | M | K | L/2L | M | K | | | | | | | 2K |
| R = 3 | L/2L | M | K | L/2L | K/2 | K/2 | L/2L | K/2 | K/2 | | | | 2K |
| R = 4 | L/2L | K/2 | K/2 | L/2L | K/2 | K/2 | L/2L | K/2 | K/2 | L/2L | K/2 | K/2 | 2K |

When R=3, a total quantity of space-frequency vector pairs reported by the terminal device for the three transport layers is 2K. A quantity of space-frequency vector pairs reported for the first transport layer is K, and the K space-frequency vector pairs may be selected from 2L×M space-frequency vector pairs determined by 2L spatial domain vectors and M frequency domain vectors. In addition, a space-frequency vector pair reported for the first transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the first transport layer in the second polarization direction may be selected from L×M space-frequency vector pairs determined by L spatial domain vectors corresponding to the second polarization direction and M frequency domain vectors corresponding to the second polarization direction.

A quantity of space-frequency vector pairs reported for the second transport layer is K/2, and the K/2 space-frequency vector pairs may be selected from L×M space-frequency vector pairs determined by 2L spatial domain vectors and M/2 frequency domain vectors. In addition, a space-frequency vector pair reported for the second transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the second transport layer in the second polarization direction may be selected from L×M/2 space-frequency vector pairs determined by L spatial domain vectors corresponding to the second polarization direction and M/2 frequency domain vectors corresponding to the second polarization direction.

A quantity of space-frequency vector pairs reported for the third transport layer is K/2, and the K/2 space-frequency vector pairs may be selected from L×M space-frequency vector pairs determined by 2L spatial domain vectors and M/2 frequency domain vectors. In addition, a space-frequency vector pair reported for the third transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the third transport layer in the second polarization direction may be selected from L×M/2 space-frequency vector pairs determined by L spatial domain vectors corresponding to the second polarization direction and M/2 frequency domain vectors corresponding to the second polarization direction.

It should be understood that the three transport layers may have L same or different corresponding spatial domain vectors; and the M/2 frequency domain vectors corresponding to each of the second transport layer and the third transport layer may be a subset of the M frequency domain vectors corresponding to the first transport layer, or may not belong to the M frequency domain vectors, and the second transport layer and the third transport layer may have M/2 same or different corresponding frequency domain vectors. This is not limited in this application.

When R=4, a total quantity of space-frequency vector pairs reported by the terminal device for the four transport layers is 2K. A quantity of space-frequency vector pairs reported for each transport layer is K/2, and the K/2 space-frequency vector pairs reported for each transport layer may be selected from L×M space-frequency vector pairs determined by 2L spatial domain vectors and M/2 frequency domain vectors.

A space-frequency vector pair reported for the $r^{th}$ transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the $r^{th}$ transport layer in the second polarization direction may be selected from L×M/2 space-frequency vector pairs determined by L spatial domain vectors corresponding to the second polarization direction and M/2 frequency domain vectors corresponding to the second polarization direction. When R=4, r is 1, 2, 3, or 4.

It should be understood that the four transport layers may have L same or different corresponding spatial domain vectors, and the four transport layers may have M/2 same or different corresponding frequency domain vectors. This is not limited in this application.

It should be further understood that, when R is 1, 2, 3, or 4 as described above, L spatial domain vectors corresponding to a transport layer in the first polarization direction may be the same or different from L spatial domain vectors corresponding to the same transport layer in the second polarization direction. This is not limited in this application.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 7:

TABLE 7

|  | First transport layer (r = 1) | | | Second transport layer (r = 2) | | | Third transport layer (r = 3) | | | Fourth transport layer (r = 4) | | | $\sum_{r=1}^{R} K_r$ |
| --- | --- | --- | --- | --- | --- | --- | --- | --- | --- | --- | --- | --- | --- |
|  | $L_1$ | $M_1$ | $K_1$ | $L_2$ | $M_2$ | $K_2$ | $L_3$ | $M_3$ | $K_3$ | $L_4$ | $M_4$ | $K_4$ |  |
| R = 1 | L/2L | M | K |  |  |  |  |  |  |  |  |  | K |
| R = 2 | L/2L | M | K/2 | L/2L | M | K/2 |  |  |  |  |  |  | K |
| R = 3 | L/2L | M | K/2 | L/2L | K/2 | K/2 | L/2L | K/2 | K/2 |  |  |  | K |
| R = 4 | L/2L | K/2 | K/2 | L/2L | K/2 | K/2 | L/2L | K/2 | K/2 | L/2L | K/2 | K/2 | K |

It should be noted that "L/2L" in Table 7 indicates L or 2L. Spatial domain vectors in two polarization directions are considered for the value that is of $L_r$ for each transport layer and that is shown in Table 7. Therefore, the value may be L or 2L. If L same spatial domain vectors are shared in the two polarization directions, the value of $L_r$ may be L. If L spatial domain vectors are used in each of the two polarization directions, the value of $L_r$ may be 2L. As described above, there may be L same or different spatial domain vectors in the two polarization directions. This is not limited in this application. That is, when the quantity of polarization directions is 2, the value of $L_r$ may be L or 2L. This is not limited in this application.

As shown in Table 7, when R=1, the quantity of reported space-frequency vector pairs is K. In other words, a total quantity of space-frequency vector pairs reported by the terminal device for the transport layer is K. The K space-frequency vector pairs may be selected from 2L×M space-frequency vector pairs determined by 2L spatial domain vectors and M frequency domain vectors. A space-frequency vector pair reported for the first polarization direction may be selected from L×M space-frequency vector pairs determined by L spatial domain vectors corresponding to the first polarization direction and M frequency domain vectors corresponding to the first polarization direction, and a space-frequency vector pair reported for the second polarization direction may be selected from L×M space-frequency vector pairs determined by L spatial domain vectors corresponding to the second polarization direction and M frequency domain vectors corresponding to the second polarization direction.

When R=2, a total quantity of space-frequency vector pairs reported by the terminal device for the two transport layers is K. A quantity of space-frequency vector pairs reported for each transport layer is K/2, and the K/2 space-frequency vector pairs reported for each transport layer may be selected from L×M space-frequency vector pairs determined by L spatial domain vectors and M frequency domain vectors.

A space-frequency vector pair reported for the $r^{th}$ transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the $r^{th}$ transport layer in the second polarization direction may be selected from L×M space-frequency vector pairs determined by L spatial domain vectors corresponding to the second polarization direction and M frequency domain vectors corresponding to the second polarization direction. When R=2, r is 1 or 2.

It should be understood that the L spatial domain vectors corresponding to the first transport layer may be the same as or different from the L spatial domain vectors corresponding to the second transport layer. The M frequency domain vectors corresponding to the first transport layer may be the same as or different from the M frequency domain vectors corresponding to the second transport layer. This is not limited in this application.

When R=3, a total quantity of space-frequency vector pairs reported by the terminal device for the three transport layers is K. A quantity of space-frequency vector pairs reported for the first transport layer is K/2, and the K/2 space-frequency vector pairs may be selected from 2L×M space-frequency vector pairs determined by 2L spatial domain vectors and M frequency domain vectors. In addition, a space-frequency vector pair reported for the first transport layer in the first polarization direction may be selected from L×M space-frequency vector pairs determined by L spatial domain vectors corresponding to the first polarization direction and M frequency domain vectors corresponding to the first polarization direction, and a space-frequency vector pair reported for the first transport layer in the second polarization direction may be selected from L×M space-frequency vector pairs determined by L spatial domain vectors corresponding to the second polarization direction and M frequency domain vectors corresponding to the second polarization direction.

A quantity of space-frequency vector pairs reported for the second transport layer is K/4, and the K/4 space-frequency vector pairs may be selected from 2L×M/2 (namely, L×M) space-frequency vector pairs determined by 2L spatial domain vectors and M/2 frequency domain vectors. In addition, a space-frequency vector pair reported for the second transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the second transport layer in the second polarization direction may be selected from L×M/2 space-frequency vector pairs determined by L spatial domain vectors corresponding to the second polarization direction and M/2 frequency domain vectors corresponding to the second polarization direction.

A quantity of space-frequency vector pairs reported for the third transport layer is K/4, and the K/4 space-frequency vector pairs may be selected from 2L×M/2 (namely, L×M) space-frequency vector pairs determined by 2L spatial domain vectors and M/2 frequency domain vectors. In addition, a space-frequency vector pair reported for the third transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the third transport layer in the second polarization direction may be selected from L×M/2 space-frequency vector pairs determined by L spatial domain vectors corresponding to the second polarization direction and M/2 frequency domain vectors corresponding to the second polarization direction.

It should be understood that the three transport layers may have L same or different corresponding spatial domain vectors; and the M/2 frequency domain vectors corresponding to each of the second transport layer and the third transport layer may be a subset of the M frequency domain vectors corresponding to the first transport layer, or may not belong to the M frequency domain vectors, and the second transport layer and the third transport layer may have M/2 same or different corresponding frequency domain vectors. This is not limited in this application.

When R=4, a total quantity of space-frequency vector pairs reported by the terminal device for the four transport layers is K. A quantity of space-frequency vector pairs reported for each transport layer is K/4, and the K/4 space-frequency vector pairs may be selected from L×M/2 space-frequency vector pairs determined by L spatial domain vectors and M/2 frequency domain vectors.

A space-frequency vector pair reported for the $r^{th}$ transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the $r^{th}$ transport layer in the second polarization direction may be selected from L×M/2 space-frequency vector pairs determined by L spatial domain vectors corresponding to the second polarization direction and M/2 frequency domain vectors corresponding to the second polarization direction. When R=4, r is 1, 2, 3, or 4.

It should be understood that the four transport layers may have L same or different corresponding spatial domain vectors, and the four transport layers may have M/2 same or different corresponding frequency domain vectors. This is not limited in this application.

It should be further understood that, when R is 1, 2, 3, or 4 as described above, L spatial domain vectors corresponding to a transport layer in the first polarization direction may be the same or different from L spatial domain vectors corresponding to the same transport layer in the second polarization direction. This is not limited in this application.

To adapt to more possible polarization directions, the length of the bitmap may be more commonly represented as P×L×M×2.

In still another possible design, the quantity of polarization directions of the transmit antenna is 2, and the length of the bitmap may be 2L×M.

Similar to the case in which the quantity of polarization directions of the transmit antenna is 1, the length of the bitmap in this design is less than the lengths of the bitmaps in the previous two designs. When R is any value, all bits in the bitmap are valid. Therefore, no padding bit is required. Therefore, no matter how an indication field is defined, in this design, a length of the indication field is also a fixed value.

When R=1, all the bits in the bitmap may correspond to one transport layer.

When R=2, the first 2L×M/2 (namely, L×M) bits in the bitmap may correspond to the first transport layer, and may be a sub-bitmap corresponding to the first transport layer; and the last 2L×M/2 (namely, L×M) bits may correspond to the second transport layer, and may be a sub-bitmap corresponding to the second transport layer.

When R=3, the first 2L×M/2 (namely, L×M) bits in the bitmap may correspond to the first transport layer, and may be a sub-bitmap corresponding to the first transport layer; 2L×M/4 (namely, L×M/2) bits after the L×M bits may correspond to the second transport layer, and may be a sub-bitmap corresponding to the second transport layer; and the last 2L×M/4 (namely, LX M/2) bits may correspond to the third transport layer, and may be a sub-bitmap corresponding to the third transport layer.

When R=4, every L×M/4 bits in the bitmap correspond to one transport layer. For example, the first 2L×M/4 (namely, L×M/2) bits in the bitmap may correspond to the first transport layer, and may be a sub-bitmap corresponding to the first transport layer; 2L×M/4 (namely, L×M/2) bits after the first L×M/2 bits may correspond to the second transport layer, and may be a sub-bitmap corresponding to the second transport layer; 2L×M/4 (namely, L×M/2) bits after the first L×M bits may correspond to the third transport layer, and may be a sub-bitmap corresponding to the third transport layer; and the last 2L×M/4 (namely, L×M/2) bits may correspond to the fourth transport layer, and may be a sub-bitmap corresponding to the fourth transport layer.

It should be understood that the correspondences that are between the bits and the transport layers and listed above are merely examples, and should not constitute any limitation on this application. For example, the bits in the bitmap may alternatively correspond to the first to the $R^{th}$ transport layers from back to front.

In addition, in the sub-bitmap corresponding to the $r^{th}$ transport layer, a first half of bits (for example, ½ of a bit length of the sub-bitmap) may correspond to the first polarization direction, and a second half of bits may correspond to the second polarization direction. Alternatively, a first half of bits may correspond to the second polarization direction, and a second half of bits may correspond to the first polarization direction. This is not limited in this application.

It should be understood that the foregoing correspondences between the bits and the transport layers and the foregoing correspondences between the bits and the polarization directions are merely examples, and should not constitute any limitation on this application. For example, the bits in the bitmap may alternatively correspond to the first to the $R^{th}$ transport layers from back to front.

Optionally, for the R sub-bitmaps in the bitmap, a relationship among the quantity $L_r$ of spatial domain vectors, the quantity $M_r$ of frequency domain vectors, and the quantity $K_r$ of space-frequency vector pairs may be configured as shown in Table 8:

TABLE 8

| | First transport layer (r = 1) | | | Second transport layer (r = 2) | | | Third transport layer (r = 3) | | | Fourth transport layer (r = 4) | | | $\sum_{r=1}^{R} K_r$ |
|---|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ | |
| R = 1 | L/2L | M | K | | | | | | | | | | K |
| R = 2 | L/2L | M/2 | K/2 | L/2L | M/2 | K/2 | | | | | | | K |
| R = 3 | L/2L | M/2 | K/2 | L/2L | M/2 | K/2 | L/2L | M/2 | K/2 | | | | K |
| R = 4 | L/2L | M/2 | K/2 | L/2L | M/2 | K/2 | L/2L | M/2 | K/2 | L/2L | M/2 | K/2 | K |

It should be noted that "L/2L" in Table 8 indicates L or 2L. Spatial domain vectors in two polarization directions are considered for the value that is of $L_r$ for each transport layer and that is shown in Table 8. Therefore, the value may be L or 2L. If L same spatial domain vectors are shared in the two polarization directions, the value of $L_r$ may be L. If L spatial domain vectors are used in each of the two polarization directions, the value of $L_r$ may be 2L. As described above, the L spatial domain vectors a polarization direction may be the same as or different from those in the other polarization direction. This is not limited in this application. That is, when the quantity of polarization directions is 2, the value of $L_r$ may be L or 2L. This is not limited in this application.

As shown in Table 8, when R=1, the quantity of reported space-frequency vector pairs is K. In other words, a total quantity of space-frequency vector pairs reported by the terminal device is K. The K space-frequency vector pairs are selected from 2L×M space-frequency vector pairs determined by 2L spatial domain vectors and M frequency domain vectors. A space-frequency vector pair reported for the first polarization direction may be selected from L×M space-frequency vector pairs determined by L spatial domain vectors corresponding to the first polarization direction and M frequency domain vectors corresponding to the first polarization direction, and a space-frequency vector pair reported for the second polarization direction may be selected from L×M space-frequency vector pairs determined by L spatial domain vectors corresponding to the second polarization direction and M frequency domain vectors corresponding to the second polarization direction.

When R=2, a total quantity of space-frequency vector pairs reported by the terminal device for the two transport layers is K. A quantity of space-frequency vector pairs reported for each transport layer is K/2, and the K/2 space-frequency vector pairs reported for each transport layer may be selected from 2L×M/2 (namely, L×M) space-frequency vector pairs determined by 2L spatial domain vectors and M/2 frequency domain vectors.

A space-frequency vector pair reported for the $r^{th}$ transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the $r^{th}$ transport layer in the second polarization direction may be selected from L×M/2 space-frequency vector pairs determined by L spatial domain vectors corresponding to the second polarization direction and M/2 frequency domain vectors corresponding to the second polarization direction. When R=2, r is 1 or 2.

When R=3, a total quantity of space-frequency vector pairs reported by the terminal device for the three transport layers is K. A quantity of space-frequency vector pairs reported for the first transport layer is K/2, and the K/2 space-frequency vector pairs may be selected from 2L×M/2 (namely, L×M) space-frequency vector pairs determined by 2L spatial domain vectors and M/2 frequency domain vectors. A space-frequency vector pair reported for the first transport layer in the first polarization direction may be selected from L×M/2 space-frequency vector pairs determined by L spatial domain vectors corresponding to the first polarization direction and M/2 frequency domain vectors corresponding to the first polarization direction, and a space-frequency vector pair reported for the first transport layer in the second polarization direction may be selected from L×M/2 space-frequency vector pairs determined by L spatial domain vectors corresponding to the second polarization direction and M/2 frequency domain vectors corresponding to the second polarization direction.

A quantity of space-frequency vector pairs reported for the second transport layer is K/4, and the K/4 space-frequency vector pairs may be selected from L×M/4 space-frequency vector pairs determined by L spatial domain vectors and M/4 frequency domain vectors. A space-frequency vector pair reported for the second transport layer in the first polarization direction may be selected from L×M/4 space-frequency vector pairs determined by L spatial domain vectors corresponding to the first polarization direction and M/4 frequency domain vectors corresponding to the first polarization direction, and a space-frequency vector pair reported for the second transport layer in the second polarization direction may be selected from L×M/4 space-frequency vector pairs determined by L spatial domain vectors corresponding to the second polarization direction and M/4 frequency domain vectors corresponding to the second polarization direction.

A quantity of space-frequency vector pairs reported for the third transport layer is K/4, and the K/4 space-frequency vector pairs are selected from L×M/4 space-frequency vector pairs determined by L spatial domain vectors and M/4 frequency domain vectors. A space-frequency vector pair reported for the third transport layer in the first polarization direction may be selected from L×M/4 space-frequency vector pairs determined by L spatial domain vectors corresponding to the first polarization direction and M/4 frequency domain vectors corresponding to the first polarization direction, and a space-frequency vector pair reported for the third transport layer in the second polarization direction may be selected from L×M/4 space-frequency vector pairs determined by L spatial domain vectors corresponding to the second polarization direction and M/4 frequency domain vectors corresponding to the second polarization direction.

It should be understood that the three transport layers may have L same or different corresponding spatial domain vectors; and the M/4 frequency domain vectors corresponding to each of the second transport layer and the third transport layer may be a subset of the M/2 frequency domain vectors corresponding to the first transport layer, or may not belong to the M/2 frequency domain vectors, and the second transport layer and the third transport layer may have M/4 same or different corresponding frequency domain vectors. This is not limited in this application.

When R=4, a total quantity of space-frequency vector pairs reported by the terminal device for the four transport layers is K. A quantity of space-frequency vector pairs reported for each transport layer is K/4, and the K/4 space-frequency vector pairs reported for each transport layer may be selected from L×M/4 space-frequency vector pairs determined by L spatial domain vectors and M/4 frequency domain vectors.

A space-frequency vector pair reported for the $r^{th}$ transport layer in the first polarization direction may be selected from L×M/4 space-frequency vector pairs determined by L spatial domain vectors corresponding to the first polarization direction and M/4 frequency domain vectors corresponding to the first polarization direction, and a space-frequency vector pair reported for the $r^{th}$ transport layer in the second polarization direction may be selected from L×M/4 space-frequency vector pairs determined by L spatial domain vectors corresponding to the second polarization direction and M/4 frequency domain vectors corresponding to the second polarization direction. When R=4, r is 1, 2, 3, or 4.

It should be understood that the four transport layers may have L same or different corresponding spatial domain vectors, and the four transport layers may have M/4 same or different corresponding frequency domain vectors. This is not limited in this application.

It should be further understood that, when R is 1, 2, 3, or 4 as described above, L spatial domain vectors corresponding to a transport layer in the first polarization direction may be the same or different from L spatial domain vectors corresponding to the same transport layer in the second polarization direction. This is not limited in this application.

To adapt to more possible polarization directions, the length of the bitmap may be more commonly represented as P×L×M.

Several possible designs of the bitmap provided in this embodiment of this application are described above in detail with reference to Table 1 to Table 8. This should not constitute any limitation on this application. For example, when the quantity of polarization directions of the transmit antenna is 1, the length of the bitmap may alternatively be designed as $L \times M \times R_m/2$. When the quantity of polarization directions of the transmit antenna is 2, the length of the bitmap may alternatively be designed as $2L \times M \times R_m/2$ (namely, $L \times M \times R_m$). For the correspondences between the bits in the bitmap and the transport layers, refer to the correspondences listed above. For brevity, details are not described herein again.

It should be further understood that, when it is defined in a protocol that one of the plurality of designs of the bitmap is used, the terminal device may generate the bitmap based on the defined design, and the network device may also parse the bitmap based on the corresponding design.

It should be further understood that, when L and M are defined differently, the foregoing listed formula used to calculate the length of the bitmap also changes accordingly. A method that is used to calculate the length of the bitmap and determined by a person skilled in the art based on a same inventive concept shall fall within the protection scope of this application.

Optionally, the bitmap is located in the first part of the CSI report.

As described above, a length of the first part of the CSI report is predefined. The length of the bitmap may be a fixed value, and is irrelevant to the quantity R of transport layers. Therefore, the bitmap may be designed in the first part of the CSI report. Overheads of the first part of the CSI report may be fixed, and do not change with the quantity R of transport layers. The overheads of the first part may be predefined in a protocol, so that after receiving the CSI report, the network device decodes the first part based on the predefined length.

Optionally, the CSI report further includes the second part, and the second part includes an indication of the weighting coefficient reported for each of the R transport layers.

For example, for the $r^{th}$ transport layer, the CSI report may be used to indicate $T_r$ weighting coefficients.

In the first part, the bitmap is used to indicate the quantity of space-frequency vector pairs reported for each transport layer, and a quantity of quantization bits of each weighting coefficient may be predetermined. Therefore, indication overheads of the weighting coefficient reported for each of the R transport layers in the second part may be determined.

The $r^{th}$ transport layer is used as an example. A quantity of weighting coefficients reported by the terminal device is $T_r$. If a quantity of amplitude quantization bits of each weighting coefficient is x, and a quantity of phase quantization bits of the weighting coefficient is y, the indication overheads of the weighting coefficients reported for the $r^{th}$ transport layer may be, for example, $(x+y) \times T_r$ bits. In this case, indication overheads of the weighting coefficients reported for the R transport layers may be, for example $$\sum_{r=1}^{R} (x+y) \times T_r$$

bits.

As described above, because the weighting coefficients correspond to the space-frequency vector pairs, the CSI report indicates, by using the bitmap, both the quantity and the positions of space-frequency vector pairs reported for each transport layer, and the quantity and the positions of weighting coefficients reported for each transport layer.

For example, the terminal device may indicate a weighting coefficient in a normalized manner, or may indicate, by using a quantization value or an index of a quantization value, one or more weighting coefficients corresponding to a space-frequency vector pair.

If indicating the weighting coefficient in the normalized manner, the terminal device may determine a maximum coefficient within a predetermined normalized range, and normalize the maximum coefficient. Then, the terminal device may indicate a relative value of another coefficient relative to the maximum coefficient by using a quantization value or an index of a quantization value. If indicating the weighting coefficient in the normalized manner, the terminal device may further indicate a position of the normalized coefficient in the second part.

It should be understood that the normalization mentioned above may mean that a maximum weighting coefficient is determined in a unit of each polarization direction, each transport layer, or all transport layers, so that the normalization is performed in different ranges such as the polarization direction, the transport layer, or all the transport layers.

It should be further understood that for a specific method for indicating the weighting coefficient in the normalized manner, refer to the current technology. For brevity, detailed descriptions of the specific process are omitted herein.

The terminal device may indicate, by using the quantization value or the index of the quantization value, the weighting coefficients corresponding to the space-frequency vector pairs in a pre-agreed sequence. For example, the terminal device may sequentially indicate corresponding weighting coefficients according to a sequence of the reported space-frequency vector pairs in the bitmap.

Further, when a plurality of weighting coefficients are reported for a same transport layer, the plurality of weighting coefficients corresponding to the same transport layer may belong to at least two quantization levels. The at least two quantization levels include a first quantization level and a second quantization level, and a quantity of quantization bits of a weighting coefficient corresponding to the first quantization level is greater than a quantity of quantization bits of a weighting coefficient corresponding to the second quantization level.

A quantity of quantization levels and a classification rule may be predefined, for example, defined in a protocol.

In an implementation, a plurality of quantization levels may be obtained through classification based on amplitude quantization values. In other words, different quantization levels may correspond to different amplitude quantization values. Table 9 shows an example of a correspondence between a quantization level and an amplitude quantization value. As shown in Table 9, four quantization levels may be obtained through classification based on amplitude quantization values of weighting coefficients.

TABLE 9

| Quantization level | Amplitude quantization value |
|---|---|
| 1 | 1 |
|  | $\sqrt{1/2}$ |
| 2 | $\sqrt{1/4}$ |
|  | $\sqrt{1/8}$ |
|  | $\sqrt{1/16}$ |

TABLE 9-continued

| Quantization level | Amplitude quantization value |
|---|---|
| 3 | $\sqrt{1/32}$ |
|   | $\sqrt{1/64}$ |
| 4 | 0 |

Optionally, a quantity of phase quantization bits of the weighting coefficient corresponding to the first quantization level is greater than a quantity of phase quantization bits of the weighting coefficient corresponding to the second quantization level. Table 10 shows an example of a correspondence among a quantization level, an amplitude quantization value, and a phase quantization bit.

TABLE 10

| Quantization level | Amplitude quantization value | Phase quantization bit |
|---|---|---|
| 1 | 1 | 4 |
|   | $\sqrt{1/2}$ | |
| 2 | $\sqrt{1/4}$ | 3 |
|   | $\sqrt{1/8}$ | |
|   | $\sqrt{1/16}$ | |
| 3 | $\sqrt{1/32}$ | 2 |
|   | $\sqrt{1/64}$ | |
| 4 | 0 | 0 |

Certainly, correspondences between different quantization levels and quantities of amplitude quantization bits may further be defined. For brevity, examples are not provided one by one herein for description.

The indication overheads of the weighting coefficient reported for each transport layer may be determined based on quantities of amplitude quantization bits and quantities of phase quantization bits that correspond to different quantization levels and quantities of weighting coefficients corresponding to the quantization levels. For brevity, no example is provided herein for description.

It should be understood that the foregoing correspondences among the quantity of quantization levels, the quantization levels, the amplitude quantization values, and the phase quantization bits are merely examples for ease of understanding, and should not constitute any limitation on this application. The quantity of quantization levels and the correspondence among the quantization level, the amplitude quantization value, and the phase quantization bit are not limited in this application.

In another implementation, a plurality of quantization levels may be obtained through classification based on amplitude quantization values and a quantity of weighting coefficients. For example, a quantity of quantization levels is predefined as 2. In this case, in the weighting coefficients reported for each transport layer, some weighting coefficients having larger amplitude quantization values may be classified into a first quantization level, and some weighting coefficients having smaller amplitude quantization values may be classified into a second quantization level.

For example, the quantity of weighting coefficients reported for the $r^{th}$ transport layer is $T_r$. In this case, $T_r/2$ weighting coefficients having larger amplitude quantization values may be classified into the first quantization level, and are quantized by using a quantity of quantization bits corresponding to the first quantization level; and $T_r/2$ weighting coefficients having smaller amplitude quantization values may be classified into the second quantization level, and are quantized by using a quantity of quantization bits corresponding to the second quantization level.

It should be understood that the foregoing quantization level classification methods are merely two possible implementations, and should not constitute any limitation on this application. The quantity of quantization levels and the classification rule of the quantization levels are not limited in this application Optionally, the second part of the CSI report further includes indication of spatial domain vectors reported for each of the R transport layers.

For example, for the $r^{th}$ transport layer, the CSI report may be used to indicate $L_r$ spatial domain vectors.

A quantity of spatial domain vectors reported for each transport layer may be predefined, or may be directly or indirectly indicated by the network device by using signaling. This is not limited in this application.

Optionally, the method further includes: The terminal device receives second indication information. The second indication information is used to indicate the quantity of to-be-reported spatial domain vectors that is configured for each transport layer. Correspondingly, the network device transmits the second indication information.

The network device may include the second indication information in higher layer signaling such as an RRC message or a MAC CE or by using physical layer signaling such as DCI, to indicate, to the terminal device, the quantity of to-be-reported spatial domain vectors that is configured for each transport layer. Specific signaling carrying the second indication information is not limited in this application.

In a possible design, the second indication information may indicate a maximum value L of a quantity of to-be-reported spatial domain vectors that is configured for each of the R transport layers. The maximum value L may be replaced with a minimum value, an average value, or the like. The terminal device may determine, according to a predefined rule and based on the quantity of transport layers and a value indicated by the second indication information, the quantity of spatial domain vectors reported for each transport layer. In this case, the second indication information indirectly indicates the quantity of to-be-reported spatial domain vectors that is configured for each transport layer.

In another possible design, the second indication information may directly indicate, when the value of R changes, the quantity of to-be-reported spatial domain vectors that is configured for each transport layer, and the terminal device and the network device may directly determine, based on the second indication information and the quantity of transport layers, the quantity of spatial domain vectors that need to be reported for each transport layer. It may be understood that, when a meaning represented by the value indicated by the second indication information changes, the predefined rule for determining the reporting quantity corresponding to each transport layer also changes, and the foregoing listed formulas used to calculate the length of the bitmap also change.

In addition, the quantity of spatial domain vectors reported for each transport layer may alternatively be predefined, for example, defined in a protocol. For example, the quantity of to-be-reported spatial domain vectors that is configured for each transport layer when the value of R changes may be predefined in the protocol. Alternatively, the maximum value L may be predefined. This is not limited in this application.

It should be understood that the quantity of transport layers may be determined by the terminal device. For example, the terminal device may determine the quantity of transport layers based on downlink channel measurement. For a specific method for determining the quantity of transport layers by the terminal device, refer to the current technology. For brevity, detailed descriptions of the specific process are omitted herein.

In this embodiment of this application, optionally, a same quantity of spatial domain vectors are configured for each of the R transport layers. For example, the quantity is L.

After the quantity of spatial domain vectors that need to be reported for each transport layer is determined, indication overheads used to indicate the spatial domain vectors may be determined. For example, when the spatial domain vectors reported for each transport layer are selected from a spatial domain vector set, for the transport layer, the indication overheads used to indicate the spatial domain vectors may be, for example, $\lceil \log_2 C_{N_s}^{L_r} \rceil$. $N_s$ represents a quantity of spatial domain vectors in the spatial domain vector set or a quantity of spatial domain vectors in an orthogonal group in the spatial domain vector set.

Optionally, the second part of the CSI report further includes indication of frequency domain vectors reported for each of the R transport layers.

For example, for the $r^{th}$ transport layer, the CSI report may be used to indicate $M_r$ frequency domain vectors.

A quantity of frequency domain vectors reported for each transport layer may be predefined, or may be directly or indirectly indicated by the network device by using signaling. This is not limited in this application.

Optionally, the method further includes: The terminal device receives third indication information. The third indication information is used to indicate the quantity of to-be-reported frequency domain vectors that is configured for each transport layer. Correspondingly, the network device transmits the third indication information.

The network device may include the third indication information in higher layer signaling such as an RRC message or a MAC CE or by using physical layer signaling such as DCI, to indicate, to the terminal device, the quantity of to-be-reported frequency domain vectors that is configured for each transport layer. Specific signaling carrying the third indication information is not limited in this application.

In a possible design, the third indication information may indicate a maximum value M in the quantities of to-be-reported frequency domain vectors that are configured for the R transport layers. The maximum value M may be replaced with a minimum value, an average value, or the like. The terminal device may determine, according to a predefined rule and based on the quantity of transport layers and a value indicated by the third indication information, the reporting quantity corresponding to each transport layer. In this case, the third indication information indirectly indicates the quantity of to-be-reported frequency domain vectors that is configured for each transport layer.

For example, the third indication information indicates the maximum value M. The predefined rule may be, for example, that when R is 1, a quantity $M_1$ of to-be-reported frequency domain vectors that is configured for the transport layer is the maximum value M; when R is 2, quantities $M_1$ and $M_2$ of to-be-reported frequency domain vectors that are configured for the two transport layers are both the maximum value M or a half of the maximum value, 2/M; when R is 3, a quantity $M_1$ of to-be-reported frequency domain vectors that is configured for the first transport layer is the maximum value M, and quantities $M_2$ and $M_3$ of to-be-reported frequency domain vectors that are configured for the second transport layer and the third transport layer are both a half of the maximum value, M/2; and when R is 4, quantities $M_1$ to $M_4$ of to-be-reported frequency domain vectors that are configured for the four transport layers are all a half of the maximum value, M/2.

It should be understood that the rule listed above is merely an example, and should not constitute any limitation on this application. The foregoing has described in detail, with reference to a specific embodiment, a relationship between the maximum value and the quantity of to-be-reported frequency domain vectors that is configured for each transport layer. For brevity, examples are not described one by one herein. It may be understood that, when a meaning represented by the value indicated by the third indication information changes, the predefined rule for determining the quantity of the reported frequency domain vectors corresponding to each transport layer also changes, and the foregoing listed formulas used to calculate the length of the bitmap also change.

It should be further understood that the maximum value, the minimum value, and the average value listed above are merely several possible implementations, and should not constitute any limitation on this application.

In another possible design, the third indication information may directly indicate, when the value of R changes, the quantity of to-be-reported frequency domain vectors that is configured for each transport layer, and the terminal device may directly determine, based on the third indication information and the quantity of transport layers, the quantity of frequency domain vectors that need to be reported for each transport layer.

In still another possible design, the third indication information and the foregoing second indication information above may be same indication information. For example, a relationship between a quantity of to-be-reported frequency domain vectors that is configured for each transport layer and a quantity of to-be-reported spatial domain vectors that is configured for the transport layer may be predefined. In other words, there may be a correspondence between the quantity of to-be-reported frequency domain vectors and the quantity of to-be-reported spatial domain vectors. For example, when the quantity of to-be-reported spatial domain vectors is 4, the quantity of to-be-reported frequency domain vectors is 4; and when the quantity of to-be-reported spatial domain vectors is 8, the quantity of to-be-reported frequency domain vectors is 6. It should be understood that the examples are provided herein merely for ease of understanding, and should not constitute any limitation on this application. The quantity of to-be-reported spatial domain vectors, the quantity of to-be-reported frequency domain vectors, and a relationship therebetween are not limited in this application. In addition, the correspondence between the quantity of to-be-reported spatial domain vectors and the quantity of to-be-reported frequency domain vectors is not limited to a one-to-one correspondence. In this case, the foregoing second indication information indirectly indicates the quantity of to-be-reported frequency domain vectors that is configured for each transport layer.

In addition, the quantity of to-be-reported frequency domain vectors that is configured for each transport layer may alternatively be predefined, for example, defined in a protocol. For example, the quantity of to-be-reported frequency domain vectors that is configured for each transport layer when the value of R changes may be predefined in the protocol. Alternatively, the maximum value L may be predefined. This is not limited in this application.

After the quantity of frequency domain vectors that need to be reported for each transport layer is determined, indication overheads used to indicate the frequency domain vectors may be determined. For example, when the frequency domain vectors reported for each transport layer are selected from a frequency domain vector set, for the transport layer, the indication overheads used to indicate the frequency domain vectors may be, for example $\lceil \log_2 C_{N_f}^{L_r} \rceil$. $N_f$ represents a quantity of frequency domain vectors in the frequency domain vector set or a quantity of frequency domain vectors in an orthogonal group in the frequency domain vector set.

It should be understood that the first indication information, the second indication information, and the third indication information mentioned above may be carried by using same signaling, or may be carried by using different signaling. This is not limited in this application. In addition, in some cases, the first indication information, the second indication information, and the third indication information may also be combined into one piece of indication information or two pieces of indication information. This is not limited in this application.

The spatial domain vector and the frequency domain vector that are reported for each transport layer and that are used to construct the precoding vector may be determined, for example, by the terminal device based on downlink channel measurement.

Specifically, the spatial domain vector and the frequency domain vector that are used to construct the precoding vector may be specifically a spatial domain vector and a frequency domain vector that are included in a space-frequency vector pair reported by the terminal device. The spatial domain vector used to construct the precoding vector may be selected from a predefined spatial domain vector set, and the frequency domain vector used to construct the precoding vector may be selected from a predefined frequency domain vector set.

The $r^{th}$ transport layer is used as an example. Spatial domain vectors included in $T_r$ space-frequency vector pairs reported by the terminal device may be selected from $L_r$ spatial domain vectors, and the $L_r$ spatial domain vectors may be determined in the predefined spatial domain vector set. Frequency domain vectors included in the $T_r$ space-frequency vector pairs reported by the terminal device may be selected from $M_r$ frequency domain vectors, and the $M_r$ frequency domain vectors may be determined in the predefined frequency domain vector set. The $L_r$ spatial domain vectors and the $M_r$ frequency domain vectors may be predefined, or may be determined by the terminal device based on downlink channel measurement and reported to the network device.

When the $L_r$ spatial domain vectors and the $M_r$ frequency domain vectors are determined by the terminal device based on downlink channel measurement, the $L_r$ spatial domain vectors and the $M_r$ frequency domain vectors may be determined, for example, based on a precoding vector corresponding to each frequency domain unit at the $r^{th}$ transport layer. Herein, the precoding vector corresponding to each frequency domain unit at the $r^{th}$ transport layer may be determined based on a channel matrix obtained through measurement in each frequency domain unit. The precoding vector corresponding to each frequency domain unit at the $r^{th}$ transport layer may be used to construct a space-frequency matrix corresponding to the $r^{th}$ transport layer. The $L_r$ spatial domain vectors and the $M_r$ frequency domain vectors may be determined, for example, by performing spatial domain DFT and frequency domain DFT on the space-frequency matrix corresponding to the $r^{th}$ transport layer.

For example, the space-frequency matrix constructed by using the precoding vector corresponding to each frequency domain unit at the $r^{th}$ transport layer may be denoted as, for example, Hr. A matrix $U_s$ may be constructed by using the predefined spatial domain vector set, and a matrix $U_f$ may be constructed by using the predefined frequency domain vector set. In this case, after the spatial domain DFT and the frequency domain DFT are performed on the space-frequency matrix, a coefficient matrix may be obtained according to the following formula:

$$C=U_s^H H_r U_f.$$

C represents the coefficient matrix obtained by performing the DFT.

The terminal device may determine stronger $L_r$ rows and stronger $M_r$ columns in the coefficient matrix C. For example, the network device may determine, based on a square sum of moduli of all elements in each row of the coefficient matrix C, the $L_r$ rows in which the square sums of the moduli are larger, and may determine, based on a square sum of moduli of all elements in each column of the coefficient matrix C, the $M_r$ columns in which the square sums of the moduli are larger. Therefore, the $L_r$ spatial domain vectors and the $M_r$ frequency domain vectors that are reported for the $r^{th}$ transport layer may be determined based on the space-frequency matrix corresponding to the $r^{th}$ transport layer.

The terminal device may further determine $K_r$ elements having larger moduli in the stronger $L_r$ rows and the stronger $M_r$ columns, to determine stronger $K_r$ space-frequency vector pairs. If the terminal device can determine $K_r$ non-zero elements having larger moduli in the stronger $L_r$ rows and the stronger $M_r$ columns, the quantity $T_r$ of space-frequency vector pairs reported by the terminal device for the $r^{th}$ transport layer may be the same as a pre-configured reporting quantity $K_r$. If a quantity of non-zero elements that can be determined by the terminal device in the stronger $L_r$ rows and the stronger $M_r$ columns is less than $K_r$, the quantity $T_r$ of space-frequency vector pairs reported by the terminal device for the $r^{th}$ transport layer may be less than a pre-configured reporting quantity $K_r$.

In addition, the selected $L_r$ rows and $M_r$ columns in the coefficient matrix C may be used to construct a new coefficient matrix C', and the coefficient matrix C' may be a matrix whose dimension is $L_r \times M_r$. Positions of selected $T_r$ elements in the coefficient matrix C' correspond to positions of the selected $T_r$ space-frequency vector pairs in the $L_r \times M_r$ space-frequency vector pairs determined by the $L_r$ spatial domain vectors and the $M_r$ frequency domain vectors. The selected $T_r$ elements in the coefficient matrix C' are weighting coefficients of $T_r$ corresponding space-frequency vector pairs.

When the L spatial domain vectors or the M frequency domain vectors are shared at the R transport layers, the terminal device may determine the L spatial domain vectors, or the M frequency domain vectors based on the space-frequency matrix corresponding to each transport layer. A specific method may be similar to that described above. For brevity, details are not described herein again.

It should be understood that, for a specific method for determining the precoding matrix based on the channel matrix, refer to the current technology. For brevity, detailed descriptions of the specific process are omitted herein.

It should be further understood that, in the foregoing descriptions, for ease of understanding only, the $r^{th}$ transport layer is used as an example to describe in detail the specific process in which the terminal device determines the $L_r$ spatial domain vectors, the $M_r$ frequency domain vectors, the $T_r$ space-frequency vector pairs, and the corresponding weighting coefficients. However, this should not constitute any limitation on this application. A specific method for determining, by the terminal device, the spatial domain vectors, the frequency domain vectors, the space-frequency vector pairs, and the corresponding weighting coefficients for each transport layer is not limited to that in the foregoing descriptions. For example, the terminal device may alternatively determine the spatial domain vectors, the frequency domain vectors, the space-frequency vector pairs, and the corresponding weighting coefficients for each transport layer by using an existing estimation algorithm such as a multiple signal classification algorithm (MUSIC), a Bartlett algorithm, or an estimation of signal parameters via rotational invariant technique algorithm (ESPRIT).

When the terminal device reports the spatial domain vectors and the frequency domain vectors for each transport layer, the spatial domain vectors and the frequency domain vectors that are selected for each transport layer may be combined in a pairwise manner, to obtain a plurality of spatial domain vector pairs. For example, the $L_r$ spatial domain vectors and the $M_r$ frequency domain vectors that are selected for the $r^{th}$ transport layer may be combined to obtain $L_r \times M_r$ space-frequency vector pairs. However, this is only a possible implementation, and should not constitute any limitation on this application.

In an embodiment, when reporting the spatial domain vectors and the frequency domain vectors for each transport layer, the terminal device may also report one or more corresponding frequency domain vectors based on each spatial domain vector. After the spatial domain vectors reported for each transport layer are determined, the quantity of frequency domain vectors that need to be reported may be determined based on strengths of the spatial domain vectors.

The $r^{th}$ transport layer is used as an example, and the terminal device may first determine the $L_r$ spatial domain vectors. For example, the $L_r$ spatial domain vectors may be determined by performing the foregoing DFT. The $L_r$ spatial domain vectors may correspond to the stronger $L_r$ rows that are in the coefficient matrix C and that are obtained by performing the DFT. Based on amplitudes of coefficients of the $L_r$ spatial domain vectors, a quantity of frequency domain vectors reported for each spatial domain vector may further be determined. The amplitudes of the coefficients of the $L_r$ spatial domain vectors may be determined by the square sum of the moduli of the elements in each of the stronger $L_r$ rows in the coefficient matrix C.

In a possible design, the $L_r$ spatial domain vectors may be grouped into two groups. A first group of spatial domain vectors may include $L_{r1}$ spatial domain vectors, and a second group of spatial domain vectors may include $L_{r2}$ spatial domain vectors. $L_{r1} \geq 1$, $L_{r2} \geq 1$, $L_r = L_{r1} + L_{r2}$, and $L_{r1}$ and $L_{r2}$ are both integers. The first group of spatial domain vectors and the second group of spatial domain vectors may be obtained through grouping according to a preset rule, for example, based on amplitudes. Specifically, an average amplitude of coefficients of the first group of spatial domain vectors is greater than an average amplitude of coefficients of the second group of spatial domain vectors, or a square sum of coefficients of the first group of spatial domain vectors is greater than a square sum of coefficients of the second group of spatial domain vectors, and so on. A specific rule for obtaining through grouping the first group of spatial domain vectors and the second group of spatial domain vectors is not limited in this application.

A quantity of frequency domain vectors reported for each spatial domain vector in the first group of spatial domain vectors may be less than or equal to a maximum value M of a pre-configured quantity of to-be-reported frequency domain vectors. A quantity of frequency domain vectors reported for each spatial domain vector in the first group of spatial domain vectors may be a predefined value, for example, 1.

A quantity $L_{r2}$ of spatial domain vectors in the second group may be predetermined, for example, defined in a protocol, or agreed on in advance by the network device and the terminal device, for example, $L_{r2}=2$. A quantity of frequency domain vectors reported for each spatial domain vector in the second group of spatial domain vectors may be a predefined value, for example, 1.

Therefore, a quantity of space-frequency vector pairs that may be determined based on the frequency domain vectors reported for the first group of spatial domain vectors is less than or equal to $L_{r1} \times M$, and a quantity of space-frequency vector pairs that may be determined based on the frequency domain vectors reported for the second group of spatial domain vectors is less than $L_{r2} \times M$. A quantity of space-frequency vector pairs that may be determined based on the first group of spatial domain vectors, the frequency domain vectors corresponding to the first group of spatial domain vectors, the second group of spatial domain vectors, and the frequency domain vectors corresponding to the second group of spatial domain vectors is less than $L_r \times M$. In the CSI report, the foregoing bitmap may still be used to indicate the space-frequency vector pairs reported for each transport layer.

Further, when the terminal device indicates, by using the second part of the CSI report, the spatial domain vectors reported for each transport layer, $L_r$ shared spatial domain vectors may be reported for the R transport layers, and indication overheads thereof may be, for example, $\lceil \log_2 C_{N_s}^{L_r} \rceil$ bits. Optionally, a quantity of the shared spatial domain vectors that are reported for the R transport layers is L, and indication overheads may be, for example, $\lceil \log_2 C_{N_s}^{L} \rceil$ bits. Alternatively, the terminal device may separately report corresponding spatial domain vectors for different transport layers, and indication overheads thereof may be, for example $$\sum_{r=1}^{R} \lceil \log_2 C_{N_s}^{L_r} \rceil.$$

The specific method for indicating, by the terminal device, the spatial domain vectors reported for each transport layer has been described in detail above. For brevity, details are not described herein again.

When the terminal device indicates, by using the second part of the CSI report, the frequency domain vectors reported for each transport layer, the frequency domain vectors may be reported for each transport layer.

Frequency domain vectors reported for the first group of spatial domain vectors may be $M_r$ frequency domain vectors shared by a plurality of spatial domain vectors in the first group of spatial domain vectors, and indication overheads thereof may be, for example, $\lceil \log_2 C_{N_f}^{M_r} \rceil$ bits. Optionally, a quantity of shared frequency domain vectors that are reported for the plurality of spatial domain vectors in the first group of spatial domain vectors is M, and indication overheads may be, for example, $\lceil \log_2 C_{N_f}^{M} \rceil$ bits. The frequency domain vectors reported for the first group of spatial domain vectors may alternatively be one or more frequency domain vectors reported for each spatial domain vector. If a quantity of the frequency domain vectors reported for each spatial domain vector is denoted as $M_l$, where $M_l \geq 1$ and $M_l$ is an integer, a total quantity of frequency domain vectors reported for the first group of spatial domain vectors may be $$\sum_{l=1}^{L_{r1}} M_l.$$

Therefore, indication overheads thereof may be, for example $$\sum_{l=1}^{L_{r1}} \lceil \log_2 C_{N_f}^{M_l} \rceil$$

bits.

A quantity of frequency domain vectors reported for each spatial domain vector in the second group of spatial domain vectors may be predefined, for example, 1. In this case, indication overheads brought by the frequency domain vectors reported for each spatial domain vector in the second group of spatial domain vectors may be $\lceil \log_2 C_{N_f}^{1} \rceil$ bits. If a quantity of spatial domain vectors in the second group of spatial domain vectors is 2, indication overheads of frequency domain vectors reported for the second group of spatial domain vectors may be $2 \lceil \log_2 C_{N_f}^{1} \rceil$ bits.

It should be understood that the listed quantity of spatial domain vectors in the second group of spatial domain vectors and the listed quantity of frequency domain vectors reported for each spatial domain vector in the second group of spatial domain vectors are merely examples, and should not constitute any limitation on this application. This is not limited in this application.

It should be further understood that, for ease of understanding only, the foregoing shows a possible case of reporting the frequency domain vectors for the first group of spatial domain vectors and the indication overheads, and a possible case of reporting the frequency domain vectors for the second group of spatial domain vectors and the indication overheads. However, this should not constitute any limitation on this application. A specific manner in which the terminal device reports the frequency domain vectors and overheads thereof are not limited in this application. When the specific manner in which the terminal device reports the frequency domain vectors is predefined in a protocol, the terminal device may generate indications of the frequency domain vectors in the CSI report in the manner, and the network device may parse the indications of the frequency domain vectors in the CSI report in the manner.

It should be further understood that the foregoing lists the indication overheads and the plurality of manners in which the spatial domain vectors, the frequency domain vectors, the space-frequency vector pairs, and the weighting coefficients corresponding to the space-frequency vector pairs that are reported for each transport layer are indicated. These are merely examples for ease of understanding, and should not constitute any limitation on this application. Indication overheads and a manner in which the spatial domain vectors, the frequency domain vectors, the space-frequency vector pairs, and the weighting coefficients corresponding to the space-frequency vector pairs that are reported for each transport layer are indicated are not limited in this application.

Based on the foregoing method, indication overheads of the second part of the CSI report may be determined based on the first part of the CSI report.

Further, the second part of the CSI report may include a first field, a second field, and a third field.

In a possible design, the first field may include an indication of the spatial domain vectors reported for each transport layer, the second field may include an indication of the frequency domain vectors reported for each transport layer, and the third field may include an indication of the weighting coefficients reported for each transport layer.

In another possible design, the first field may include indication of the frequency domain vectors reported for each transport layer, the second field may include indication of the spatial domain vectors reported for each transport layer, and the third field may include indication of weighting coefficients reported for each transport layer.

When a plurality of fields in the second part are encoded, an encoding sequence of the plurality of fields may be: The first field is located before the second field, and the second field is located before the third field. In addition, information in each field is sequentially encoded in a sequence from the first transport layer to the $R^{th}$ transport layer value.

It should be understood that the following shows schematic diagrams of arrangements of the plurality of fields in the second part with reference to the accompanying drawings. However, the accompanying drawings are shown merely for ease of understanding, and should not constitute any limitation on this application. An encoding sequence of the fields shown in each of the figures may be understood as a sequence of bit sequences corresponding to the fields in a bit sequence generated based on the CSI report. The terminal device may encode corresponding bit sequences according to an arrangement sequence of the foregoing listed information. Correspondingly, the network device may also decode the corresponding bit sequences according to the arrangement sequence of the foregoing listed information.

It should be further understood that, the foregoing describes the encoding sequence of the fields in the second part. This does not represent that the plurality of fields in the second part are independently encoded for a plurality of times. The plurality of fields in the second part may be encoded as a whole. For example, the plurality of fields belong to a code block. The foregoing encoding sequence may be understood as, for example, a sequence in which the bit sequences corresponding to the fields in the second part are sequentially input into an encoder for encoding. A sequence in which the network device decodes the second part may be the same as the encoding sequence. It may be understood that the fields in the second part are sequentially parsed according to the decoding sequence. For brevity, descriptions of a same or similar case are omitted below.

It should be further understood that, for a specific encoding process, refer to the current technology. For brevity, detailed descriptions of the specific process are omitted herein.

Figure 5:
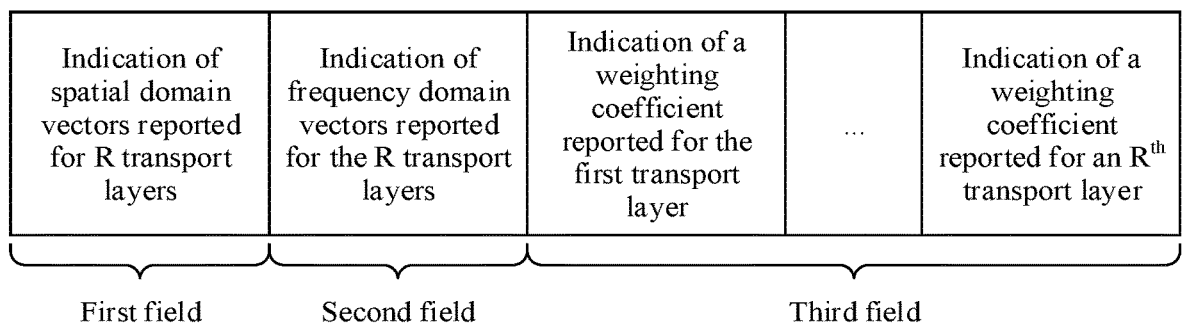
Figure 6:
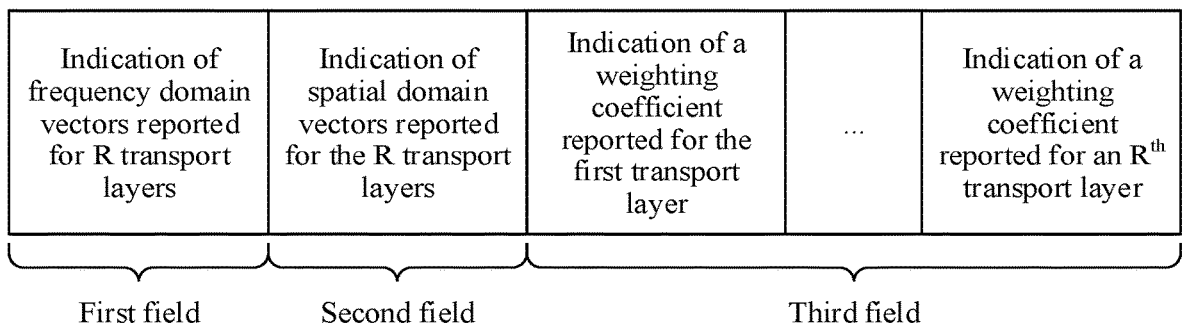

FIG. 3 to FIG. 6 each show the fields in the second part of the CSI report according to the encoding/decoding sequence according to this embodiment of this application. In FIG. 3 and FIG. 5, the first field includes the indication of the spatial domain vectors for each transport layer, and the second field includes the indication of the frequency domain vectors for each transport layer. In FIG. 4 and FIG. 6, the first field includes the indication of the frequency domain vectors for each transport layer, and the second field includes the indication of the spatial domain vectors for each transport layer.

It should be understood that FIG. 3 and FIG. 4 are merely examples for ease of understanding the encoding/decoding sequence of the fields, and do not indicate that the fields need to be arranged in the second part according to the sequences shown in the figures. In addition, the encoding/decoding sequence of the fields may correspond to a sequence of the foregoing priorities. Therefore, the encoding/decoding sequence of the fields may correspond to the arrangement sequence of the fields shown in each of FIG. 3 and FIG. 4.

Optionally, L same spatial domain vectors are reported for the R transport layers. The L spatial domain vectors may be shared at the R transport layers. In this case, the indication of the spatial domain vectors reported for each transport layer in the figures may be combined. That is, the spatial domain vectors reported for the R transport layers need to be indicated only once.

Optionally, M same frequency domain vectors are reported for the R transport layers. The M frequency domain vectors may be shared at the R transport layers. In this case, the indication of the frequency domain vectors reported for each transport layer in the figures may be combined. That is, the frequency domain vectors reported for the R transport layers need to be indicated only once.

Therefore, FIG. 3 and FIG. 4 may be simplified into FIG. 5 and FIG. 6.

Further, when the quantity R of transport layers is greater than 1, frequency domain vectors reported for some transport layers may be a subset of the frequency domain vectors reported for the first transport layer, as listed in Table 2, Table 3, Table 4, Table 6, Table 7, and Table 8 above.

Table 2 is used as an example. When the quantity R of transport layers is 3, the M/2 frequency domain vectors reported for the second transport layer and the M/2 frequency domain vectors reported for the third transport layer may be subsets of the M frequency domain vectors reported for the first transport layer. If the M/2 frequency domain vectors reported for the second transport layer are the same as the M/2 frequency domain vectors reported for the third transport layer, relative positions of the M/2 frequency domain vectors in the M frequency domain vectors reported for the first transport layer may further be indicated, for example, may be indicated by using a combined index. Indication overheads of the combined index may be, for example, $\lceil \log_2 C_M^{M/2} \rceil$ bits. In this case, in FIG. 3 or FIG. 4, an indication of the frequency domain vectors reported for the second transport layer and an indication of the frequency domain vectors reported for the third transport layer may be combined, and relative positions of the M/2 frequency domain vectors in the M frequency domain vectors reported for the first transport layer are indicated.

If the M/2 frequency domain vectors reported for the second transport layer are different from the M/2 frequency domain vectors reported for the third transport layer, relative positions of the M/2 frequency domain vectors for the second transport layer in the M frequency domain vectors reported for the first transport layer and relative positions of the M/2 frequency domain vectors for the third transport layer in the M frequency domain vectors reported for the first transport layer may be separately indicated. Indication overheads thereof may be, for example, $2\lceil \log_2 C_M^{M/2} \rceil$ bits. The indications may be separately placed at a position of the indications of the frequency domain vectors reported for the second transport layer and a position of the indications of the frequency domain vectors reported for the third transport layer in FIG. 3 or FIG. 4.

Certainly, the M/2 frequency domain vectors reported for the second transport layer and the M/2 frequency domain vectors reported for the third transport layer may not be a subset of the M frequency domain vectors reported for the first transport layer. In this case, the frequency domain vectors reported for each transport layer may be separately indicated. When a transmission resource scheduled by the network device for the terminal device is insufficient to transmit all content of the CSI report, some pieces of information in the second part may be discarded.

Optionally, the method further includes: determining to-be-discarded information in the second part in ascending order of priorities. A priority of the third field is lower than a priority of the second field, the priority of the second field is lower than a priority of the first field, and priorities of information in each field are in descending order from the first transport layer to the $R^{th}$ transport layer.

In other words, when the transmission resource scheduled by the network device for the terminal device is insufficient to transmit all the content of the CSI report, it may be considered that the indications of the weighting coefficients in the second part are first discarded. In the indications of the weighting coefficients, it may be considered that the indication of the weighting coefficient of the $R^{th}$ transport layer is first discarded. After all the indications of the weighting coefficients are discarded, the indications of the spatial domain vectors or the indications of the frequency domain vectors may further be discarded.

The fields shown in each of FIG. 3 to FIG. 6 are encoded/decoded in ascending order of the priorities. For brevity, no additional figure is provided herein for description.

Further, in the third field, a plurality of weighting coefficients reported for a same transport layer may correspond to at least two priorities, and the at least two priorities may include a first priority and a second priority. An amplitude of a weighting coefficient corresponding to the first priority may be greater than or equal to an amplitude of a weighting coefficient corresponding to the second priority. Priorities of weighting coefficients that are of the transport layers and that correspond to the first priority are higher than priorities of weighting coefficients that are of the transport layer and that correspond to the second priority. In addition, in weighting coefficients that are of a plurality of transport layers and that correspond to a same priority, priorities are in descending order from the first transport layer to the $R^{th}$ transport layer.

For ease of understanding, FIG. 7 and FIG. 8 each show the fields that are arranged in the second part of the CSI report in a priority sequence according to this embodiment of this application. In FIG. 7, the first field includes the indication of the spatial domain vectors for each transport layer, and the second field includes the indication of the frequency domain vectors for each transport layer. Specific content in the first field and the second field may be, for example, shown in FIG. 3 or FIG. 5. For brevity, the specific content is not listed in the figure. In FIG. 8, the first field includes the indication of the frequency domain vectors for each transport layer, and the second field includes the indication of the spatial domain vectors for each transport layer. Specific content in the first field and the second field may be, for example, shown in FIG. 4 or FIG. 6. For brevity, the specific content is not listed in the figure.

As shown in the figures, in the third field, priorities of weighting coefficients that are of the transport layer and that correspond to the first priority are higher than priorities of weighting coefficients that are of the transport layers and that correspond to the second priority. In the figures, an ellipsis indicates that priorities obtained through division based on amplitudes of the weighting coefficients are not limited to the first priority and the second priority, and may further include more priorities. Weighting coefficients corresponding to the more priorities may be discarded in ascending order of the priorities.

Optionally, the plurality of weighting coefficients reported for the same transport layer may correspond to at least two quantization levels. Quantities of quantization bits of the plurality of weighting coefficients may be determined based on the at least two quantization levels. The at least two quantization levels may include a first quantization level and a second quantization level. A quantity of quantization bits of a weighting coefficient corresponding to the first quantization level may be greater than a quantity of quantization bits of a weighting coefficient corresponding to the second quantization level. In the third field, a priority of a weighting coefficient that is of each transport layer and that corresponds to the first quantization level is higher than a priority of a weighting coefficient that is of the transport layer and that corresponds to the second quantization level. In addition, in a plurality of weighting coefficients that are of the transport layers and that correspond to a same quantization level, priorities are in descending order from the first transport layer to the $R^{th}$ transport layer.

The at least two quantization levels may correspond to the at least two priorities described above. In other words, in FIG. 7 and FIG. 8, "first priority" may be replaced with "first quantization level", and "second priority" may be replaced with "second quantization level".

It should be noted that, "discard" described above may be understood as: Before the second part is encoded/decoded, it is determined that the to-be-discarded information is not encoded/decoded. Therefore, the to-be-discarded information is not fed back to the network device. This seems that some pieces of information in the second part are discarded.

Based on the foregoing method, the terminal device generates the CSI report.

In step 220, the terminal device transmits the CSI report. Correspondingly, the network device receives the CSI report.

For example, the terminal device may transmit the CSI report to the network device on a physical uplink resource such as a physical uplink shared channel (PUSCH) or a physical uplink control channel (PUCCH), so that the network device determines, based on the CSI report, the space-frequency vector pair reported for each transport layer, to recover a precoding vector corresponding to each frequency domain unit at each transport layer.

A specific method for transmitting, by the terminal device, the CSI report to the network device on the physical uplink resource may be the same as that in the current technology. For brevity, detailed descriptions of a specific process thereof are omitted herein.

In step 230, the network device determines, based on the CSI report, a space-frequency vector pair used to construct a precoding vector.

A specific process in which the terminal device indicates, by using the CSI report, the quantity and the positions of the space-frequency vector pairs reported for the R transport layers has been described in detail in step 210. The spatial domain vector pairs reported for the R transport layers are space-frequency vector pairs used to construct the precoding vector.

After receiving the CSI report, the network device may decode the first part of the CSI report based on the pre-defined length of the first part. After parsing the first part of the CSI report, the network device may determine the quantity and the positions of space-frequency vector pairs reported for each transport layer, to determine the indication overheads of the second part of the CSI report, and then decode the second part.

A specific process of parsing the CSI report by the network device is similar to the specific process of generating the CSI report by the terminal device. For brevity, detailed descriptions of the specific process are omitted herein. In addition, for a specific decoding process, refer to the current technology. For brevity, detailed descriptions of the specific process are omitted herein.

As described above, the second part of the CSI report may include the indication of the weighting coefficients reported for each transport layer, the indication of the spatial domain vectors reported for each transport layer, and the indication of the frequency domain vectors reported for each transport layer.

The $r^{th}$ transport layer is used as an example. The network device may determine, based on the CSI report, $T_r$ space-frequency vector pairs and weighting coefficients that correspond to the $r^{th}$ transport layer. The $T_r$ space-frequency vector pairs corresponding to the $r^{th}$ transport layer may be used to construct $T_r$ space-frequency component matrices. The $T_r$ space-frequency component matrices may be weighted and summed to obtain a space-frequency matrix corresponding to the $r^{th}$ transport layer, and then the precoding vector corresponding to each frequency domain unit at the $r^{th}$ transport layer may be determined.

A specific method for determining, by the network device, the precoding vector corresponding to each frequency domain unit based on the spatial domain vector pairs and weighting coefficients that correspond to the $r^{th}$ transport layer has been described in detail above. For brevity, detailed descriptions of the specific process are omitted herein.

Based on a precoding vector that is determined for an $n^{th}$ (where $1 \le n \le N_f$ and n is an integer) frequency domain unit at each transport layer, a precoding matrix corresponding to the $n^{th}$ frequency domain unit may be constructed. For example, the precoding vector corresponding to the $n^{th}$ frequency domain unit at the first transport layer to the precoding vector corresponding to the $n^{th}$ frequency domain unit at the $R^{th}$ transport layer are sequentially arranged in a sequence from the first transport layer to the $R^{th}$ transport layer, and normalization processing is performed, to obtain a precoding matrix corresponding to the $n^{th}$ frequency domain unit.

It should be understood that the foregoing method is merely an example. According to the method, the precoding vector corresponding to each frequency domain unit at each transport layer is determined based on the space-frequency vector pairs and the weighting coefficients that are indicated in the CSI report, and then the precoding matrix corresponding to the frequency domain unit is determined. This should not constitute any limitation on this application. A specific method for determining, by the network device, the precoding matrix based on the space-frequency vector pair and the weighting coefficient is not limited in this application. The precoding vector constructed based on the space-frequency vector pair and the weighting coefficient that are reported by the terminal device is determined based on downlink channels in a plurality of frequency domain units, and can well adapt to the downlink channels due to frequency domain correlation, thereby ensuring relatively high feedback precision. In addition, compared with a feedback manner of a type II codebook in the current technology, in the method for indicating vectors used to construct a precoding vector, feedback overheads do not increase as a quantity of frequency domain units increases. This helps reduce the feedback overheads.

In this embodiment of this application, the terminal device may generate a bitmap having a fixed length in the CSI report, so that the network device determines indication overheads of other indication information based on the bitmap having the fixed length. Therefore, the network device may determine, based on the CSI report, the space-frequency vector pairs reported by the terminal device for each transport layer and the weighting coefficients corresponding to the space-frequency vector pairs, and then construct the precoding vector corresponding to each frequency domain unit.

It should be noted that in step 210, designs of the quantity of to-be-reported spatial domain vectors, the quantity of to-be-reported frequency domain vectors, and the quantity of to-be-reported space-frequency vector pairs that are configured for each transport layer are described in detail with reference to Table 1 to Table 8, and the designs are not limited to being used in the bitmap mentioned in the method 200. In addition, when the quantity R of transport layers changes, a table (for example, any one of Table 1 to Table 8 above) is used to define the quantity of to-be-reported spatial domain vectors, the quantity of to-be-reported frequency domain vectors, and the quantity of to-be-reported space-frequency vector pairs that are configured for each transport layer. This is merely a possible implementation, and should not constitute any limitation on this application.

In an implementation, the quantity $K_r$ of to-be-reported space-frequency vector pairs that is configured for the $r^{th}$ transport layer in the R transport layers may be determined by $K_r = \lceil \beta_r \times L_r M_r \rceil$. $L_r$ represents the quantity of to-be-reported spatial domain vectors that is configured for the $r^{th}$ transport layer, $M_r$ represents the quantity of to-be-reported frequency domain vectors that is configured for the $r^{th}$ transport layer, and $\beta_r$ is a coefficient.

It should be noted that the coefficient $\beta_r$ is different from the weighting coefficient described above. The coefficient $\beta_r$ may be understood as a ratio of the quantity of to-be-reported space-frequency vector pairs to a product of the quantity of to-be-reported spatial domain vectors and the quantity of to-be-reported frequency domain vectors.

In addition, it should be noted that L, M, and β listed below are constants. L, M, and β may all be predefined values. For example, L, M, and β may all be indicated by the network device by using signaling, or may be defined in a protocol.

As described above, L may represent, for example, a maximum value, a minimum value, an average value, or the like in the quantities of to-be-reported spatial domain vectors corresponding to the R transport layers. When the quantity of polarization directions is 2, L may be replaced with 2L or remains unchanged. When the quantity of polarization directions is 2 and L is replaced with 2L, the predefined value may still be L. For example, the network device indicates a value of L by using signaling, or a value of L is defined in a protocol.

M may represent, for example, a maximum value, a minimum value, an average value, or the like in the quantities of reported frequency domain vectors corresponding to the R transport layers.

The foregoing definitions of L, M, and β may be applicable to the embodiments in this application. However, it should be understood that foregoing definitions of L, M, and β are merely an example, and should not constitute any limitation on this application. The definitions of L, M, and β are not limited in this application. For brevity, descriptions of a same or similar case are omitted below.

Optionally, the coefficient $\beta_r$ configured for the $r^{th}$ transport layer is a variable, the quantity of to-be-reported spatial domain vectors that is configured for each of the R transport layers remains unchanged, and the quantity of to-be-reported frequency domain vectors that is configured for each transport layer remains unchanged. Therefore, the quantity $K_r$ of to-be-reported space-frequency vector pairs that is configured for the $r^{th}$ transport layer may change as a value of the coefficient $\beta_r$ changes.

For example, when the quantity of polarization directions is 1, the quantity of to-be-reported spatial domain vectors that is configured for each of the R transport layers is L, the quantity of to-be-reported frequency domain vectors that is configured for each of the R transport layers is M, and a coefficient configured for the $r^{th}$ transport layer is $\beta_r$. $\beta_r$ may be separately configured. In this case, $K_r = \lceil \beta_r \times LM \rceil$.

Table 1 above may be used as an example in which $K_r$ satisfies $K_r = \lceil \beta_r \times LM \rceil$.

For another example, when the quantity of polarization directions is 2, the quantity of to-be-reported spatial domain vectors that is configured for each of the R transport layers is 2L, the quantity of to-be-reported frequency domain vectors that is configured for each of the R transport layers is M, and a coefficient configured for the $r^{th}$ transport layer is $\beta_r$. $\beta_r$ may be separately configured. In this case, $K_r = \lceil \beta_r \times 2LM \rceil$. Certainly, when the quantity of polarization directions is 2, the quantity of to-be-reported spatial domain vectors that is configured for each transport layer may alternatively be L. In this case, $K_r = \lceil \beta_r \times LM \rceil$.

Table 5 above may be used as an example in which $K_r$ satisfies $K_r = \lceil \beta_r \times LM \rceil$ or $K_r = \lceil \beta_r \times 2LM \rceil$.

For example, if $K_r = \lceil \beta_r \times 2LM \rceil$, K in Table 5 above may be replaced with $\lceil \beta \times 2LM \rceil$, and K/2 may be replaced with $\lceil \beta \times 2L \times (M/2) \rceil$.

In addition, Table 5 may also be transformed into Table 11.

TABLE 11

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta/2$ | 2L | M | $\beta/2$ | | | |
| R = 4 | 2L | M | $\beta/2$ | 2L | M | $\beta/2$ | 2L | M | $\beta/2$ | 2L | M | $\beta/2$ |

As described above, when the coefficient $\beta_r$ is a variable, the quantity $K_r$ of to-be-reported space-frequency vector pairs that is configured for the $r^{th}$ transport layer may change as the value of $\beta_r$ changes. In this case, both Table 5 and Table 11 above may be used to indicate the relationship among $K_r$, L, M, and $\beta_r$. It may be understood that Table 5 and Table 11 are merely two possible representation forms used to indicate the relationship among $K_r$, L, M, and $\beta_r$. The relationship among $K_r$, L, M, and $\beta_r$ may alternatively be shown in Table 12.

TABLE 12

| | First transport layer (r = 1) | | | | Second transport layer (r = 2) | | | |
|---|---|---|---|---|---|---|---|---|
| | $L_1$ | $M_1$ | $\beta_1$ | $K_1$ | $L_2$ | $M_2$ | $\beta_2$ | $K_2$ |
| R = 1 | 2L | M | $\beta$ | $\lceil\beta \times 2LM\rceil$ | | | | |
| R = 2 | 2L | M | $\beta$ | $\lceil\beta \times 2LM\rceil$ | 2L | M | $\beta$ | $\lceil\beta \times 2LM\rceil$ |
| R = 3 | 2L | M | $\beta$ | $\lceil\beta \times 2LM\rceil$ | 2L | M | $\beta/2$ | $\lceil(\beta/2) \times 2LM\rceil$ |
| R = 4 | 2L | M | $\beta/2$ | $\lceil(\beta/2) \times 2LM\rceil$ | 2L | M | $\beta/2$ | $\lceil(\beta/2) \times 2LM\rceil$ |

| | Third transport layer (r = 3) | | | | Fourth transport layer (r = 4) | | | |
|---|---|---|---|---|---|---|---|---|
| | $L_3$ | $M_3$ | $\beta_3$ | $K_3$ | $L_4$ | $M_4$ | $\beta_4$ | $K_4$ |
| R = 3 | 2L | M | $\beta/2$ | $\lceil(\beta/2) \times 2LM\rceil$ | | | | |
| R = 4 | 2L | M | $\beta/2$ | $\lceil(\beta/2) \times 2LM\rceil$ | 2L | M | $\beta/2$ | $\lceil(\beta/2) \times 2LM\rceil$ |

Actually, it may be considered that Table 5, Table 11, and Table 12 above are equivalent. However, it should be understood that the relationship among $K_r$, L, M, and $\beta_r$ is not limited to those shown in Table 5, Table 11, and Table 12 above. For example, a ratio of $\beta_r$ to may be directly configured. For brevity, tables are not listed herein one by one for description.

With reference to Table 13 to Table 15, the following lists another example in which the quantity $K_r$ of to-be-reported space-frequency vector pairs satisfies $K_r=\lceil\beta_r \times 2LM\rceil$. Similar to the foregoing tables, it may be considered that Table 13, Table 14, and Table 15 are equivalent.

TABLE 13

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta/2$ | 2L | M | $\beta/2$ | | | |
| R = 4 | 2L | M | $\beta$ | 2L | M | $\beta/3$ | 2L | M | $\beta/3$ | 2L | M | $\beta/3$ |

Table 13 may alternatively be represented as Table 14 or Table 15.

TABLE 14

| | First transport layer (r = 1) | | | Second transport layer (r = 2) | | |
|---|---|---|---|---|---|---|
| | $L_1$ | $M_1$ | $K_1$ | $L_2$ | $M_2$ | $K_2$ |
| R = 1 | 2L | M | $\lceil\beta \times 2LM\rceil$ | | | |
| R = 2 | 2L | M | $\lceil\beta \times 2LM\rceil$ | 2L | M | $\lceil\beta \times 2LM\rceil$ |
| R = 3 | 2L | M | $\lceil\beta \times 2LM\rceil$ | 2L | M | $\lceil(\beta/2) \times 2LM\rceil$ |
| R = 4 | 2L | M | $\lceil\beta \times 2LM\rceil$ | 2L | M | $\lceil(\beta/2) \times 2LM\rceil$ |

| | Third transport layer (r = 3) | | | Fourth transport layer (r = 4) | | |
|---|---|---|---|---|---|---|
| | $L_3$ | $M_3$ | | $L_4$ | $M_4$ | |
| R = 3 | 2L | M | $\lceil(\beta/2) \times 2LM\rceil$ | | | |
| R = 4 | 2L | M | $\lceil(\beta/3) \times 2LM\rceil$ | 2L | M | $\lceil(\beta/3) \times 2LM\rceil$ |

TABLE 15

| | First transport layer (r = 1) | | | | Second transport layer (r = 2) | | | |
|---|---|---|---|---|---|---|---|---|
| | $L_1$ | $M_1$ | $\beta_1$ | $K_1$ | $L_2$ | $M_2$ | $\beta_2$ | $K_2$ |
| R = 1 | 2L | M | $\beta$ | $\lceil\beta \times 2LM\rceil$ | | | | |
| R = 2 | 2L | M | $\beta$ | $\lceil\beta \times 2LM\rceil$ | 2L | M | $\beta$ | $\lceil\beta \times 2LM\rceil$ |
| R = 3 | 2L | M | $\beta$ | $\lceil\beta \times 2LM\rceil$ | 2L | M | $\beta/2$ | $\lceil(\beta/2) \times 2LM\rceil$ |
| R = 4 | 2L | M | $\beta$ | $\lceil\beta \times 2LM\rceil$ | 2L | M | $\beta/3$ | $\lceil(\beta/3) \times 2LM\rceil$ |

| | Third transport layer (r = 3) | | | | Fourth transport layer (r = 4) | | | |
|---|---|---|---|---|---|---|---|---|
| | $L_3$ | $M_3$ | $\beta_3$ | $K_3$ | $L_4$ | $M_4$ | $\beta_4$ | $K_4$ |
| R = 3 | 2L | M | $\beta/2$ | $\lceil(\beta/2) \times 2LM\rceil$ | | | | |
| R = 4 | 2L | M | $\beta/3$ | $\lceil(\beta/3) \times 2LM\rceil$ | 2L | M | $\beta/3$ | $\lceil(\beta/3) \times 2LM\rceil$ |

In the following descriptions, Table 16 to Table 23 show several examples in which the quantity $K_r$ of to-be-reported space-frequency vector pairs satisfy $K_r=\lceil\beta_r \times 2LM\rceil$.

TABLE 16

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta/2$ | 2L | M | $\beta/2$ | | | |
| R = 4 | 2L | M | $\beta$ | 2L | M | $\beta/2$ | 2L | M | $\beta/2$ | 2L | M | $\beta/4$ |

TABLE 17

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta/2$ | 2L | M | $\beta/2$ | | | |
| R = 4 | 2L | M | $\beta$ | 2L | M | $\beta/2$ | 2L | M | $\beta/2$ | 2L | M | $\beta/2$ |

TABLE 18

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $2\beta/3$ | 2L | M | $2\beta/3$ | 2L | M | $2\beta/3$ | | | |
| R = 4 | 2L | M | $\beta/2$ | 2L | M | $\beta/2$ | 2L | M | $\beta/2$ | 2L | M | $\beta/2$ |

TABLE 19

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $2\beta/3$ | 2L | M | $2\beta/3$ | 2L | M | $2\beta/3$ | | | |
| R = 4 | 2L | M | $2\beta/3$ | 2L | M | $2\beta/3$ | 2L | M | $\beta/3$ | 2L | M | $\beta/3$ |

TABLE 20

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta/2$ | 2L | M | $\beta/2$ | 2L | M | $\beta/2$ | | | |
| R = 4 | 2L | M | $\beta/2$ | 2L | M | $\beta/2$ | 2L | M | $\beta/2$ | 2L | M | $\beta/2$ |

TABLE 21

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta$ | 2L | M | $\beta/2$ | | | |
| R = 4 | 2L | M | $\beta$ | 2L | M | $\beta$ | 2L | M | $\beta/2$ | 2L | M | $\beta/2$ |

TABLE 22

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta$ | 2L | M | $\beta/2$ | | | |
| R = 4 | 2L | M | $\beta$ | 2L | M | $\beta$ | 2L | M | $\beta/4$ | 2L | M | $\beta/4$ |

TABLE 23

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta$ | 2L | M | $\beta/2$ | | | |
| R = 4 | 2L | M | $\beta$ | 2L | M | $\beta/2$ | 2L | M | $\beta/2$ | 2L | M | $\beta/2$ |

It should be understood that any one of Table 16 to Table 23 above may be transformed based on a relationship between Table 13 and Table 14 above and a relationship between Table 13 and Table 15 above, to obtain an equivalent table, to indicate the relationship among $K_r$, L, M, and $\beta_r$.

It should be further understood that the relationship among $K_r$, L, M, and $\beta_r$ is described above with reference to Table 11 to Table 23 only for ease of understanding. This should not constitute any limitation on this application. As described above, when the quantity of polarization directions is 2, or when the quantity of polarization directions is 1, $K_r$ may also satisfy $K_r = \lceil \beta_r \times LM \rceil$. In this case, values of $L_1$ to $L_4$ in the foregoing tables may all be replaced with L.

It should be further understood that Table 11 to Table 23 are merely examples, and should not constitute any limitation on this application. When $K_r$ has the foregoing relationship with L, M, and $\beta_r$, all parameters shown in the tables do not need to be configured. For example, when values in the four columns $L_1$ to $L_4$ in the tables are the same, for example, are all 2L, only one column may alternatively be shown. For another example, when values in the four columns $M_1$ to $M_4$ in the tables are the same, for example, are all M, only one column may alternatively be shown. For still another example, values of L, M, and $K_r$ may be directly shown, and $\beta_1$ to $\beta_4$ are not shown. Based on a same concept, a person skilled in the art may make proper transformations and adjustments based on the foregoing tables. These transformations and adjustments shall all fall within the protection scope of this application.

Optionally, the quantity $M_r$ of to-be-reported frequency domain vectors that is configured for the $r^{th}$ transport layer in the R transport layers is a variable, the quantity of to-be-reported spatial domain vectors that is configured for each of the R transport layers remains unchanged, and the coefficient configured for each transport layer remains unchanged. Therefore, the quantity $K_r$ of to-be-reported space-frequency vector pairs that is configured for the $r^{th}$ transport layer may change as the quantity $M_r$ of to-be-reported frequency domain vectors changes.

For example, when the quantity of polarization directions is 1, the quantity of to-be-reported spatial domain vectors that is configured for each of the R transport layers is L, the coefficient configured for each transport layer is $\beta$, and the quantity of to-be-reported frequency domain vectors that is configured for the $r^{th}$ transport layer is $M_r$. $M_r$ may be separately configured. In this case, $K_r = \lceil \beta \times LM_r \rceil$.

Table 2 above may be used as several examples in which $K_r$ satisfies $K_r = \lceil \beta \times LM_r \rceil$.

For another example, when the quantity of polarization directions is 2, the quantity of to-be-reported spatial domain vectors that is configured for each of the R transport layers is 2L, the coefficient configured for each transport layer is $\beta$, and the quantity of to-be-reported frequency domain vectors that is configured for the $r^{th}$ transport layer is $M_r$. $M_r$ may be separately configured. In this case, $K_r = \lceil \beta \times 2LM_r \rceil$. Certainly, when the quantity of polarization directions is 2, the quantity of to-be-reported spatial domain vectors that is configured for each transport layer may alternatively be L. In this case, $K_r = \lceil \beta \times LM_r \rceil$.

Table 6 above may be used as two examples in which $K_r$ satisfies $K_r = \lceil \beta \times 2LM_r \rceil$ or $K_r = \lceil \beta \times 2LM_r \rceil$.

For example, if $K_r = \lceil \beta \times 2LM_r \rceil$ in Table 6 above may be replaced with $\lceil \beta \times 2LM \rceil$, and K/2 may be replaced with $\lceil \beta \times 2L \times (M/2) \rceil$.

In addition, Table 6 may also be transformed into Table 24.

TABLE 24

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M/2 | $\beta$ | 2L | M/2 | $\beta$ | | | |
| R = 4 | 2L | M/2 | $\beta$ | 2L | M/2 | $\beta$ | 2L | M/2 | $\beta$ | 2L | M/2 | $\beta$ |

As described above, when $M_r$ is a variable, the quantity $K_r$ of to-be-reported space-frequency vector pairs that is configured for the $r^{th}$ transport layer may change as a value of $M_r$ changes. In this case, both Table 6 and Table 24 above may be used to indicate the relationship among $K_r$, L, $M_r$, and $\beta$. It may be understood that Table 6 and Table 24 are merely two possible representation forms used to indicate the relationship among $K_r$, L, $M_r$, and $\beta_r$. The relationship among $K_r$, L, M, and $\beta$ may alternatively be represented in the representation form shown in Table 25.

TABLE 25

| | First transport layer (r = 1) | | | | Second transport layer (r = 2) | | | |
|---|---|---|---|---|---|---|---|---|
| | $L_1$ | $M_1$ | $\beta_1$ | $K_1$ | $L_2$ | $M_2$ | $\beta_2$ | $K_2$ |
| R = 1 | 2L | M | $\beta$ | $\lceil \beta \times 2LM \rceil$ | | | | |
| R = 2 | 2L | M | $\beta$ | $\lceil \beta \times 2LM \rceil$ | 2L | M | $\beta$ | $\lceil \beta \times 2LM \rceil$ |
| R = 3 | 2L | M | $\beta$ | $\lceil \beta \times 2LM \rceil$ | 2L | M/2 | $\beta$ | $\lceil \beta \times 2L \times (M/2) \rceil$ |
| R = 4 | 2L | M/2 | $\beta$ | $\lceil \beta \times 2L \times (M/2) \rceil$ | 2L | M/2 | $\beta$ | $\lceil \beta \times 2L \times (M/2) \rceil$ |

| | Third transport layer (r = 3) | | | | Fourth transport layer (r = 4) | | | |
|---|---|---|---|---|---|---|---|---|
| | $L_3$ | $M_3$ | $\beta_3$ | $K_3$ | $L_4$ | $M_4$ | $\beta_4$ | $K_4$ |
| R = 3 | 2L | M/2 | $\beta$ | $\lceil \beta \times 2L \times (M/2) \rceil$ | | | | |
| R = 4 | 2L | M/2 | $\beta$ | $\lceil \beta \times 2L \times (M/2) \rceil$ | 2L | M/2 | $\beta$ | $\lceil \beta \times 2L \times (M/2) \rceil$ |

Actually, it may be considered that Table 6, Table 24, and Table 25 above are equivalent. It should be understood that the relationship among $K_r$, L, $M_r$, and $\beta$ is not limited to the representation forms shown in Table 6, Table 24, and Table 25 above. For example, a ratio of $M_r$ to M may alternatively be directly configured in a table. For brevity, tables are not listed herein one by one for description.

It should be understood that the relationship among $K_r$, L, $M_r$, and $\beta$ is described above with reference to Table 24 and Table 25 only for ease of understanding. However, this should not constitute any limitation on this application. As described above, when the quantity of polarization directions is 2, or when the quantity of polarization directions is 1, $K_r$ may also satisfy $K_r = \lceil \beta \times LM_r \rceil$. In this case, values of $L_1$ to $L_4$ in the foregoing tables may all be replaced with L.

It should be further understood that Table 24 and Table 25 are merely examples, and should not constitute any limitation on this application. When $K_r$ has the foregoing relationship with L, $M_r$, and $\beta$, all parameters shown in the tables do not need to be configured. For example, when values in the four columns $\beta_1$ to $\beta_4$ in Table 21 are all $\beta$, only one column may alternatively be shown. For another example, values of L, $M_r$, and $K_r$ may be directly shown, and $\beta_1$ to $\beta_4$ are not shown. Based on a same concept, a person skilled in the art may make proper transformations and adjustments based on the foregoing tables. These transformations and adjustments shall all fall within the protection scope of this application.

It should be noted that, in the examples described above, the quantity of to-be-reported frequency domain vectors that is configured for each transport layer is a variable, and the quantity of to-be-reported spatial domain vectors that is configured for each transport layer and the coefficient configured for each transport layer are both fixed values. Based on a same concept, optionally, the quantity $L_r$ of to-be-reported spatial domain vectors that is configured for the $r^{th}$ transport layer in the R transport layers is a variable, the quantity of to-be-reported frequency domain vectors that is configured for each of the R transport layers remains unchanged, and the coefficient configured for each transport layer remains unchanged. Therefore, the quantity $K_r$ of to-be-reported space-frequency vector pairs that is configured for the $r^{th}$ transport layer may change as the quantity $L_r$ of to-be-reported spatial domain vectors changes.

For example, when the quantity of polarization directions is 1, the quantity of to-be-reported frequency domain vectors that is configured for each of the R transport layers is M, the coefficient configured for each transport layer is, and the quantity of to-be-reported spatial domain vectors that is configured for the $r^{th}$ transport layer is $L_r$. $L_r$ may be separately configured. In this case, $K_r = \lceil \beta \times L_r M \rceil$.

For another example, when the quantity of polarization directions is 2, the quantity of to-be-reported frequency domain vectors that is configured for each of the R transport layers is M, the coefficient configured for each transport layer is $\beta$, and the quantity of to-be-reported spatial domain vectors that is configured for the $r^{th}$ transport layer is $2L_r$. $2L_r$ may be separately configured. In this case, $K_r = \lceil \beta \times 2L_r M \rceil$. Certainly, when the quantity of polarization directions is 2, the quantity of to-be-reported spatial domain vectors that is configured for each transport layer may alternatively be $L_r$. In this case $K_r = \lceil \beta \times L_r M \rceil$.

It should be understood that the relationship among $K_r$, L, $M_r$, and $\beta$ is described above with reference to Table 25. When $L_r$ is a variable, and M and remain unchanged, a relationship among $K_r$, $L_r$, M, and $\beta$ is similar to that shown in Table 6, Table 24, or Table 25. For brevity, no example is provided herein for description.

Optionally, the quantity of to-be-reported spatial domain vectors that is configured for the $r^{th}$ transport layer in the R transport layers and the quantity of to-be-reported frequency domain vectors that is configured for the $r^{th}$ transport layer are both variables, and the coefficient configured for each transport layer remains unchanged. Therefore, the quantity $K_r$ of to-be-reported space-frequency vector pairs that is configured for the $r^{th}$ transport layer may change as the quantity $L_r$ of to-be-reported spatial domain vectors and the quantity $M_r$ of to-be-reported frequency domain vectors change. When either of values of $L_r$ and $M_r$ changes, a value of $K_r$ changes accordingly.

For example, the quantity of to-be-reported spatial domain vectors that is configured for the $r^{th}$ transport layer is $L_r$, the quantity of to-be-reported frequency domain vectors that is configured for the $r^{th}$ transport layer is $M_r$, and the coefficient configured for each transport layer is $\beta$. $L_r$ and $M_r$ may be separately configured for each transport layer. In this case, $K_r = \lceil \beta \times L_r M_r \rceil$.

Table 26 to Table 28 below show an example in which $K_r$ satisfies $K_r = \lceil \beta \times L_r M_r \rceil$. In Table 26 to Table 28, an example in which the quantity of polarization directions is 2 is used to show the relationship among $K_r$, $L_r$, $M_r$, and $\beta$.

TABLE 26

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | | |
| R = 2 | 2L | M | $\beta$ | 2L | M | $\beta$ | | | | | | |
| R = 3 | 2L | M | $\beta$ | 2L | M | $\beta$ | L | M/2 | $\beta$ | | | |
| R = 4 | 2L | M | $\beta$ | 2L | M | $\beta$ | L | M/2 | $\beta$ | L | M/2 | $\beta$ |

As described above, when $L_r$ and $M_r$ are variables, the quantity $K_r$ of to-be-reported space-frequency vector pairs that is configured for the $r^{th}$ transport layer may change as the values of $L_r$ and $M_r$ change. In this case, Table 26 above may be used to indicate the relationship among $K_r$, $L_r$, $M_r$, and $\beta$. It may be understood that Table 26 is merely a possible representation form used to represent the relationship among $K_r$, $L_r$, $M_r$, and $\beta$. The relationship that is among $K_r$, $L_r$, $M_r$, and $\beta$ and that is shown in Table 26 above may alternatively be represented in a form shown in Table 27 or Table 28.

TABLE 27

| | First transport layer (r = 1) | | | Second transport layer (r = 2) | | | Third transport layer (r = 3) | | | Fourth transport layer (r = 4) | | |
|---|---|---|---|---|---|---|---|---|---|---|---|---|
| | $L_1$ | $M_1$ | $K_1$ | $L_2$ | $M_2$ | $K_2$ | $L_3$ | $M_3$ | $K_3$ | $L_4$ | $M_4$ | $K_4$ |
| R = 1 | 2L | M | $\lceil \beta \times 2LM \rceil$ | | | | | | | | | |
| R = 2 | 2L | M | $\lceil \beta \times 2LM \rceil$ | 2L | M | $\lceil \beta \times 2LM \rceil$ | | | | | | |
| R = 3 | 2L | M | $\lceil \beta \times 2LM \rceil$ | 2L | M | $\lceil \beta \times 2LM \rceil$ | L | M/2 | $\lceil \beta \times 2L \times (M/2) \rceil$ | | | |
| R = 4 | 2L | M | $\lceil \beta \times 2LM \rceil$ | 2L | M | $\lceil \beta \times 2LM \rceil$ | L | M/2 | $\lceil \beta \times 2L \times (M/2) \rceil$ | L | M/2 | $\lceil \beta \times 2L \times (M/2) \rceil$ |

TABLE 28

| | First transport layer (r = 1) | | | | Second transport layer (r = 2) | | | |
|---|---|---|---|---|---|---|---|---|
| | $L_1$ | $M_1$ | $\beta_1$ | $K_1$ | $L_2$ | $M_2$ | $\beta_2$ | $K_2$ |
| R = 1 | 2L | M | $\beta$ | $\lceil \beta \times 2LM \rceil$ | | | | |
| R = 2 | 2L | M | $\beta$ | $\lceil \beta \times 2LM \rceil$ | 2L | M | $\beta$ | $\lceil \beta \times 2LM \rceil$ |
| R = 3 | 2L | M | $\beta$ | $\lceil \beta \times 2LM \rceil$ | 2L | M/2 | $\beta$ | $\lceil \beta \times 2LM \rceil$ |
| R = 4 | 2L | M | $\beta$ | $\lceil \beta \times 2LM \rceil$ | 2L | M/2 | $\beta$ | $\lceil \beta \times 2LM \rceil$ |

| | Third transport layer (r = 3) | | | | Fourth transport layer (r = 4) | | | |
|---|---|---|---|---|---|---|---|---|
| | $L_3$ | $M_3$ | $\beta_3$ | $K_3$ | $L_4$ | $M_4$ | $\beta_4$ | $K_4$ |
| R = 3 | L | M/2 | $\beta$ | $\lceil \beta \times 2L \times (M/2) \rceil$ | | | | |
| R = 4 | L | M/2 | $\beta$ | $\lceil \beta \times 2L \times (M/2) \rceil$ | L | M/2 | $\beta$ | $\lceil \beta \times 2L \times (M/2) \rceil$ |

Table 26, Table 27, and Table 28 show an example of the relationship among $K_r$, $L_r$, $M_r$, and $\beta$. Similar to a relationship among the listed Table 6, Table 24, and Table 25, it may be considered that Table 26, Table 27, and Table 28 are equivalent. However, it should be understood that the relationship among $K_r$, $L_r$, $M_r$, and $\beta$ is not limited to the representation forms shown in Table 26, Table 27, and Table 28 above. For example, a ratio of $M_r$ to M may alternatively be directly configured in a table, and/or a ratio of $L_r$ to L may be directly configured in the table. For brevity, tables are not listed herein one by one for description.

In the following descriptions, Table 29 and Table 30 show several examples in which the quantity $K_r$ of to-be-reported space-frequency vector pairs satisfy $K_r = \lceil \beta \times L_r M_r \rceil$.

TABLE 29

| First transport layer (r = 1) | | | Second transport layer (r = 2) | | | Third transport layer (r = 3) | | | Fourth transport layer (r = 4) | | |
|---|---|---|---|---|---|---|---|---|---|---|---|
| $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | |
| R = 2 | 2L | M | $\beta$ | 2L | M | $\beta$ | | | | | |
| R = 3 | 2L | M | $\beta$ | 2L | M/2 | $\beta$ | 2L | M/2 | $\beta$ | | |
| R = 4 | 2L | M | $\beta$ | 2L | M/2 | $\beta$ | L | M/2 | $\beta$ | L | M/2 | $\beta$ |

TABLE 30

| First transport layer (r = 1) | | | Second transport layer (r = 2) | | | Third transport layer (r = 3) | | | Fourth transport layer (r = 4) | | |
|---|---|---|---|---|---|---|---|---|---|---|---|
| $L_1$ | $M_1$ | $\beta_1$ | $L_2$ | $M_2$ | $\beta_2$ | $L_3$ | $M_3$ | $\beta_3$ | $L_4$ | $M_4$ | $\beta_4$ |
| R = 1 | 2L | M | $\beta$ | | | | | | | | |
| R = 2 | 2L | M | $\beta$ | 2L | M | $\beta$ | | | | | |
| R = 3 | 2L | M | $\beta$ | L | M | $\beta$ | L | M | $\beta$ | | |
| R = 4 | 2L | M | $\beta$ | L | M | $\beta$ | L | M/2 | $\beta$ | L | M/2 | $\beta$ |

It should be understood that either of Table 29 and Table 30 above may be transformed based on a relationship between Table 26 and Table 27 above and a relationship between Table 26 and Table 28 above, to obtain an equivalent table, to indicate the relationship among $K_r$, $L_r$, $M_r$, and $\beta$.

It should be further understood that the relationship among $K_r$, $L_r$, $M_r$, and $\beta$ is described above with reference to Table 26 to Table 30 only for ease of understanding. However, this should not constitute any limitation on this application. As described above, when the quantity of polarization directions is 2 or 1, all "L" in the foregoing tables may be replaced with "L/2".

It should be further understood that Table 26 to Table 30 are merely examples, and should not constitute any limitation on this application. When $K_r$ has the foregoing relationship with $L_r$, $M_r$, and $\beta$, all parameters shown in the tables do not need to be configured. For example, when values in the four columns $\beta_1$ to $\beta_4$ in the tables are all $\beta$, only one column may alternatively be shown. For another example, values of $L_r$, $M_r$, and $K_r$ may be directly shown, and $\beta_1$ to $\beta_4$ are not shown. Based on a same concept, a person skilled in the art may make proper transformations and adjustments based on the foregoing tables. These transformations and adjustments shall all fall within the protection scope of this application.

Based on the foregoing technical solutions, the network device may flexibly configure, for the terminal device, the quantity of to-be-reported spatial domain vectors for each transport layer, the quantity of to-be-reported frequency domain vectors for each transport layer, and the quantity of to-be-reported space-frequency vector pairs for each transport layer.

Figure 9:
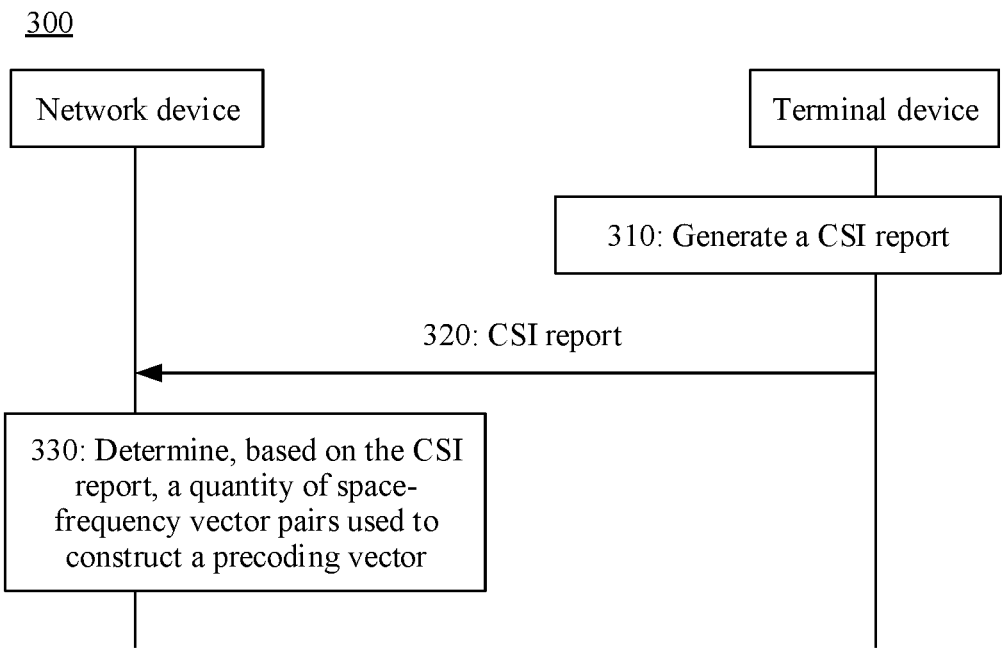
FIG. 9 is a schematic flowchart of a method for indicating vectors used to construct a precoding vector according to another embodiment of this application.

FIG. 9 is a schematic flowchart of a method 300 for indicating vectors used to construct a precoding vector from a perspective of device interaction according to another embodiment of this application. As shown in the figure, the method 300 may include step 310 to step 330. The following describes the steps in the method 300 in detail.

In step 310, a terminal device generates a CSI report. The CSI report is used to indicate a quantity of space-frequency vector pairs reported for R transport layers.

In this embodiment of this application, when the terminal device indicates, by using a binary number, the quantity of space-frequency vector pairs reported for the R transport layers, the terminal device may indicate a quantity of space-frequency vector pairs reported for each transport layer, or indicate a total quantity of space-frequency vector pairs reported for the R transport layers. A field used to indicate the quantity of space-frequency vector pairs reported for the R transport layers may be an indication field having a fixed length, and is irrelevant to a quantity R of the transport layers.

Optionally, indication overheads of the quantity of space-frequency vector pairs reported for the R transport layers is a maximum value that is of $$\sum_{r=1}^{R} \lceil \log_2 K_r \rceil$$

and that is determined by traversing R from 1 to $R_m$. In other words, the length of the indication field may be the maximum value that is of $$\sum_{r=1}^{R} \lceil \log_2 K_r \rceil$$

and that is determined by traversing R from 1 to $R_m$.

$K_r$ may represent a quantity of to-be-reported space-frequency vector pairs that is pre-configured for an $r^{th}$ transport layer, where $K_r \geq 1$, and $K_r$ is an integer. As described above, $K_r$ may specifically represent a total quantity of to-be-reported space-frequency vector pairs that is pre-configured for the $r^{th}$ transport layer, or may represent a value obtained by subtracting a minimum quantity of to-be-reported space-frequency vector pairs that is predefined for the $r^{th}$ transport layer from a total quantity of to-be-reported space-frequency vector pairs that is pre-configured for the $r^{th}$ transport layer.

Alternatively, $K_r$ may represent a quantity of to-be-reported weighting coefficients that is pre-configured for the $r^{th}$ transport layer, where $K_r \geq 1$, and $K_r$ is an integer. As described above, $K_r$ may specifically represent a total quantity of to-be-reported weighting coefficients that is pre-configured for the $r^{th}$ transport layer, or may represent a value obtained by subtracting a minimum quantity of to-be-reported weighting coefficients that is predefined for the $r^{th}$ transport layer from a total quantity of to-be-reported weighting coefficients that is pre-configured for the $r^{th}$ transport layer.

However, it should be understood that the definitions of the parameter $K_r$ in this application are merely examples, and should not constitute any limitation on this application. For example, $K_r$ may alternatively be defined as the total quantity of to-be-reported space-frequency vector pairs (or weighting coefficients) that is pre-configured for the $r^{th}$ transport layer. In this case, the indication overheads of the quantity of space-frequency vector pairs reported for the R transport layers is a maximum value that is of $$\sum_{r=1}^{R} \lceil \log_2 (K_r - a_r) \rceil$$

and that is determined by traversing R from 1 to $R_m$. In other words, the length of the indication field may be the maximum value that is of $$\left\lceil \log_2\left(\sum_{r=1}^{R}(K_r - a_r)\right)\right\rceil$$

and that is determined by traversing R from 1 to $R_m$. $a_r$ represents the minimum quantity of to-be-reported space-frequency vector pairs (or weighting coefficients) that is predefined for the $r^{th}$ transport layer, and $a_r$ is a positive integer.

In this embodiment of this application, when the parameter $K_r$ is used, $K_r$ may be understood as the total quantity of to-be-reported space-frequency vector pairs that is pre-configured for the $r^{th}$ transport layer, or the value obtained by subtracting the minimum quantity of to-be-reported space-frequency vector pairs (or weighting coefficients) that is predefined for the $r^{th}$ transport layer from the total quantity of to-be-reported space-frequency vector pairs (or weighting coefficients) that is pre-configured for the $r^{th}$ transport layer.

Specifically, when the quantity R of the transport layers is specified, the terminal device may determine, based on the quantity of to-be-reported space-frequency vector pairs that is configured for each of the R transport layers, indication overheads used to indicate the quantity of space-frequency vector pairs reported for each transport layer. For example, if a quantity $T_r$ of space-frequency vector pairs reported by the terminal device for the $r^{th}$ transport layer is less than or equal to the quantity $K_r$ of to-be-reported space-frequency vector pairs that is configured for the $r^{th}$ transport layer, indication overheads of the quantity of space-frequency vector pairs reported for the $r^{th}$ transport layer may be $\lceil \log_2 K_r \rceil$. The indication overheads of the total quantity of space-frequency vector pairs reported by the terminal device for the R transport layers may be $$\sum_{r=1}^{R}\lceil \log_2 K_r \rceil$$

bits.

Because a value of R cannot be determined in advance, the quantity of to-be-reported space-frequency vector pairs that is configured for each transport layer may be different. In this case, the indication overheads of the quantity of space-frequency vector pairs reported for the R transport layers may be defined as the maximum value that is of $$\sum_{r=1}^{R}\lceil \log_2 K_r \rceil$$

and that is determined by traversing R from 1 to $R_m$. Therefore, the length of the indication field may be irrelevant to the quantity R of the transport layers.

Based on the foregoing design, the terminal device may indicate, by using the indication field, the quantity of space-frequency vector pairs reported for each of the R transport layers.

Optionally, indication overheads of the quantity of space-frequency vector pairs reported for the R transport layers is a maximum value that is of $$\left\lceil \log_2\left(\sum_{r=1}^{R} K_r\right)\right\rceil$$

and that is determined by traversing R from 1 to $R_m$.

As described above, $K_r$ may specifically represent the total quantity of to-be-reported space-frequency vector pairs that is pre-configured for the $r^{th}$ transport layer, or may represent the value obtained by subtracting the minimum quantity of to-be-reported space-frequency vector pairs that is predefined for the $r^{th}$ transport layer from the total quantity of to-be-reported space-frequency vector pairs that is pre-configured for the $r^{th}$ transport layer.

Alternatively, $K_r$ may represent the quantity of to-be-reported weighting coefficients that is pre-configured for the $r^{th}$ transport layer, where $K_r \geq 1$, and $K_r$ is an integer. As described above, $K_r$ may specifically represent the total quantity of to-be-reported weighting coefficients that is pre-configured for the $r^{th}$ transport layer, or may represent the value obtained by subtracting the minimum quantity of to-be-reported weighting coefficients that is predefined for the $r^{th}$ transport layer from the total quantity of to-be-reported weighting coefficients that is pre-configured for the $r^{th}$ transport layer.

However, it should be understood that the definitions of the parameter $K_r$ in this application are merely examples, and should not constitute any limitation on this application. For example, $K_r$ may alternatively be defined as the total quantity of to-be-reported space-frequency vector pairs (or weighting coefficients) that is pre-configured for the $r^{th}$ transport layer. In this case, the indication overheads of the quantity of space-frequency vector pairs reported for the R transport layers is the maximum value that is of $$\left\lceil \log_2\left(\sum_{r=1}^{R}(K_r - a_r)\right)\right\rceil$$

and that is determined by traversing R from 1 to $R_m$. In other words, the length of the indication field may be the maximum value that is of $$\left\lceil \log_2\left(\sum_{r=1}^{R}(K_r - a_r)\right)\right\rceil$$

and that is determined by traversing R from 1 to $R_m$. $a_r$ represents the minimum quantity of to-be-reported space-frequency vector pairs (or weighting coefficients) that is predefined for the $r^{th}$ transport layer, and $a_r$ is a positive integer.

In this embodiment of this application, when the parameter $K_r$ is used, $K_r$ may be understood as the total quantity of to-be-reported space-frequency vector pairs that is pre-configured for the $r^{th}$ transport layer, or the value obtained by subtracting the minimum quantity of to-be-reported space-frequency vector pairs (or weighting coefficients) that is predefined for the $r^{th}$ transport layer from the total quantity of to-be-reported space-frequency vector pairs (or weighting coefficients) that is pre-configured for the $r^{th}$ transport layer.

For ease of description below, the maximum value that is of $$\left\lceil \log_2\left(\sum_{r=1}^{R} K_r\right) \right\rceil$$

and that is determined by traversing R from 1 to $R_m$ is denoted as Z. In this case, the length of the indication field of the quantity of space-frequency vectors reported for the R transport layers is Z bits.

Specifically, when the quantity R of the transport layers is specified, the terminal device may determine, based on the quantity of to-be-reported space-frequency vector pairs that is configured for each of the R transport layers, the total quantity of to-be-reported space-frequency vector pairs that is configured for the R transport layers. For example, if the reporting quantity configured by the terminal device for the $r^{th}$ transport layer is $K_r$, the total reporting quantity configured for the R transport layers is $$\sum_{r=1}^{R} K_r.$$

The terminal device may determine, based on the total quantity of to-be-reported space-frequency vector pairs that is configured for the R transport layers, the indication overheads of the space-frequency vector pairs reported for the R transport layers. For example, when the total reporting quantity is $$\sum_{r=1}^{R} K_r,$$

the indication overheads thereof may be $$\left\lceil \log_2\left(\sum_{r=1}^{R} K_r\right) \right\rceil$$

bits.

Because a value of R cannot be determined in advance, the quantity of to-be-reported space-frequency vector pairs that is configured for each transport layer may be different. In this case, the indication overheads of the quantity of space-frequency vector pairs reported for the R transport layers may be defined as the maximum value that is of $$\left\lceil \log_2\left(\sum_{r=1}^{R} K_r\right) \right\rceil$$

and that is determined by traversing R from 1 to $R_m$. Therefore, the length of the indication field may be irrelevant to the quantity R of the transport layers.

In an implementation, when the indication field is not fully filled, the indication field may be padded with any bit to ensure that the length of the entire indication field is fixed. In this case, the indication field may include a valid bit and a padding bit. The valid bit is used to indicate the quantity of space-frequency vector pairs reported for the R transport layers, and a remaining bit may be padded with any value. The padding bit may be located before the valid bit, or may be located after the valid bit. This is not limited in this application.

In another implementation, the entire indication field may be used to indicate the quantity of space-frequency vector pairs reported for the R transport layers. The Z bits in the indication field may be used to indicate a value that is of $$\left\lceil \log_2\left(\sum_{r=1}^{R} K_r\right) \right\rceil$$

and that is obtained when R is any value from 1 to $R_m$.

Based on the foregoing designs, the terminal device may indicate, by using the indication field, the total quantity of space-frequency vector pairs reported for the R transport layers. It may be understood that, in this case, a network device cannot determine, based on the indication field, the quantity of space-frequency vector pairs reported for each transport layer.

It should be understood that, when it is defined in a protocol that one of the two designs of the overheads of the indication field that are listed above is used, the terminal device may generate a corresponding indication field based on the defined design, and the network device may also parse the indication field based on the corresponding design.

$K_r$ may represent a quantity of to-be-reported space-frequency vector pairs that is configured for the $r^{th}$ transport layer when the quantity of transport layers is R. As described in the foregoing method 200, a value of $K_r$ may be predefined, may be configured by the network device by using first indication information, or may be determined based on another parameter. This is not limited in this application.

A specific method for determining the quantity of space-frequency vector pairs reported for each transport layer has been described in detail in the foregoing method 200. For brevity, details are not described herein again.

It should be noted that, when the definition of $K_r$ changes, the formula listed above for calculating the indication overheads of the reporting quantity for the R transport layers also change accordingly. A method that is used to calculate the indication overheads of the reporting quantity for the R transport layers and that is determined by a person skilled in the art based on a same inventive concept shall fall within the protection scope of this application.

Optionally, the indication of the quantity of space-frequency vector pairs reported for the R transport layers is located in a first part of the CSI report.

As described above, a length of the first part of the CSI report is predefined. A length of the indication of the quantity of space-frequency vector pairs reported for the R transport layers may be a fixed value, and is irrelevant to the quantity R of the transport layers. Therefore, the indication of the quantity of space-frequency vector pairs reported for the R transport layers may be designed in the first part of the CSI report. Overheads of the first part of the CSI report may be fixed, and do not change with the quantity R of the transport layers. The overheads of the first part may be predefined in a protocol, so that after receiving the CSI report, the network device decodes the first part based on the predefined length.

Further, the CSI report further includes a second part, and the second part includes position indications of the space-frequency vector pairs reported for the R transport layers.

Positions of the space-frequency vector pairs reported for the R transport layers may be relative positions of the space-frequency vector pairs reported for the R transport layers in a plurality of predetermined space-frequency vector pairs. The plurality of predetermined space-frequency vector pairs may be determined by one or more spatial domain vectors and one or more frequency domain vectors.

For example, relative positions of the space-frequency vector pairs reported for each transport layer in the plurality of predetermined space-frequency vector pairs may be indicated by using the bitmap in the foregoing implementations, or may be indicated by using an index of a combination of the space-frequency vector pairs reported for each transport layer in the plurality of space-frequency vector pairs.

A specific method for indicating, by using the bitmap, positions of the space-frequency vector pairs reported for each transport layer has been described in detail in the foregoing method 200. For brevity, details are not described herein again.

A specific method for indicating, by using the index, the space-frequency vector pairs reported for each transport layer is described in detail below.

The $r^{th}$ transport layer is used as an example. As described above, the $T_r$ space-frequency vector pairs reported by the terminal device for the $r^{th}$ transport layer may be one or more space-frequency vector pairs selected from $L_r \times M_r$ space-frequency vector pairs that are determined by $L_r$ spatial domain vectors and $M_r$ frequency domain vectors. The terminal device may indicate the $T_r$ space-frequency vector pairs by using an index of a combination of the $T_r$ space-frequency vector pairs in the $L_r \times M_r$ space-frequency vector pairs.

To be specific, the terminal device may predetermine a plurality of combinations of a plurality of space-frequency vector pairs based on the $L_r \times M_r$ space-frequency vectors obtained by combining the $L_r$ spatial domain vectors and the $M_r$ frequency domain vectors. Each combination may correspond to one index. The $T_r$ space-frequency vector pairs may be one of the plurality of combinations, or may be close to one of the plurality of combinations. The terminal device may indicate the $T_r$ space-frequency vector pairs by indicating the index of the combination of the $T_r$ space-frequency vector pairs. Indication overheads caused by the $T_r$ space-frequency vector pairs may be, for example, $\lceil \log_2 C_{L_r \times M_r}^{T_r} \rceil$ bits.

Based on the same manner, the terminal device may indicate, by using R indexes corresponding to the R transport layers, the space-frequency vector pair reported for each transport layer. Therefore, indication overheads thereof may be, for example $$\sum_{r=1}^{R} \lceil \log_2 C_{L_r \times M_r}^{T_r} \rceil$$

bits.

Optionally, the second part of the CSI report further includes an indication of weighting coefficients reported for each of the R transport layers.

An indication manner and indication overheads of the weighting coefficients are described in detail in the foregoing method 200. For brevity, details are not described herein again.

Optionally, the second part of the CSI report further includes an indication of spatial domain vectors reported for each of the R transport layers.

An indication manner and indication overheads of the spatial domain vectors are described in detail in the foregoing method 200. For brevity, details are not described herein again.

Optionally, the second part of the CSI report further includes an indication of frequency domain vectors reported for each of the R transport layers.

An indication manner and indication overheads of the frequency domain vectors are described in detail in the foregoing method 200. For brevity, details are not described herein again.

Based on the foregoing method, indication overheads of the second part of the CSI report may be determined based on the first part of the CSI report.

Further, the second part of the CSI report may include a first field, a second field, a third field, and a fourth field.

In a possible design, the first field may include the indication of the spatial domain vectors reported for each transport layer, the second field may include the indication of the frequency domain vectors reported for each transport layer, the third field may include the indication of the weighting coefficients reported for each transport layer, and the fourth field may include the position indication of the space-frequency vector pairs reported for each transport layer.

In another possible design, the first field may include the indication of the frequency domain vectors reported for each transport layer, the second field may include the indication of the spatial domain vectors reported for each transport layer, the third field may include the indication of the weighting coefficients reported for each transport layer, and the fourth field may include the position indication of the space-frequency vector pairs reported for each transport layer.

The fourth field may be a bitmap, or may be indexes of combinations of the space-frequency vector pairs. This is not limited in this application.

An encoding sequence of the plurality of fields in the second part may be as follows: The first field is located before the second field, the second field is located before the fourth field, and the fourth field is located before the third field. In addition, information in each field is sequentially encoded/decoded in a sequence from the first transport layer to the $R^{th}$ transport layer.

FIG. 10 to FIG. 13 each show the fields in the second part of the CSI report in the encoding/decoding sequence according to this embodiment of this application. In FIG. 10 and FIG. 12, the first field includes the indication of the spatial domain vector for each transport layer, and the second field includes the indication of the frequency domain vector for each transport layer. In FIG. 11 and FIG. 13, the first field includes the indication of the frequency domain vector for each transport layer, and the second field includes the indication of the spatial domain vector for each transport layer.

It should be understood that FIG. 10 and FIG. 11 are merely examples for ease of understanding the encoding/decoding sequence of the fields, and do not indicate that the fields need to be arranged in the second part according to the sequences shown in the figures. In addition, the encoding/decoding sequence of the fields may correspond to a sequence of the foregoing priorities. Therefore, the encoding/decoding sequence of the fields may correspond to the arrangement sequence of the fields shown in each of FIG. 10 and FIG. 11.

Optionally, L same spatial domain vectors are reported for the R transport layers. The L spatial domain vectors may be shared at the R transport layers. In this case, the indication of the spatial domain vectors reported for each transport layer in the figures may be combined. That is, the spatial domain vectors reported for the R transport layers need to be indicated only once.

Optionally, M same frequency domain vectors are reported for the R transport layers. The M frequency domain vectors may be shared at the R transport layers. In this case, the indication of the frequency domain vectors reported for each transport layer in the figures may be combined. That is, the frequency domain vectors reported for the R transport layers need to be indicated only once.

Therefore, FIG. 10 and FIG. 11 may be simplified into FIG. 12 and FIG. 13.

Further, when the quantity R of the transport layers is greater than 1, frequency domain vectors reported for some transport layers may be a subset of frequency domain vectors reported for the first transport layer. Therefore, the indication of the frequency domain vectors reported for some transport layer in FIG. 10 and FIG. 11 may be combined. In the foregoing implementations, detailed descriptions have been provided with reference to Table 2. For brevity, details are not described herein again.

When a transmission resource scheduled by the network device for the terminal device is insufficient to transmit all content of the CSI report, some pieces of information in the second part may be discarded.

Optionally, the method further includes: determining to-be-discarded information in the second part in ascending order of priorities. A priority of the third field is lower than a priority of the fourth field, the priority of the fourth field is lower than a priority of the second field, and the priority of the second field is lower than a priority of the first field. In addition, priorities of information in each field are in descending order from the first transport layer to the $R^{th}$ transport layer.

The fields shown in each of FIG. 10 to FIG. 13 are encoded/decoded in ascending order of the priorities. For brevity, no additional figure is provided herein for description.

Further, in the third field, a plurality of weighting coefficients reported for a same transport layer may correspond to at least two priorities, and the at least two priorities may include a first priority and a second priority. An amplitude of a weighting coefficient corresponding to the first priority may be greater than or equal to an amplitude of a weighting coefficient corresponding to the second priority. Priorities of weighting coefficient that are of the transport layers and that correspond to the first priority are higher than priorities of weighting coefficients that are of the transport layer and that correspond to the second priority. In addition, in weighting coefficients that are of a plurality of transport layers and that correspond to a same priority, priorities are in descending order from the first transport layer to the $R^{th}$ transport layer.

For ease of understanding, FIG. 14 and FIG. 15 each show the fields that are arranged in the second part of the CSI report in a priority sequence according to this embodiment of this application. In FIG. 14, the first field includes the indication of the spatial domain vectors for each transport layer, and the second field includes the indication of the frequency domain vectors for each transport layer. Specific content in the first field and the second field may be, for example, shown in FIG. 10 or FIG. 12. For brevity, the specific content is not listed in the figure. In FIG. 15, the first field includes the indication of the frequency domain vectors for each transport layer, and the second field includes the indication of the spatial domain vectors for each transport layer. Specific content in the first field and the second field may be, for example, shown in FIG. 11 or FIG. 13. For brevity, the specific content is not listed in the figure.

As shown in the figures, in the third field, priorities of weighting coefficients that are of the transport layers and that correspond to the first priority are higher than priorities of weighting coefficients that are of the transport layers and that correspond to the second priority. In the figures, an ellipsis indicates that priorities obtained through division based on amplitudes of the weighting coefficients are not limited to the first priority and the second priority, and may further include more priorities. Weighting coefficients corresponding to the more priorities may be discarded in ascending order of the priorities.

Optionally, the plurality of weighting coefficients reported for the same transport layer may correspond to at least two quantization levels. Quantities of quantization bits of the plurality of weighting coefficients may be determined based on the at least two quantization levels. The at least two quantization levels may include a first quantization level and a second quantization level. A quantity of quantization bits of a weighting coefficient corresponding to the first quantization level may be greater than a quantity of quantization bits of a weighting coefficient corresponding to the second quantization level. In the third field, a priority of a weighting coefficient that is of each transport layer and that corresponds to the first quantization level is higher than a priority of a weighting coefficient that is of the transport layer and that corresponds to the second quantization level. In addition, in a plurality of weighting coefficients that are of the transport layers and that correspond to a same quantization level, priorities are in descending order from the first transport layer to the $R^{th}$ transport layer.

The at least two quantization levels may correspond to the at least two priorities described above. In other words, in FIG. 14 and FIG. 15, "first priority" may be replaced with "first quantization level", and "second priority" may be replaced with "second quantization level".

It should be noted that, "discard" described above may be understood as: Before the second part is encoded/decoded, it is determined that the to-be-discarded information is not encoded/decoded. Therefore, the to-be-discarded information is not fed back to the network device. This seems that some pieces of information in the second part are discarded.

Based on the foregoing two different implementations, the terminal device may indicate, to the network device by using the CSI report, the quantity and positions of the space-frequency vector pairs reported for the R transport layers. It should be noted that, when it is defined in a protocol that an implementation is used to indicate the quantity and positions of the space-frequency vector pairs to the terminal device, the terminal device and the network device may generate the CSI report and parse the CSI report based on the same implementation.

Based on the foregoing method, the terminal device generates the CSI report.

In step 320, the terminal device transmits the CSI report. Correspondingly, the network device receives the CSI report.

A specific process of step 320 may be the same as a specific process of step 220 in the foregoing method 200. For brevity, details are not described herein again.

In step 330, the network device determines, based on the CSI report, a quantity of space-frequency vector pairs used to construct a precoding vector.

A specific process in which the terminal device indicates, by using the CSI report, the quantity of the space-frequency vector pairs reported for the R transport layers has been described in detail in step 310. The spatial domain vector pairs reported for the R transport layers are space-frequency vector pairs used to construct the precoding vector.

After receiving the CSI report, the network device may decode the first part of the CSI report based on the predefined length of the first part. After parsing the first part of the CSI report, the network device may determine the quantity of the space-frequency vector pairs reported for the R transport layers, to determine the indication overheads of the second part of the CSI report, and then decode the second part and determine the space-frequency vector pairs reported for each transport layer.

A specific process of parsing the CSI report by the network device is similar to the specific process of generating the CSI report by the terminal device. For brevity, detailed descriptions of the specific process are omitted herein. In addition, for a specific decoding process, refer to the current technology. For brevity, detailed descriptions of the specific process are omitted herein.

As described above, the second part of the CSI report may include the indication of the weighting coefficients reported for each transport layer, the indication of the spatial domain vectors reported for each transport layer, and the indication of the frequency domain vectors reported for each transport layer. Therefore, the network device may determine, based on the space-frequency vector pairs and the weighting coefficients that are reported for each transport layer, a precoding vector corresponding to each frequency domain unit at each transport layer, and further determine a precoding matrix corresponding to the frequency domain unit.

The foregoing has described a specific process in which the network device determines, based on the spatial domain vector pairs and the weighting coefficients, the precoding vector corresponding to each frequency domain unit, and further determines the precoding matrix corresponding to the frequency domain unit. In addition, for the specific process in which the network device determines, based on the space-frequency vector pairs and the weighting coefficients that are indicated in the CSI report, the precoding vector corresponding to each frequency domain unit at each transport layer, and further determines the precoding matrix corresponding to the frequency domain unit, refer to the current technology. For brevity, details are not described herein again.

In this embodiment of this application, the terminal device generates the indication field having the fixed length in the CSI report, so that the network device determines indication overheads of other indication information based on the indication field having the fixed length. Therefore, the network device may determine, based on the CSI report, the space-frequency vector pairs reported by the terminal device for each transport layer and the weighting coefficients corresponding to the space-frequency vector pairs, and then construct the precoding vector corresponding to each frequency domain unit. The precoding vector constructed based on the space-frequency vector pair and the weighting coefficient that are reported by the terminal device is determined based on downlink channels in a plurality of frequency domain units, and can well adapt to the downlink channels due to frequency domain correlation, thereby ensuring relatively high feedback precision. In addition, compared with a feedback manner of a type II codebook in the current technology, in the method for indicating vectors used to construct a precoding vector, feedback overheads do not increase as a quantity of frequency domain units increases. This helps reduce the feedback overheads.

It should be understood that, in the foregoing embodiments, sequence numbers of the foregoing processes do not mean execution sequences. The execution sequences of the processes should be determined based on functions and internal logic of the processes, and should not be construed as any limitation on the implementation processes of the embodiments of this application.

With reference to FIG. 2 to FIG. 15, the foregoing describes in detail the methods for indicating vectors used to construct a precoding vector provided in the embodiments of this application. Communications apparatuses provided in the embodiments of this application are described below in detail with reference to FIG. 16 to FIG. 18.

Figure 16:
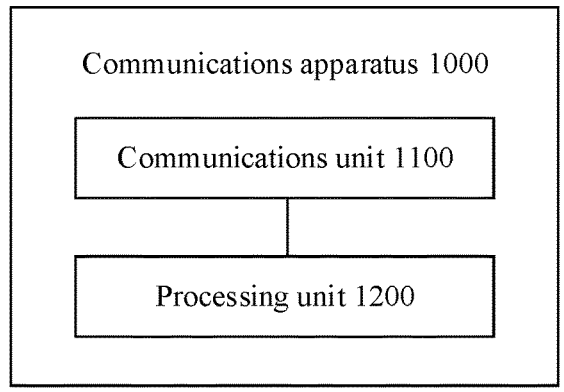
FIG. 16 is a schematic block diagram of a communications apparatus according to an embodiment of this application.

FIG. 16 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to a terminal device in the foregoing method embodiments, for example, may be a terminal device or a chip disposed in a terminal device.

Specifically, the communications apparatus 1000 may correspond to the terminal device in the method 200 in the embodiments of this application, and the communications apparatus 1000 may include units configured to perform the method performed by the terminal device in the method 200 in FIG. 2. In addition, the units in the communications apparatus 1000 and the foregoing other operations and/or functions are intended to implement corresponding procedures of the method 200 in FIG. 2 or of the method 300 in FIG. 9.

When the communications apparatus 1000 is configured to perform the method 200 in FIG. 2, the communications unit 1100 may be configured to perform step 220 in the method 200, and the processing unit 1200 may be configured to perform step 210 in the method 200. It should be understood that a specific process of performing a corresponding step by each unit has been described in detail in the foregoing method embodiments. For brevity, details are not described herein.

When the communications apparatus 1000 is configured to perform the method 300 in FIG. 9, the communications unit 1100 may be configured to perform step 320 in the method 200, and the processing unit 1200 may be configured to perform step 310 in the method 200. It should be understood that a specific process of performing a corresponding step by each unit has been described in detail in the foregoing method embodiments. For brevity, details are not described herein.

Figure 17:
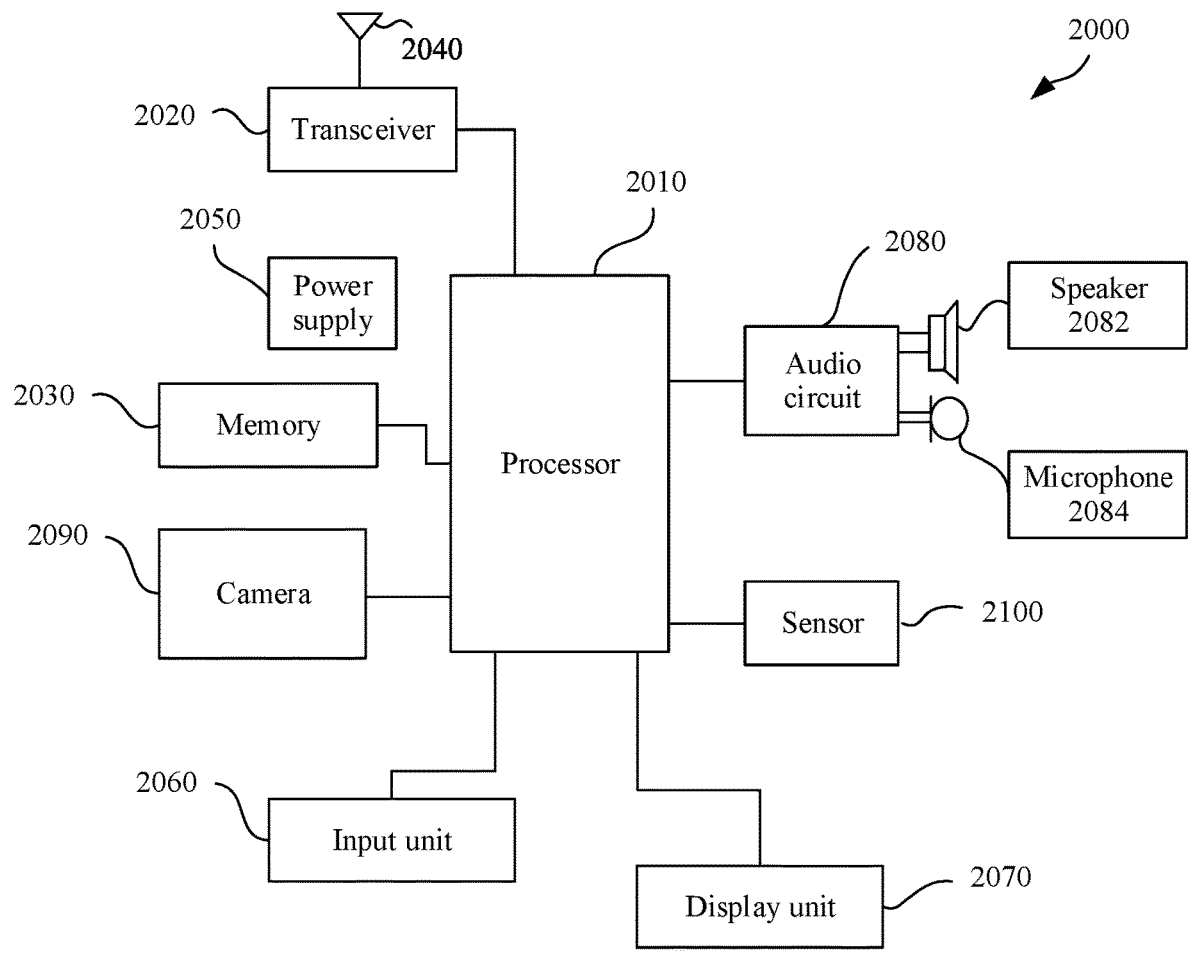
FIG. 17 is a schematic structural diagram of a terminal device according to an embodiment of this application.

It should be further understood that, when the communications apparatus 1000 is a terminal device, the communications unit 1100 in the communications apparatus 1000 may correspond to a transceiver 2020 in a terminal device 2000 shown in FIG. 17, and the processing unit 1200 in the communications apparatus 1000 may correspond to a processor 2010 in the terminal device 2000 shown in FIG. 17.

It should be further understood that, when the communications apparatus 1000 is a chip disposed in a terminal device, the communications unit 1100 in the communications apparatus 1000 may be an input/output interface.

In another possible design, the communications apparatus 1000 may correspond to a network device in the foregoing method embodiments, for example, may be a network device or a chip disposed in a network device.

Specifically, the communications apparatus 1000 may correspond to the network device in the method 200 in the embodiments of this application, and the communications apparatus 1000 may include units configured to perform the method performed by the network device in the method 200 in FIG. 2. In addition, the units in the communications apparatus 1000 and the foregoing other operations and/or functions are intended to implement corresponding procedures of the method 200 in FIG. 2 or of the method 300 in FIG. 9.

When the communications apparatus 1000 is configured to perform the method 200 in FIG. 2, the communications unit 1100 may be configured to perform step 220 in the method 200, and the processing unit 1200 may be configured to perform step 230 in the method 200. It should be understood that a specific process of performing a corresponding step by each unit has been described in detail in the foregoing method embodiments. For brevity, details are not described herein.

When the communications apparatus 1000 is configured to perform the method 300 in FIG. 9, the communications unit 1100 may be configured to perform step 320 in the method 200, and the processing unit 1200 may be configured to perform step 330 in the method 200. It should be understood that a specific process of performing a corresponding step by each unit has been described in detail in the foregoing method embodiments. For brevity, details are not described herein.

Figure 18:
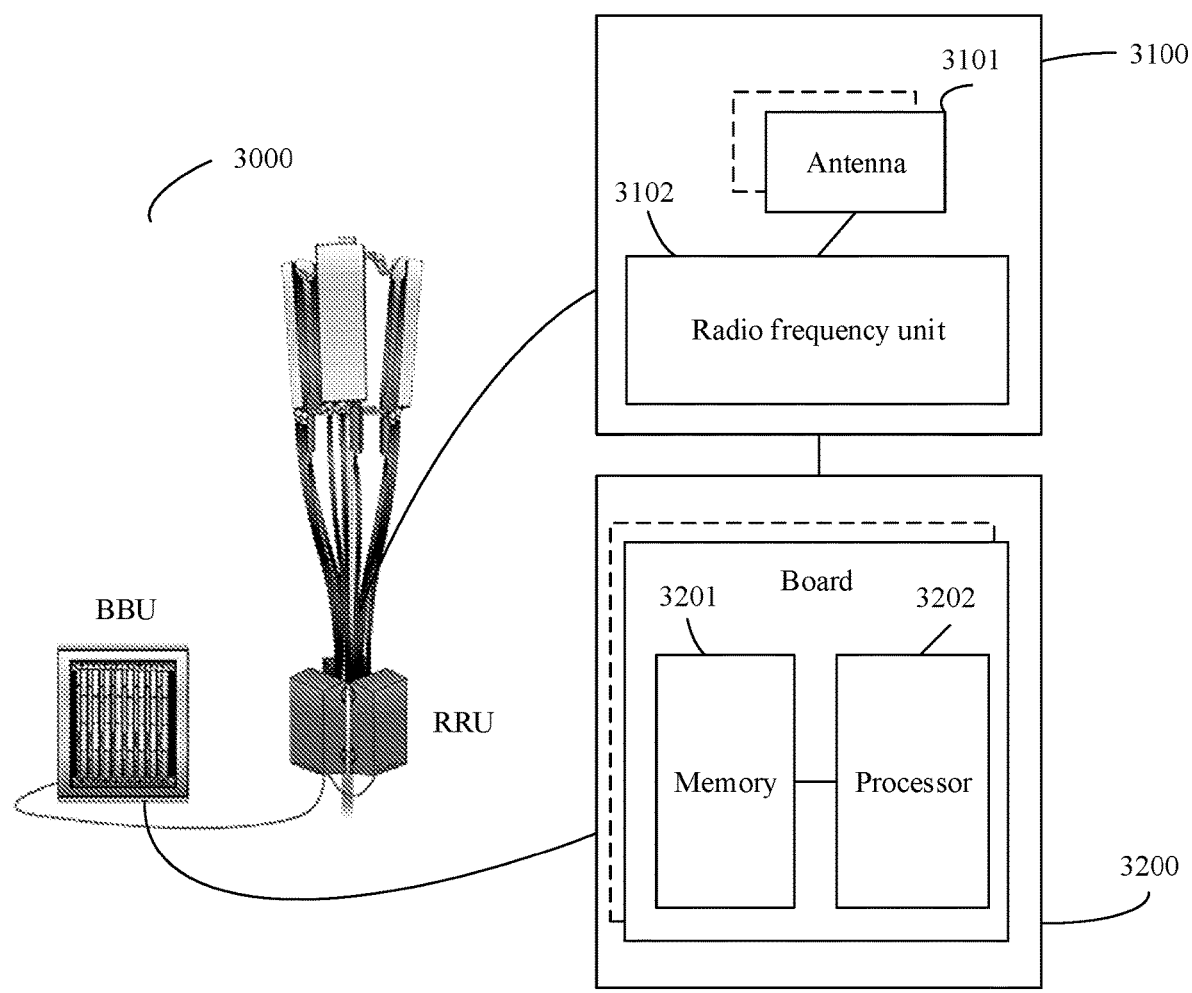
FIG. 18 is a schematic structural diagram of a network device according to an embodiment of this application.

It should be further understood that, when the communications apparatus 1000 is a network device, the communications unit in the communications apparatus 1000 may correspond to a transceiver 3200 in a network device 3000 shown in FIG. 18, and the processing unit 1200 in the communications apparatus 1000 may correspond to a processor 3100 in the network device 3000 shown in FIG. 18.

It should be further understood that, when the communications apparatus 1000 is a chip disposed in a network device, the communications unit 1100 in the communications apparatus 1000 may be an input/output interface.

FIG. 17 is a schematic structural diagram of a terminal device 2000 according to an embodiment of this application. The terminal device 2000 may be applied to the system shown in FIG. 1, and perform a function of the terminal device in the foregoing method embodiments. As shown in FIG. 17, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to: invoke the computer program from the memory 2030 and run the computer program, to control the transceiver 2020 to transmit/receive a signal. Optionally, the terminal device 2000 may further include an antenna 2040, configured to transmit, by using a radio signal, uplink data or uplink control signaling output by the transceiver 2020.

The processor 2010 and the memory 2030 may be integrated into one processing apparatus, and the processor 2010 is configured to execute program code stored in the memory 2030, to implement the foregoing function. During specific implementation, the memory 2030 may alternatively be integrated into the processor 2010, or may be independent of the processor 2010. The processor 2010 may correspond to the processing unit in FIG. 16.

The transceiver 2020 may correspond to the communications unit in FIG. 16, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 17 can implement each process of the terminal device in the method embodiment shown in FIG. 2 or FIG. 9. Operations and/or functions of modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform a transmitting action performed by the terminal device for the network device in the foregoing method embodiments or a receiving action performed by the terminal device from the network device in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 18 is a schematic structural diagram of a network device according to an embodiment of this application, for example, may be a schematic structural diagram of a base station. The base station 3000 may be applied to the system shown in FIG. 1, and perform a function of the network device in the foregoing method embodiments. As shown in the figure, the base station 3000 may include one or more radio frequency units, for example, a remote radio unit (, RRU) 3100 and one or more baseband units (BBU) (which may also be referred to as a distributed unit (DU)) 3200. The RRU 3100 may be referred to as a transceiver unit, and corresponds to the communications unit 1200 in FIG. 16. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a transmitting unit. The receiving unit may correspond to a receiver (or referred to as a receiver machine or a receiver circuit), and the transmitting unit may correspond to a transmitter (or referred to as a transmitter machine or a transmitter circuit). The RRU 3100 is mainly configured to: receive and transmit a radio frequency signal, and perform conversion between the radio frequency signal and a baseband signal, for example, configured to transmit indication information to a terminal device. The BBU 3200 is mainly configured to perform baseband processing, control the base station, and the like. The RRU 3100 and the BBU 3200 may be physically disposed together, or may be physically separated, namely, a distributed base station.

The BBU 3200 is a control center of the base station, or may be referred to as a processing unit. The BBU 3200 may correspond to the processing unit 1100 in FIG. 16, and is mainly configured to implement a baseband processing function such as channel coding, multiplexing, modulation, or spreading. For example, the BBU (the processing unit) may be configured to control the base station to perform an operation procedure related to the network device in the foregoing method embodiments, for example, generating the foregoing indication information.

In an example, the BBU 3200 may include one or more boards, and a plurality of boards may jointly support a radio access network (such as an LTE network) having a single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, configured to control the base station to perform an operation procedure related to the network device in the foregoing method embodiments. The memory 3201 and the processor 3202 may serve the one or more boards. In other words, the memory and the processor may be independently disposed on each board. Alternatively, the plurality of boards may share the same memory and the same processor. In addition, each board may further be provided with a necessary circuit.

It should be understood that, the base station 3000 shown in FIG. 18 can implement each process of the network device in the method embodiment in FIG. 2 or FIG. 9. The operations and/or the functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments. The RRU 3100 may be configured to perform a transmitting action performed by the network device for the terminal device in the foregoing method embodiments or a receiving action performed by the network device from the terminal device in the foregoing method embodiments. For details, refer to the descriptions in the foregoing method embodiments. Details are not described herein again.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In an implementation process, the steps in the foregoing methods can be implemented by using a hardware integrated logic circuit in the processor, or by using instructions in a form of software. The steps of the methods disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through descriptions of the examples but not limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

According to the methods provided in the embodiments of this application, this application further provides a computer program product, and the computer program product includes computer program code. When the computer program code is run on a computer, the computer is enabled to perform the method in either of the embodiments shown in FIG. 2 and FIG. 9.

According to the methods provided in the embodiments of this application, this application further provides a computer-readable medium. The computer-readable medium stores program code. When the program code is run on a computer, the computer is enabled to perform the method in either of the embodiments shown in FIG. 2 and FIG. 9.

According to the methods provided in the embodiments of this application, this application further provides a system. The system includes the foregoing one or more terminal devices and one or more network devices.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the terminal device or network device in the method embodiments. A corresponding module or unit performs a corresponding step. For example, the communications unit (the transceiver) performs transmitting or receiving steps in the method embodiments, and the processing unit (the processor) performs another step other than the transmitting and receiving steps. For a function of a specific unit, refer to a corresponding method embodiment. There may be one or more processors.

The terms such as "part", "module", and "system" used in this specification are used to indicate computer-related entities, hardware, firmware, combinations of hardware and software, software, or software being executed. For example, a part may be, but is not limited to, a process that runs on a processor, a processor, an object, an executable file, an execution thread, a program, and/or a computer. As shown in the figures, both a computing device and an application running on the computing device may be parts. One or more parts may reside within a process and/or an execution thread, and a part may be located on one computer and/or distributed between two or more computers. In addition, these parts may be executed from various computer-readable media that store various data structures. For example, the parts may perform communication by using a local and/or remote process and based on, for example, a signal having one or more data packets (for example, data exchanged between a part and the other part in a local system, a distributed system, and/or across a network such as an internet interacting with another system by using the signal).

A person of ordinary skill in the art may be aware that, in combination with various illustrative logical blocks and steps described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, the function units in the embodiments of this application may be integrated into one processing unit, or each of the units may exist alone physically, or two or more units may be integrated into one unit.

In the foregoing embodiments, all or some of the functions of the function units may be implemented by software, hardware, firmware, or any combination thereof. When being implemented by using the software, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web-site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A method comprising:
    receiving a channel state information (CSI) report, wherein the CSI report indicates a quantity of space-frequency vector pairs to be reported for a quantity of R transport layers, wherein a size of an overhead for indicating the quantity of the space-frequency vector pairs is same when the quantity of R is greater than or equal to 2, wherein each of the space-frequency vector pairs comprises one spatial domain vector and one frequency domain vector, wherein for each of the R transport layers, one or more frequency domain units associated with the transport layer correspond to one or more precoding vectors, and wherein each of the one or more precoding vectors is constructed by one or more space-frequency vector pairs to be reported for the corresponding transport layer in the R transport layers; and
    determining the quantity of space-frequency vector pairs according to the CSI report.

2. The method according to claim 1, wherein the CSI report further indicates relative positions of the space-frequency vector pairs to be reported for each of the R transport layers.

3. The method according to claim 1, wherein relative positions of the space-frequency vector pairs reported for each of the R transport layers is indicated by a bitmap, wherein the bitmap comprises a plurality of indicator bits corresponding to a plurality of space-frequency vector pairs, and wherein each of the plurality of indicator bits indicates whether a corresponding space-frequency vector pair is selected for constructing a precoding vector.

4. The method according to claim 1, wherein the size of the overhead is $\lceil \log_2 (2K) \rceil$ when the quantity of R is greater than or equal to 2, wherein K is a preconfigured maximum quantity of to-be-reported space-frequency vector pairs for a transport layer.

5. The method according to claim 1, wherein the method further comprises:
    transmitting at least one of first indication information indicating the quantity of space-frequency vector pairs to be reported for each of the R transport layers, second indication information indicating a quantity of spatial domain vectors to be reported for each of the R transport layers, or a third indication information indicating a quantity of frequency domain vectors to be reported for each of the R transport layers.

6. The method according to claim 5, wherein the first indication information further indicates a maximum value of the quantity of space-frequency vector pairs to be reported for each of the R transport layers.

7. The method according to claim 5, wherein the first indication information, the second indication information, and the third indication information are transmitted by using a same signaling.

8. The method according to claim 1, wherein the CSI report further comprises an indication of a weighting coefficient to be reported for each of the R transport layers.

9. The method according to claim 8, wherein one or more weighting coefficients are to be reported for each of the R transport layers, wherein each of the one or more weighting coefficients correspond to one of at least two reporting priorities, and wherein a weighting coefficient corresponding to a higher reporting priority of the at least two reporting priorities has higher priority to be reported compared to a weighting coefficient corresponding to a lower reporting priority of the at least two reporting priorities.

10. The method according to claim 9, wherein for a first weighting coefficient to be reported for an Mth transport layer and a second weighting coefficient to be reported for an Nth transport layer corresponding to a same reporting priority of the at least two reporting priorities, where M<N, the first weighting coefficient has higher priority to be reported compared to the second weighting coefficient.

11. A communications apparatus, comprising:
    at least one processor;
    a memory storing one or more instructions for execution by the at least one processor to:
        receive a channel state information (CSI) report, wherein the CSI report indicates a quantity of space-frequency vector pairs to be reported for a quantity of R transport layers, wherein a size of an overhead for indicating the quantity of the space-frequency vector pairs is same when the quantity of R is greater than or equal to 2, wherein each of the space-frequency vector pairs comprises one spatial domain vector and one frequency domain vector, wherein for each of the R transport layers, one or more frequency domain units associated with the transport layer correspond to one or more precoding vectors, and wherein each of the one or more precoding vectors is constructed by one or more space-frequency vector pairs to be reported for the corresponding transport layer in the R transport layers; and
        determine the quantity of space-frequency vector pairs according to the CSI report.

12. The apparatus according to claim 11, wherein the CSI report further indicates relative positions of the space-frequency vector pairs to be reported for each of the R transport layers.

13. The apparatus according to claim 11, wherein relative positions of the space-frequency vector pairs reported for each of the R transport layers is indicated by a bitmap, wherein the bitmap comprises a plurality of indicator bits corresponding to a plurality of space-frequency vector pairs, and wherein each of the plurality of indicator bits indicates whether a corresponding space-frequency vector pair is selected for constructing a precoding vector.

14. The apparatus according to claim 11, wherein the same size of the overhead is $\lceil \log_2(2K) \rceil$ when the quantity of R is greater than or equal to 2, wherein K is a preconfigured maximum quantity of to-be-reported space-frequency vector pairs for a transport layer.

15. The apparatus according to claim 11, wherein the one or more instructions are for execution by the at least one processor to:
    transmit at least one of first indication information indicating the quantity of space-frequency vector pairs to be reported for each of the R transport layers, second indication information, indicating a quantity of spatial domain vectors to be reported for each of the R transport layers, or a third indication information indicating a quantity of frequency domain vectors to be reported for each of the R transport layers.

16. The apparatus according to claim 15, wherein the first indication information further indicates a maximum value of the quantity of space-frequency vector pairs to be reported for each of the R transport layers.

17. The apparatus according to claim 15, wherein the first indication information, the second indication information, and the third indication information are transmitted by using a same signaling.

18. The apparatus according to claim 11, wherein the CSI report further comprises an indication of a weighting coefficient to be reported for each of the R transport layers.

19. The apparatus according to claim 18, wherein one or more weighting coefficients are to be reported for each of the R transport layers, wherein each of the one or more weighting coefficients correspond to one of at least two reporting priorities, and wherein a weighting coefficient corresponding to a higher reporting priority of the at least two reporting priorities has higher priority to be reported compared to a weighting coefficient corresponding to a lower reporting priority of the at least two reporting priorities.

20. The apparatus according to claim 19, wherein for a first weighting coefficient to be reported for an Mth transport layer and a second weighting coefficient to be reported for an Nth transport layer corresponding to a same reporting priority of the at least two reporting priorities, where M<N, the first weighting coefficient has higher priority to be reported compared to the second weighting coefficient.

21. A non-transitory computer readable storage medium, storing one or more instructions executable by at least one processor to perform operations comprising:
    receiving a channel state information (CSI) report, wherein the CSI report indicates a quantity of space-frequency vector pairs to be reported for a quantity of R transport layers, wherein a size of an overhead for indicating the quantity of the space-frequency vector pairs is same when the quantity of R is greater than or equal to 2, wherein each of the space-frequency vector pairs comprises one spatial domain vector and one frequency domain vector, wherein for each of the R transport layers, one or more frequency domain units associated with the transport layer correspond to one or more precoding vectors, and wherein each of the one or more precoding vectors is constructed by one or more space-frequency vector pairs to be reported for the corresponding transport layer in the R transport layers; R is greater than or equal to 2; and
    determining the quantity of space-frequency vector pairs according to the CSI report.

22. The non-transitory computer readable storage medium according to claim 21, wherein the CSI report further indicates relative positions of the space-frequency vector pairs to be reported for each of the R transport layers.

23. The non-transitory computer readable storage medium according to claim 21, wherein relative positions of the space-frequency vector pairs reported for each of the R transport layers is indicated by a bitmap, wherein the bitmap comprises a plurality of indicator bits corresponding to a plurality of space-frequency vector pairs, and wherein each of the plurality of indicator bits indicates whether a corresponding space-frequency vector pair is selected for constructing a precoding vector.

24. The non-transitory computer readable storage medium according to claim 21, wherein the same size of the overhead is $\lceil \log_2(2k) \rceil$ when the quantity of R is greater than or equal to 2, wherein K is a preconfigured maximum quantity of to-be-reported space-frequency vector pairs for a transport layer.

25. The non-transitory computer readable storage medium according to claim 21, wherein the operations further comprising:
    transmitting at least one of first indication information indicating the quantity of space-frequency vector pairs to be reported for each of the R transport layers, second indication information indicating a quantity of spatial domain vectors to be reported for each of the R transport layer, or a third indication information indicating a quantity of frequency domain vectors to be reported for each of the R transport layers.

26. The non-transitory computer readable storage medium according to claim 25, wherein the first indication information further indicates a maximum value of the quantity of space-frequency vector pairs to be reported for each of the R transport layers.

27. The non-transitory computer readable storage medium according to claim 25, wherein the first indication information, the second indication information, and the third indication information are transmitted by using a same signaling.

28. The non-transitory computer readable storage medium according to claim 21, wherein the CSI report further comprises an indication of a weighting coefficient to be reported for each of the R transport layers.

29. The non-transitory computer readable storage medium according to claim 28, wherein one or more weighting coefficients are to be reported for each of the R transport layers, wherein each of the one or more weighting coefficients correspond to one of at least two reporting priorities, and wherein a weighting coefficient corresponding to a higher reporting priority of the at least two reporting priorities has higher priority to be reported compared to a weighting coefficient corresponding to a lower reporting priority of the at least two reporting priorities.

30. The non-transitory computer readable storage medium according to claim 29, wherein for a first weighting coefficient to be reported for an Mth transport layer and a second weighting coefficient to be reported for an Nth transport layer corresponding to a same reporting priority of the at least two reporting priorities, where M<N, the first weighting coefficient has higher priority to be reported compared to the second weighting coefficient.

* * * * *